United States Patent
Tabata et al.

(10) Patent No.: US 9,025,424 B2
(45) Date of Patent: May 5, 2015

(54) OPTICAL RECORDING METHOD, OPTICAL RECORDING MEDIUM, OPTICAL RECORDING MEDIUM RECORDING APPARATUS, OPTICAL RECORDING APPARATUS, OPTICAL DISK, AND OPTICAL DISK RECORDING/REPRODUCING APPARATUS

(75) Inventors: Hiroshi Tabata, Mito (JP); Kazuo Yonehara, Hitachinaka (JP); Yasuhiro Ueki, Sagamihara (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 992 days.

(21) Appl. No.: 10/545,321

(22) PCT Filed: Feb. 19, 2004

(86) PCT No.: PCT/JP2004/001869
§ 371 (c)(1),
(2), (4) Date: Aug. 12, 2005

(87) PCT Pub. No.: WO2004/075181
PCT Pub. Date: Sep. 2, 2004

(65) Prior Publication Data
US 2006/0140094 A1 Jun. 29, 2006

(30) Foreign Application Priority Data

Feb. 19, 2003 (JP) .............................. P2003/040793
Mar. 20, 2003 (JP) .............................. P2003-077216
Apr. 11, 2003 (JP) .............................. P2003/107494
Aug. 8, 2003 (JP) .............................. P2003-289786
Sep. 2, 2003 (JP) .............................. P2003-309693

(51) Int. Cl.
*G11B 5/09* (2006.01)
*G11B 20/10* (2006.01)
(Continued)

(52) U.S. Cl.
CPC .......... *G11B 7/0062* (2013.01); *G11B 7/00456* (2013.01); *G11B 2007/24314* (2013.01); *G11B 2007/24316* (2013.01)

(58) Field of Classification Search
USPC ................................................ 369/59.1, 47.5
See application file for complete search history.

(56) References Cited

U.S. PATENT DOCUMENTS 5,745,467 A * 4/1998 Sakaue et al. ............... 369/59.11
6,411,579 B2 * 6/2002 Nobukuni et al. ......... 369/59.12
(Continued)

FOREIGN PATENT DOCUMENTS

EP 1 249 834 A2 10/2002
EP 1 249 834 A3 5/2005
(Continued)

OTHER PUBLICATIONS

Horie, M. et al., "High speed rewritable DVD up to 20m/s with nucleation-free eutectic phase-change material of Ge(Sb$_{70}$Te$_{30}$) +Sb", In Optical Data Storage 2000, SPIE, vol. 4090, pp. 135-143, (2000), XP 007906729.
(Continued)

*Primary Examiner* — Aneeta Yodichkas
(74) *Attorney, Agent, or Firm* — Nath, Goldberg & Meyer; Jerald L. Meyer; Leonid D. Thenor

(57) ABSTRACT

A mark having a length nT (n being an integer equal to or greater than 3 and T being a clock period) is formed by modulating irradiation laser power with three values of recording power Pw, erase power Pe, and bias power Pb (Pw>Pe>Pb). Constant strength periods ($A_t$) of the recording power Pw are set as $A_tT$, $A_1T$, ..., and $A_mT$ and constant strength periods (B) of the bias power Pb are set as $B_tT$, $B_1T$, ..., $B_mT$, and CT (C=−1 to 3). The application of laser is divided into pulses in order of $A_tT$, $B_tT$, $A_1T$, $B_1T$, ..., $A_mT$, $B_mT$, and CT (m=(n−k)/2, k=3 (if n is an odd number), or k=4 (if n is an even number)). (Here, the constant strength period of the recording power Pw for n=3, n=4, n≥5 (odd number), and n≥6 (even number) is set as $A_{t3}$, $A_{t4}$, $A_{tod}$, and $A_{tev}$, the constant strength period of the bias power Pb for n=3, n=4, n≥5 (odd number), and n≥6 (even number) is set as $B_{t3}$, $B_{t4}$, $B_{tod}$, and $B_{tev}$, and then, $A_{t3}+B_{t3}=A_{tod}+B_{tod}=A_m+B_m=2T$ and $A_{t4}+B_{t4}=A_{tev}+B_{tev}=3T$).

7 Claims, 30 Drawing Sheets

(51) Int. Cl.

| | | |
|---|---|---|
| *G11B 27/36* | (2006.01) | |
| *H04N 5/76* | (2006.01) | |
| *G11B 5/00* | (2006.01) | |
| *G11B 7/12* | (2012.01) | |
| *G11B 15/52* | (2006.01) | |
| *G11B 7/006* | (2006.01) | |
| *G11B 7/0045* | (2006.01) | |
| *G11B 7/243* | (2013.01) | |

(56) References Cited

U.S. PATENT DOCUMENTS

| | | | | |
|---|---|---|---|---|
| 6,459,666 | B1 * | 10/2002 | Yokoi | 369/47.15 |
| 6,560,178 | B2 * | 5/2003 | Lee et al. | 369/53.19 |
| 7,260,044 | B2 * | 8/2007 | Yuzurihara et al. | 369/59.12 |
| 7,336,580 | B2 * | 2/2008 | Kato et al. | 369/59.11 |
| 2001/0007548 | A1 * | 7/2001 | Toda et al. | 369/53.27 |
| 2002/0064117 | A1 * | 5/2002 | Kato et al. | 369/59.11 |
| 2002/0196324 | A1 * | 12/2002 | Abe et al. | 347/179 |
| 2003/0021201 | A1 | 1/2003 | Kobayashi | |
| 2003/0067857 | A1 * | 4/2003 | Shirota et al. | 369/59.12 |
| 2003/0227850 | A1 * | 12/2003 | Kato et al. | 369/59.11 |
| 2004/0052176 | A1 * | 3/2004 | Narumi et al. | 369/47.39 |
| 2004/0136305 | A1 * | 7/2004 | Kato et al. | 369/59.11 |
| 2004/0257952 | A1 * | 12/2004 | Kimura | 369/59.12 |

FOREIGN PATENT DOCUMENTS

| | | |
|---|---|---|
| JP | 63-160017 | 7/1988 |
| JP | 02-278518 | 11/1990 |
| JP | 06-012674 | 1/1994 |
| JP | 08-007277 | 1/1996 |
| JP | 8-287465 A | 11/1996 |
| JP | 09-007176 | 1/1997 |
| JP | 09-134525 | 5/1997 |
| JP | 10-241164 | 9/1998 |
| JP | 11-175976 | 7/1999 |
| JP | 2001-060319 | 3/2001 |
| JP | 2001-209940 | 8/2001 |
| JP | 2001-331936 | 11/2001 |
| JP | 2002-288828 | 10/2002 |
| JP | 2002-312934 | 10/2002 |
| JP | 2002-334433 | 11/2002 |
| JP | 2002-358646 A | 12/2002 |
| JP | 2003-030833 | 1/2003 |
| JP | 2003-030833 A | 1/2003 |
| JP | 2003-030836 | 1/2003 |
| JP | 2003-045036 | 2/2003 |

OTHER PUBLICATIONS (Extended) European Search Report for corresponding European Patent Application No. EP 10 19 7371.

* cited by examiner

LASER INCIDENT DIRECTION : L

FIG.9

| | RECORDING METHOD (RECORDING PULSE STRING) | RECORDING FILM COMPOSITION | | | | 4X-SPEED RECORDING | | 6X-SPEED RECORDING | | OTHER |
|---|---|---|---|---|---|---|---|---|---|---|
| | | M | x | y/z | | JITTER (%) | MODULATION FACTOR(%) | JITTER (%) | MODULATION FACTOR(%) | |
| 1ST EMBODIMENT | PRESENT INVENTION | Ge, In | 7 | 4.5 | | 9.5 | 72 | 11.5 | 67 | |
| 2ND EMBODIMENT | PRESENT INVENTION (TOP PULSE PARAMETER USED) | ↑ | ↑ | ↑ | | 8.3 | 72 | 9.9 | 67 | |
| 3RD EMBODIMENT | PRESENT INVENTION (TOP PULSE DELAY USED) | ↑ | ↑ | ↑ | | – | – | 9.6 | 67 | |
| 4TH EMBODIMENT | PRESENT INVENTION (TOP PULSE PARAMETER USED) | In | 5 | 3.5 | | 8.2 | 73 | – | – | |
| 5TH EMBODIMENT | PRESENT INVENTION (TOP PULSE PARAMETER USED) | ↑ | ↑ | 4.9 | | – | – | 10.5 | 61 | |
| 6TH EMBODIMENT | PRESENT INVENTION (TOP PULSE PARAMETER USED) | ↑ | 2 | 4.4 | | 8.7 | 69 | 10.2 | 64 | |
| 7TH EMBODIMENT | PRESENT INVENTION (TOP PULSE PARAMETER USED) | Ge, In | 9 | 4.7 | | 9.3 | 74 | 10.5 | 69 | |
| 8TH EMBODIMENT | PRESENT INVENTION (TOP PULSE PARAMETER USED) | Ge, In, Ag | 7 | 4.5 | | 8.5 | 71 | 10.1 | 66 | |
| 9TH EMBODIMENT | PRESENT INVENTION (TOP PULSE PARAMETER USED) | Ge, In, Tl | ↑ | ↑ | | 8.3 | 70 | 10.0 | 65 | |
| 10TH EMBODIMENT | PRESENT INVENTION (TOP PULSE PARAMETER USED) | Ge, In, Si | ↑ | ↑ | | 8.5 | 71 | 10.2 | 68 | |
| 11TH EMBODIMENT | PRESENT INVENTION (TOP PULSE PARAMETER USED) | Ge, In, Al | ↑ | ↑ | | 8.7 | 70 | 10.6 | 66 | |
| 12TH EMBODIMENT | PRESENT INVENTION (TOP PULSE PARAMETER USED) | Ge, In, Bi | 8 | 4.6 | | 8.5 | 68 | 10.7 | 63 | |
| 13TH EMBODIMENT | PRESENT INVENTION (TOP PULSE PARAMETER USED) | Ge, In, Ga | ↑ | ↑ | | 8.6 | 69 | 10.6 | 64 | |
| COMPARISON 1 | CONVENTIONAL MULTI-PULSE STRATEGY | Ge, In | 7 | 4.5 | | 9.9 | 50 | 16.2 | 41 | |
| COMPARISON 2 | ODS '00 Tech. Dig. PD1 STRATEGY | ↑ | ↑ | ↑ | | 10.4 | 70 | 15.2 | 66 | |
| COMPARISON 3 | MSG2B INCORPORATED 2T-BASED STRATEGY | ↑ | ↑ | ↑ | | 12.7 | 69 | 16.2 | 64 | IMPOSSIBLE AT OR OVER 4X SPEED |
| COMPARISON 4 | PRESENT INVENTION (TOP PULSE PARAMETER USED) | In | 5 | 3.1 | | – | – | – | – | |
| COMPARISON 5 | PRESENT INVENTION (TOP PULSE PARAMETER USED) | ↑ | ↑ | 5.3 | | – | – | – | 55 | MODULATION FACTOR OF 60% OR BELOW |
| COMPARISON 6 | PRESENT INVENTION (TOP PULSE PARAMETER USED) | Ge, In | 12 | 4.5 | | 14.1 | 71 | 17.3 | 68 | |
| COMPARISON 7 | PRESENT INVENTION (TOP PULSE PARAMETER USED) | NONE | 0 | 4.0 | | 10.3 | 69 | 10.7 | 64 | SIGNAL DETERIORATION AT 80°C |
| COMPARISON 8 | PRESENT INVENTION (TOP PULSE PARAMETER USED) | In, Co | 7 | 4.5 | | 17.4 | 65 | 20.3 | 60 | |

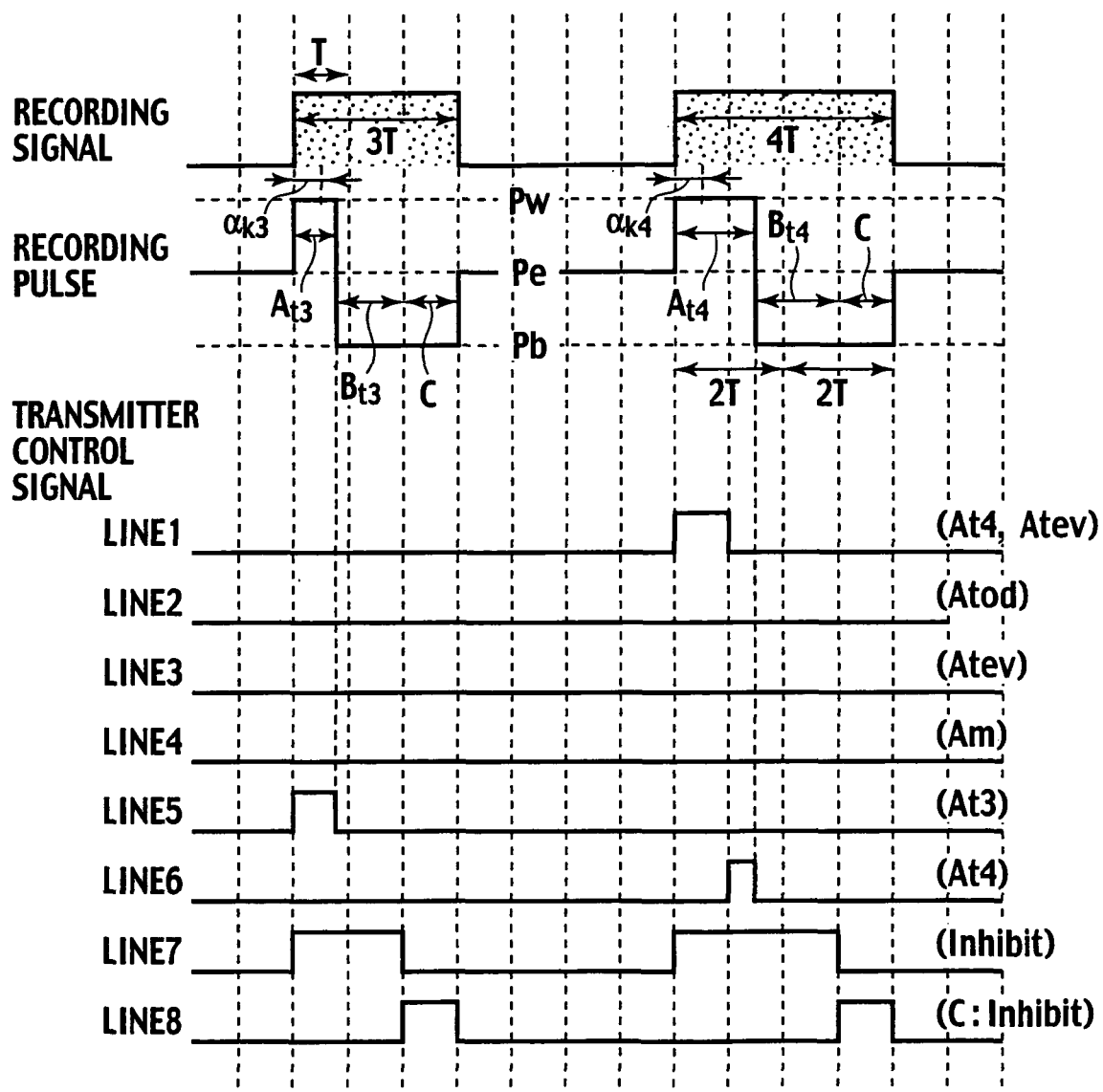

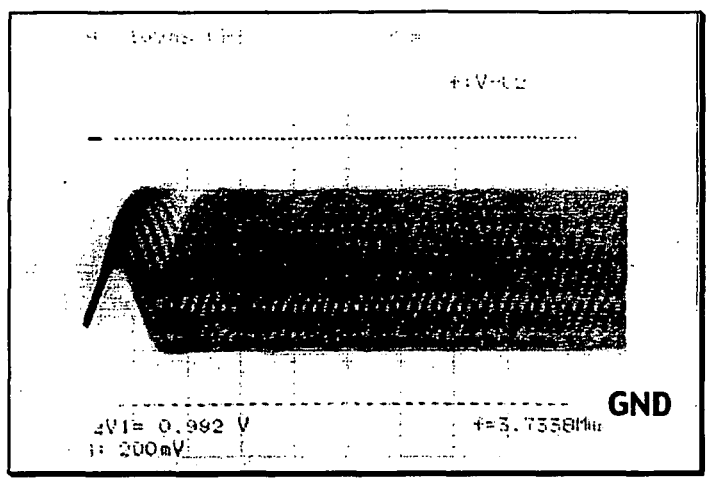
FIG.12A
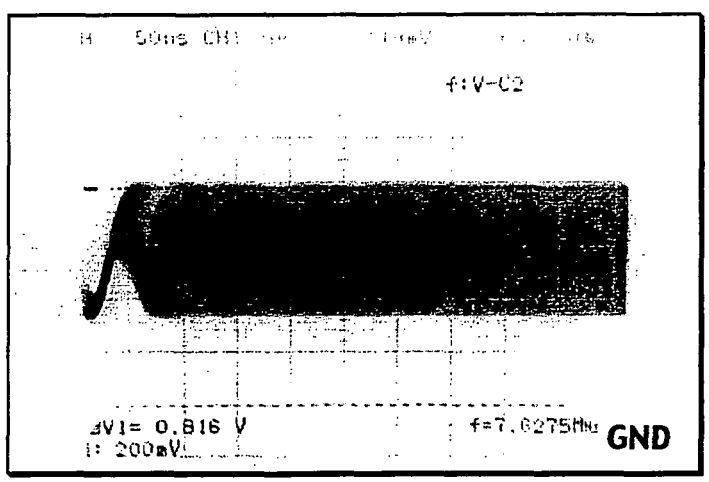
FIG.12B PRIOR ART
FIG.13
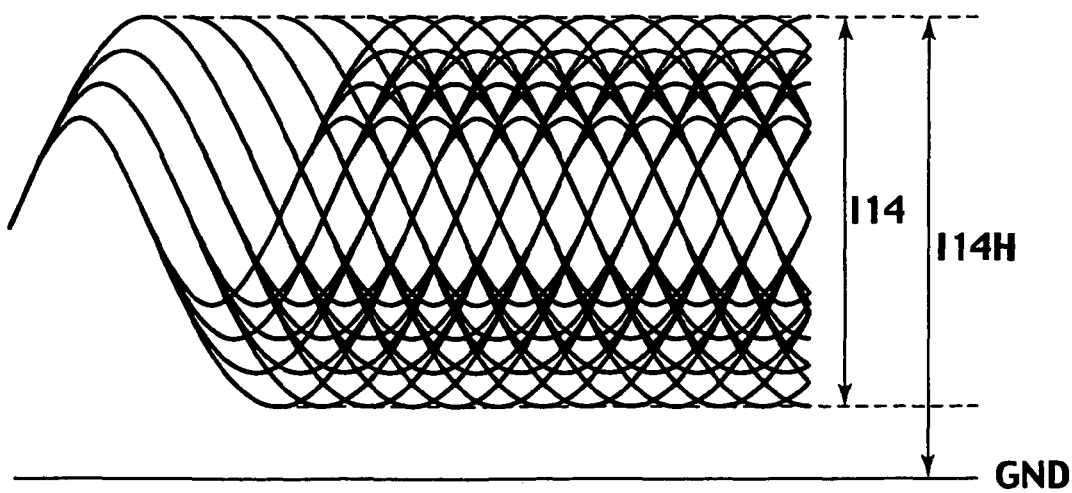

l 65/s l 65/s

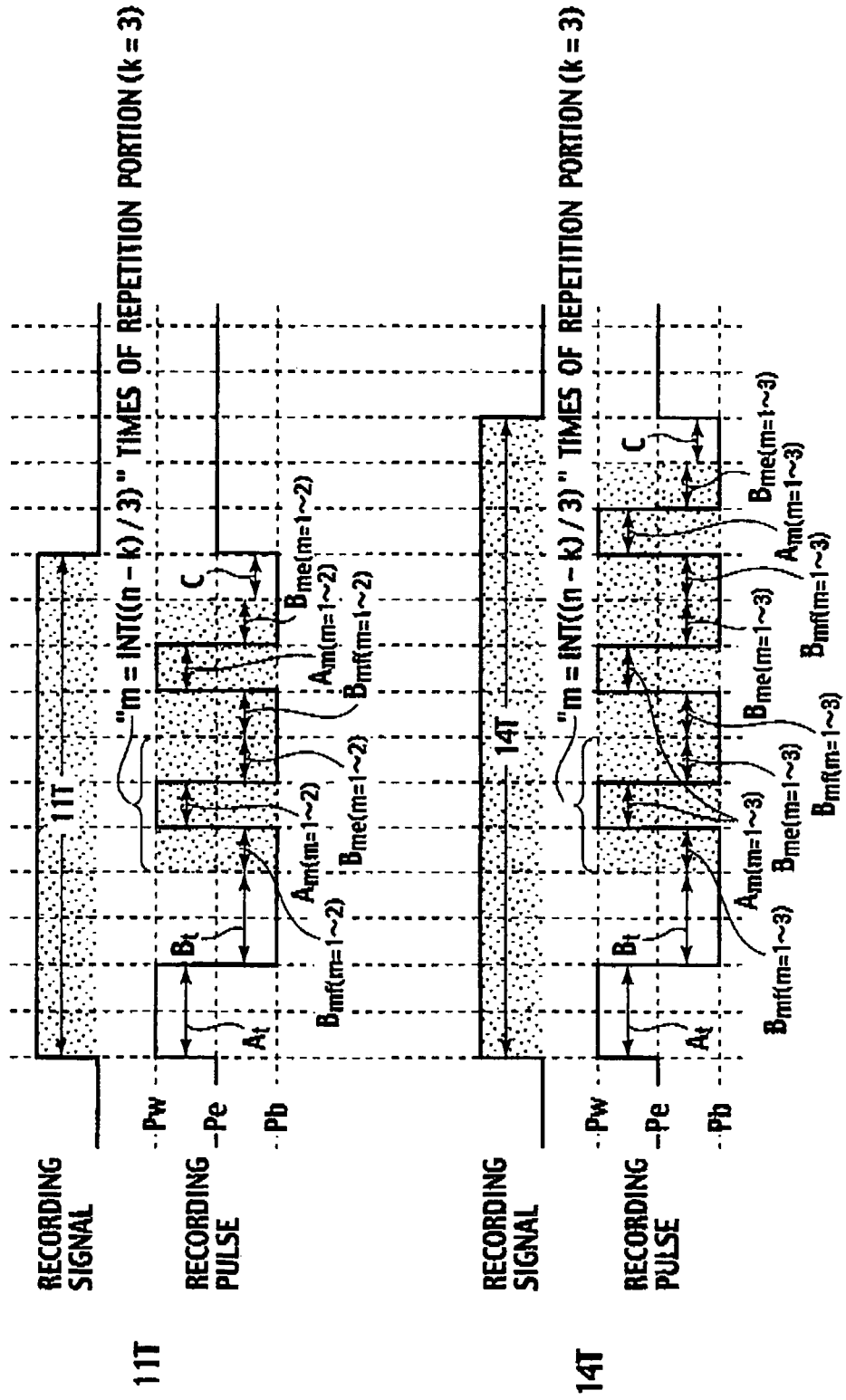

FIG.21

| | RECORDING METHOD (RECORDING PULSE STRING) | RECORDING FILM COMPOSITION | | | | 4X-SPEED RECORDING | | 6X-SPEED RECORDING | | OTHER |
|---|---|---|---|---|---|---|---|---|---|---|
| | | M | x | y/z | | JITTER (%) | MODULATION FACTOR (%) | JITTER (%) | MODULATION FACTOR (%) | |
| 21ST EMBODIMENT | PRESENT INVENTION | Ge, In | 7 | 4.5 | | 9.0 | 72 | 10.5 | 67 | |
| 22ND EMBODIMENT | PRESENT INVENTION (TOP PULSE DELAY USED) | ↑ | ↑ | ↑ | | — | — | 9.8 | 67 | |
| 23RD EMBODIMENT | PRESENT INVENTION | In | 5 | 3.5 | | 9.1 | 76 | — | — | |
| 24TH EMBODIMENT | PRESENT INVENTION | ↑ | ↑ | 4.9 | | — | — | 10.2 | 61 | |
| 25TH EMBODIMENT | PRESENT INVENTION | Ge | 2 | 4.4 | | 9.1 | 69 | 10.8 | 64 | |
| 26TH EMBODIMENT | PRESENT INVENTION | Ge, In | 9 | 4.7 | | 9.3 | 74 | 10.5 | 69 | |
| 27TH EMBODIMENT | PRESENT INVENTION | Ge, In, Ag | 7 | 4.5 | | 8.5 | 71 | 10.1 | 66 | |
| 28TH EMBODIMENT | PRESENT INVENTION | Ge, In, Tl | ↑ | ↑ | | 8.3 | 70 | 10.0 | 65 | |
| 29TH EMBODIMENT | PRESENT INVENTION | Ge, In, Si | ↑ | ↑ | | 8.5 | 71 | 10.2 | 68 | |
| 30TH EMBODIMENT | PRESENT INVENTION | Ge, In, Al | ↑ | ↑ | | 8.7 | 70 | 10.6 | 66 | |
| 31TH EMBODIMENT | PRESENT INVENTION | Ge, In, Bi | 8 | 4.6 | | 8.5 | 68 | 10.7 | 63 | |
| 32TH EMBODIMENT | PRESENT INVENTION | Ge, In, Ga | ↑ | ↑ | | 8.6 | 69 | 10.6 | 64 | |
| COMPARISON 21 | CONVENTIONAL MULTI-PULSE STRATEGY | Ge, In | 7 | 4.5 | | 9.9 | 50 | 16.2 | 41 | |
| COMPARISON 22 | ODS '00 Tech. Dig. PD1 STRATEGY | ↑ | ↑ | ↑ | | 10.4 | 70 | 15.2 | 66 | |
| COMPARISON 23 | MSG2B INCORPORATED 2T-BASED STRATEGY | ↑ | ↑ | ↑ | | 12.7 | 69 | 16.2 | 64 | |
| COMPARISON 24 | PRESENT INVENTION (TOP PULSE PARAMETER USED) | In | 5 | 3.1 | | — | — | — | — | IMPOSSIBLE AT OR OVER 4X SPEED |
| COMPARISON 25 | PRESENT INVENTION (TOP PULSE PARAMETER USED) | ↑ | ↑ | 5.3 | | — | — | — | 55 | |
| COMPARISON 26 | PRESENT INVENTION (TOP PULSE PARAMETER USED) | Ge, In | 12 | 4.5 | | 14.1 | 71 | 17.3 | 68 | MODULATION FACTOR OF 60% OR BELOW |
| COMPARISON 27 | PRESENT INVENTION (TOP PULSE PARAMETER USED) | NONE | 0 | 4.0 | | 10.3 | 69 | 10.7 | 64 | |
| COMPARISON 28 | PRESENT INVENTION (TOP PULSE PARAMETER USED) | In, Co | 7 | 4.5 | | 17.4 | 65 | 20.3 | 60 | SIGNAL DETERIORATION AT 80°C |

FIG.23

| FIELD ID | INFORMATION TO BE RECORDED | POSITION |
|---|---|---|
| ID0 | ECC BLOCK ADDRESS | DATA AREA |
| ID1 | APPLICATION CODE, ETC. | LEAD-IN AREA |
| ID2 | OPC RECOMMENDED CODE/WRITE STRATEGY CODE 1 | LEAD-IN AREA |
| ID3 | MANUFACTURER ID1 | LEAD-IN AREA |
| ID4 | MANUFACTURER ID2 | LEAD-IN AREA |
| ID5 | WRITE STRATEGY CODE 2 | LEAD-IN AREA |

FIG.24

| FIELD ID | INFORMATION TO BE RECORDED | POSITION |
|---|---|---|
| ID0 | ECC BLOCK ADDRESS | DATA AREA |
| ID1 | APPLICATION CODE, ETC. | LEAD-IN AREA |
| ID2 | OPC RECOMMENDED CODE/WRITE STRATEGY CODE 1(1X) | LEAD-IN AREA |
| ID3 | MANUFACTURER ID1 | LEAD-IN AREA |
| ID4 | MANUFACTURER ID2 | LEAD-IN AREA |
| ID5 | WRITE STRATEGY CODE 2(1X) | LEAD-IN AREA |
| ID6 | OPC RECOMMENDED CODE/WRITE STRATEGY CODE 1(2X) | LEAD-IN AREA |
| ID7 | WRITE STRATEGY CODE 2(2X) | LEAD-IN AREA |
| ... | | |
| ... | | |
| IDn | OPC RECOMMENDED CODE/WRITE STRATEGY CODE 1(mX) | LEAD-IN AREA |
| IDn+1 | WRITE STRATEGY CODE 2(mX) | LEAD-IN AREA |

FIG.25

FIELD ID0

| FRAME | INFORMATION TO BE RECORDED | POSITION |
|---|---|---|
| 0-2 | ECC BLOCK ADDRESS | PART A |
| 3-5 | PARITY | |
| 6 | FIELD ID VALUE | PART B |
| 7-9 | ECC BLOCK ADDRESS | |
| 10-12 | RESERVED | |
| 13-15 | PARITY | |

FIG.26

FIELD ID2

| FRAME | INFORMATION TO BE RECORDED | POSITION |
|---|---|---|
| 0-2 | ECC BLOCK ADDRESS | PART A |
| 3-5 | PARITY | |
| 6 | FIELD ID VALUE | PART B |
| 7-8 | OPC RECOMMENDED CODE | |
| 9-12 | WRITE STRATEGY CODE 1 | |
| 13-15 | PARITY | |

FIG.27

FIELD ID5

| FRAME | INFORMATION TO BE RECORDED | POSITION |
|---|---|---|
| 0-2 | ECC BLOCK ADDRESS | PART A |
| 3-5 | PARITY | |
| 6 | FIELD ID VALUE | PART B |
| 7-10 | WRITE STRATEGY CODE 2 | |
| 11-12 | MULTIPLIED SPEED VALUE (1X) | |
| 13-15 | PARITY | |

FIG.28

FIELD Idn(6)

| FRAME | INFORMATION TO BE RECORDED | POSITION |
|---|---|---|
| 0-2 | ECC BLOCK ADDRESS | PART A |
| 3-5 | PARITY | |
| 6 | FIELD ID VALUE | PART B |
| 7-8 | OPC RECOMMENDED CODE | |
| 9-12 | WRITE STRATEGY CODE 1 | |
| 13-15 | PARITY | |

FIG.29

FIELD IDn+1(7)

| FRAME | INFORMATION TO BE RECORDED | POSITION |
|---|---|---|
| 0-2 | ECC BLOCK ADDRESS | PART A |
| 3-5 | PARITY | |
| 6 | FIELD ID VALUE | PART B |
| 7-10 | WRITE STRATEGY CODE 2 | |
| 11-12 | MULTIPLIED SPEED VALUE (mX) | |
| 13-15 | PARITY | |

FIG.30

| FIELD ID | INFORMATION TO BE RECORDED | ADDRESS NO. |
|---|---|---|
| ID1 | LEAD-IN START POSITION | FFDD05h |
| ID2 | | . . . |
| ID3 | | |
| ID4 | | |
| ID5 | | |
| . . . | | |
| IDn | | |
| IDn+1 | | |
| ID1 | | |
| ID2 | | |
| ID3 | | |
| ID4 | | |
| ID5 | | |
| . . . | | |
| IDn | | |
| IDn+1 | | |
| . . . | | |
| No Data | READABLE EMBOSS START POSITION | |
| No Data | | |
| . . . | | |
| No Data | | |
| No Data | READABLE EMBOSS END POSITION | |
| . . . | | |
| ID1 | | |
| ID2 | | |
| ID3 | | |
| ID4 | | |
| ID5 | | |
| . . . | | |
| IDn | | |
| IDn+1 | | |
| ID0 | | |
| . . . | | . . . |
| ID0 | LEAD-IN END POSITION | FFD000h |
| ID0 | DATA START POSITION | FFCFFFh |
| ID0 | | |

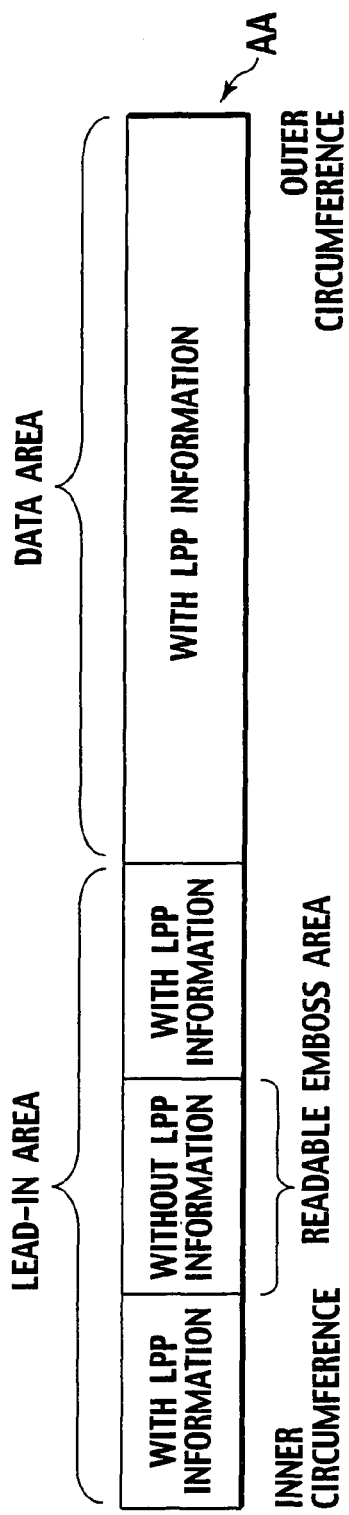

RMD FIELD 1

| BYTE POSITION | INFORMATION TO BE RECORDED | NUMBER OF BYTES |
|---|---|---|
| 0 to 31 | APPARATUS MANUFACTURE ID | 32 |
| 32 to 47 | SERIAL No. | 16 |
| 48 to 63 | MODEL No. | 16 |
| 64 to 67 | STRATEGY CODE 1 | 4 |
| 68 to 71 | RECORDING POWER | 4 |
| 72 to 79 | DATE AND TIME INFORMATION | 8 |
| 80 to 83 | RECORDING CALIBRATION POSITION | 4 |
| 84 to 107 | RUNNING OPC INFORMATION | 24 |
| 108 to 113 | STRATEGY CODE 2 | 6 |
| 114 to 115 | ERASE POWER | 2 |
| 116 to 117 | RECORDING POWER (8-BIT CONVERSION) | 2 |
| 118 to 119 | OPTIMUM RECORDING INFORMATION | 2 |
| 120 to 121 | MULTIPLIED SPEED INFORMATION | 2 |
| 122 to 121 | RESERVED | 6 |

OPTICAL RECORDING METHOD, OPTICAL RECORDING MEDIUM, OPTICAL RECORDING MEDIUM RECORDING APPARATUS, OPTICAL RECORDING APPARATUS, OPTICAL DISK, AND OPTICAL DISK RECORDING/REPRODUCING APPARATUS

TECHNICAL FIELD

The present invention relates to an optical recording method; an optical recording apparatus; and an optical recording medium recording apparatus that are capable of recording information on a phase-change optical recording medium such as an optical disk and an optical card at a high multiplied speed (at least a quadruple speed); an optical recording medium used for these optical recording method, optical recording apparatus, and optical recording medium recording apparatus, recordable at a high multiplied speed; an optical disk; and an optical disk recording/reproducing apparatus for recording/reproducing information on and from the optical disk.

BACKGROUND ART

A conventional phase-change recording medium that is repeatedly rewritable and an optical recording method for such a medium will be explained below.

For recording, a laser beam pulse is applied (emitted) to a phase-change recording medium to melt and quench a recording layer and form an amorphous recorded mark on the recording layer. The reflectance of this recorded mark is lower than that of a crystallized state of the recording layer and is optically readable as recorded information. To erase the recorded mark, laser power smaller than recording power is applied to heat the recording layer to a temperature above a crystallization temperature and below a melting point, or a temperature above the melting point. Thereafter, the recording layer is annealed to change the amorphous state into a crystallized state. This realizes overwriting.

Materials favored for such a recording layer include a Ge—Sb—Te alloy and an Ag—In—Sb—Te alloy due to their quick crystallization speed. These recording layer materials are used for CD-RWs, DVD-RAMs, DVD-RWs, DVD+RWs, and the like. (Hereinafter, CD indicates a compact disk and DVD a digital versatile disk.) An optical recording medium employing a recording layer made of such recording materials usually has a dielectric layer, which is heat resistive and transparent, on each face of the recording layer, to prevent the deformation and cracking of the recording layer during recording.

If the dielectric layer contains a ZnS component, an interface layer made of nitride or oxide may be arranged on one or both faces of the recording layer, to prevent S from penetrating the recording layer. On the dielectric layer opposite to a laser beam incident direction, a metal reflective layer mainly containing Al, Ag, or the like is laminated, to realize a high reflectance.

Optical recording methods of recording information on the phase-change recording medium of the above-mentioned configuration are disclosed in Japanese Patent Publication No. 2765938, Japanese Patent Publication No. 3266971, and Japanese Patent Publication No. 3171103 explained below. These recording methods modulate laser beam pulses of high power according to mark lengths to be recorded on a recording layer of a phase-change recording medium. To prevent mark thickening at a mark trailing edge of a long mark, these methods employ a multi-pulse optical recording strategy that divides a pulse within a clock period T.

FIG. 1 is a view showing recording pulses according to a multi-pulse strategy of a conventional optical recording method. In FIG. 1, T represents a clock period.

As shown in FIG. 1, the laser power of a laser beam is modulated with three values, i.e., recording power Pw, erase power Pe, and bias power Pb (Pw>Pe>Pb), to generate recording pulses corresponding to recording signals (rectangular pulses) having lengths 3T and 5T, thereby forming marks having lengths 3T and 5T on a recording layer of a medium.

The recording pulses corresponding to the rectangular pulse of length 3T are multi-pulses consisting of a top pulse $T_{top}$, an intermediate pulse $T_{mp}$, and a rear-end pulse $T_{cl}$ arranged in series. The recording pulses corresponding to the rectangular pulse of length 5T are multi-pulses consisting of a top pulse $T_{top}$, three intermediate pulses $T_{mp}$, and a rear-end pulse $T_{cl}$ arranged in series.

Recent phase-change recording media have high recording density, and therefore, need high recording speed. In practice, rewritable DVD media (DVD-RAMs, DVD-RWs, DVD+RWs, and the like) involve a maximum linear speed of 2.4 times (in terms of DVD speed) a normal recording speed (=single speed=3.5 m/s). Even at such a high multiplied speed, completely writing a 4.7-GB DVD medium needs 25 minutes, which is not sufficiently practical.

To improve practicality, the recording speed must further be increased. Even if the recording speed is increased, factors mentioned below prevent marks from being properly recorded on a recording layer of a DVD medium.

A first factor is that increasing a recording linear speed necessitates increasing write laser power (laser strength). Consumer lasers of relatively low price used for DVD medium recorders and the like hardly provide laser strength sufficient for high-speed recording.

A second factor is that the responsibility of divided pulses (multi-pulses) of recording laser power is poor. For example, a sextuple linear speed (21 m/s) for a DVD medium corresponds to a clock period of about 6.3 ns. With this clock period, the recording strategy (FIG. 1) using conventional multi-pulses needs a short pulse width of about 2.5 ns calculated from pulse width=clock period (sextuple speed of 6.3 ns)×duty factor (for example, 40%).

A current laser needs about 3.0 ns in total for the rise and fall of a rectangular pulse. Accordingly, a pulse having the above-mentioned pulse width of about 2.5 ns becomes an incomplete rectangular wave, or a triangular wave whose peak power is below a set value (recording power level Pw or bias power level Pb). Then, it is difficult to apply a set heat quantity to the recording layer of a medium. This results in forming a mark not having a specified shape.

A third factor is that the material of a recording layer of a DVD medium is incapable of coping with high-speed divided pulses of recording laser power. To cope with high-speed recording, the material of a recording layer tends to be adjusted in a direction of easy crystallization. This is equal to a direction of making it difficult to achieve an amorphous state at a given cooling speed.

When high-speed divided pulses are used, a time for applying divided pulses extends as the length of a mark elongates, to achieve an annealing thermal history as a whole. Accordingly, a recording layer made for quick crystallization speed easily crystallizes. Then, the longer the length of a mark, the thinner the mark becomes, to provide an insufficient signal amplitude.

To solve the problem that improving a recording speed results in deteriorating the shape of a mark recorded on a recording layer, there is an optical recording method that employs a string of 2T-based recording pulses. Optical Data Storage Conference 2000 (ODS '00), Technical Digest PD1, "High speed rewritable DVD up to 20 m/s with nucleation-free eutectic phase-change material of Ge $(Sb_{70}Te_{30})$+Sb" discloses an optical recording method that conducts 4.8×-speed recording on a DVD medium by providing high-speed divided pulses of write laser power such that a recording power period reaching a recording power level Pw and a bias power period reaching a bias power level Pb are contained within a double clock period of 2T.

FIG. 2 is a view showing a 2T-based recording pulse string according to the Technical Digest PD1 of ODS '00.

As shown in FIG. 2, marks having lengths 4T and 8T corresponding to even numbers (4 and 8) of times the clock period T, respectively, are formed by applying N (=n/2=2 and 4 (n corresponding to a mark length)) rectangular pulses serving as recording pulses to the laser power of a recording laser beam. To form marks having lengths 3T and 9T corresponding to odd numbers (3 and 9) of times the clock period T, N (=(n−1)/2=1 and 4 (n corresponding to a mark length)) rectangular pulses serving as recording pulses are applied to the laser power of a recording laser beam.

The optical recording method employing 2T-based recording pulse strings expands the width of each divided recording pulse. Compared with the conventional method, this method can secure the rise and fall time of a recording pulse of recording laser power, to provide a complete rectangular pulse. As a result, the rectangular pulse can have a peak level that sufficiently reaches the recording power level Pw or the bias power level Pb. Extending a period of bias power results in achieving a quenching schedule to provide a specified recording pulse signal amplitude with a consumer laser having relatively low recording power.

When forming a mark of length 4T corresponding to a length four times the clock period T, two pulses must be included within a recording signal period of 4T. At this time, it is difficult to sufficiently extend a period of bias power. Namely, it is difficult to secure a sufficient annealing time. This may cause no problem for 4.8×-speed recording on a DVD medium. However, for 6×-speed recording on a DVD medium, the clock period T is further shortened to make it difficult to secure sufficient recording conditions for the above-mentioned optical recording method.

A PULSTEC MSG2B signal generator already marketed incorporates a circuit for carrying out a multi-pulse strategy based on 2T-based recording pulse strings with pulse-width-changed recording pulses generated within a double clock period of 2T.

FIG. 3 is a view showing 2T-based recording pulse strings incorporated in the PULSTEC MSG2B signal generator.

Like the optical recording method (FIG. 2) employing divided pulses of recording power and bias power contained within 2T, the optical recording method (FIG. 3) can secure a specified recording pulse signal amplitude with relatively low recording power.

However, the end of a recording pulse corresponding to a mark length includes a modulated pulse (a relatively thin pulse in FIG. 3) within a clock period of 1T. This results in an insufficient bias power time and an insufficient annealing time corresponding thereto.

This may cause no annealing problem for 4.8×-speed recording on a DVD medium. However, for 6×-speed recording on a DVD medium, the clock period T is further shortened to cause the annealing problem and insufficient recording characteristics.

When recording information on a DVD medium at or above 6× linear speed, the multi-pulse strategy employing 2T-based recording pulse strings causes the problem of insufficiently keeping a bias power time at the end of a recording pulse. This causes a shortage of annealing time and a thinning phenomenon at the end of a mark recorded on a recording layer. This is the problem to be solved by the present invention.

If there is an optical recording method capable of solving the problem of an insufficient bias power time and securing a sufficient bias power time as well as a sufficient annealing time, the thinning phenomenon at the end of a mark recorded on a recording layer of a DVD medium will not occur.

One solution may be to particularly consider the rise of a top pulse or the fall of a rear-end pulse in the multi-pulse strategy employing 2T-based recording pulse strings. This solution, however, involves an inconvenience of causing recording characteristic differences between recording pulses for forming a mark (having a length of, for example, 2T, 4T, and the like) corresponding to an even number of recording clock periods T and recording pulses for forming a mark (having a length of, for example, 3T, 5T, and the like) corresponding to an odd number of recording clock periods T.

More precisely, like the optical recording method shown in FIG. 2, multi-pulses are formed so that a time for recording power Pw and a time for bias power Pb are contained within 2T. If the trailing edge of a recording pulse is adjusted to the training edge of a recording signal, the width of an intermediate pulse existing between a top pulse and a rear-end pulse must be adjusted. For this, an adjusting width of (½)T is needed.

The optical recording method of FIG. 3 adjusts the rise of a top pulse of recording pulses to a position 1T after the rise of a recording signal. Accordingly, if the trailing edge of a recording pulse is adjusted to the trailing edge of the recording signal, the width of an intermediate pulse existing between the top pulse and rear-end pulse must be adjusted. For this, an adjusting width of (½)T is needed.

According to a PWM method, the width of a recorded mark has information. Accordingly, it is necessary to record a mark without distortion. Namely, it is necessary to record a mark on a recording film in a front-rear symmetrical manner. A part of a disk irradiated with a laser beam when recording a signal involves a higher temperature at an end point than a start point due to a heat accumulating effect. As a result, a recorded mark is wider at its rear end than at its front end. Namely, the recorded mark has a teardrop shape having a thin front end and a thick rear end. This sort of thermal recording is known to change recording conditions depending on recording speed variations.

In connection with this, Japanese Unexamined Patent Application Publication No. 2001-209940 of this applicant records temporal information (strategy) with pre-pits on a disk, the temporal information including maker's optimum recording power, optimum erase power, a top pulse width, an intermediate multi-pulse width, a rear-end pulse width, and the like. This is because each disk has specific optimum recording power, optimum erase power, a top pulse width, an intermediate multi-pulse width, a rear-end pulse width, and the like. Due to a rapid advance of multiplied speed, there is available information for 1× speed (a linear speed of 3.49 m/s) but no information is available for high multiplied speed. For example, if there is a disk compatible with three multiplied speeds of 1×, 2× (a linear speed of 3.49*2 m/s), and 4× (a linear speed of 3.49*4 m/s) and if there is information only for 1× speed, an apparatus compatible with 1×, 2×, and 4× speeds can record information on the disk only at 1× speed, or at 4× speed through time consuming processes of testing recording power and strategy and finding optimum power for 4× speed. However, keeping a user waiting several tens of seconds is not acceptable for a commercial commodity.

If there is a disk compatible with 1×, 2×, and 4× speeds and if there is only information about 1× and 4× speeds, an apparatus compatible with 1×- and 2×-speed recording can record information on the disk only at 1× speed, or at 2× speed through time consuming processes of testing recording power and strategy and finding optimum power for 2× speed.

For a high-density recordable medium in the future, it is necessary to record recording conditions, in particular, strategies for various rotation speeds of the disk. Then, it will be possible to start recording at any speed and shorten a start time. This is an essential requirement for replacing VTRs with disks.

To record such recording conditions on a disk, there is an areal limit on the disk. Expecting, for example, 24×-speed recording, current CD-Rs may secure an area for storing recording conditions related to 1×, 2×, 4×, 6×, 8×, 12×, and 16× speeds. For DVD-R/RWs, however, it is unknown how many years it will take to reach such multiple speeds. It is also unknown the highest multiplied speed for which the disks must be prepared. There is a problem of wasting the area for high multiplied speeds until the speeds are materialized. Namely, there is a requirement to effectively use the area now and in the future.

The present invention has been devised in consideration of these requirements. An object of the present invention is to provide an optical recording method of conducting a recording strategy using multi-pulses on, for example, a DVD medium at a high linear speed equal to or higher than 6× speed. The method solves the problem of an insufficient bias power time that may result in a shortage of annealing time and an incomplete shape of a mark. To form a mark having a correct shape, the method does not adjust the position of a top pulse or a rear-end pulse of multi-pulses. Instead, the method always synchronizes the fall of a recording signal having a length nT with the fall a rear-end pulse of multi-pulses by controlling the width of a top pulse of the multi-pulses that rises in synchronization with the rise of the recording signal according to whether the length of the recording signal is odd or even. In addition, the method employs intermediate pulses whose number and position are determined according to the length of the recording signal. Also provided is an optical recording medium used for high linear speed recording achieved by the optical recording method and having recording characteristics capable of forming a mark of specified shape. Also provided is an optical recording apparatus used for conducting recording according to the optical recording method and having a determination unit to determine whether or not the length of a recording signal is even or odd. Also provided is an optical recording medium recording apparatus for forming a mark of specified shape on an optical recording medium according to the optical recording method.

Another object of the present invention is to provide an optical disk capable of coping with rapidly advancing high multiplied speed without changing standards, consuming environmental energy, or modifying equipment design, capable of realizing smooth standardization to expedite market advancement, and capable of coping with multiple speeds while eliminating useless information, effectively improving redundancy, and effectively using areas.

Still another object of the present invention is to provide an optical disk recording/reproducing apparatus capable of grasping multiple speeds with which an optical disk to record or reproduce copes, selecting an optimum multiplied speed for the optical disk to record information thereon, dropping an equipment's standard multiplied recording speed to a recordable speed if the optical disk is suffered from a temperature increase, surface misalignment, or eccentricity, and easily, quickly, reliably reading information from an optical disk that is compatible with multiple speeds, has no useless information, and includes high redundancy.

Still another object of the present invention is to provide an optical disk having a recording management information area and an information recording area. Recording power and recording strategy information for recording data in the information recording area modulate laser power with recording power Pw, erase power Pe, bias power Pb (Pw>Pe>Pb) to form a mark corresponding to data having a length nT (n being an integer and T being a clock period of recording data) according to a linear speed at which the data is recorded on the optical disk. There are a plurality of the recording management information areas corresponding to multiplied-speed information, to beforehand store recording strategy information for changing, at a low linear speed, the time widths of a top pulse, an intermediate multi-pulse, and a rear-end cooling power section among divided recording pulses for forming a mark, as well as recording strategy information for changing, at a high linear speed, the time widths of a bias power section, a rear-end recording pulse section, and a cooling power section among divided recording pulses for forming a mark according to a period pT or a period 2T, i.e., according to a clock based on the length of recording data whose basic period is pT obtained by dividing the frequency of a clock period T by p (or recording data of a period 2T obtained by halving the frequency of the clock period T). Also provided is an optical disk recording/reproducing apparatus for recording/reproducing data to and from the optical disk, reading recording power and recording strategy information corresponding to an objective multiplied speed from the recording power and recording strategy information pieces beforehand recorded in the information management areas of the optical disk, and according to the read recording power and record strategy, recording information in the information recording area of the optical disk.

DISCLOSURE OF THE INVENTION

In order to accomplish the objects mentioned above, the present invention provides optical recording methods, optical recording media, optical recording medium recording apparatuses, optical recording apparatuses, optical disks, and optical disk recording/reproducing apparatuses having the below-mentioned configurations (1) to (37).

(1) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting constant strength periods of the recording power Pw as $A_tT, A_1T, \ldots$ and $A_mT$; setting constant strength periods of the bias power Pb as $B_tT, B_1T, \ldots, B_mT$, and CT (C=−1 to 3); and dividing the application of the irradiating laser beam into pulses in order of $A_tT, B_tT, A_tT, B_1T, \ldots, A_mT, B_mT$, and CT (m=(n−k)/2, k=3 (if n is an odd number), or k=4 (if n is an even number)) (where the constant strength period of the recording power Pw for n=3, n=4, n≥5 (odd number), and n≥6 (even number) is set as $A_{t3}$, $A_{t4}$, $A_{tod}$, and $A_{tev}$ ("od" indicating an odd number and "ev" indicating an even number), the constant strength period of the bias power Pb for n=3, n=4, n≥5 (odd number), and n≥6 (even number) is set as $B_{t3}$, $B_{t4}$, $B_{tod}$, and $B_{tev}$, and then, $A_{t3}+B_{t3}=A_{tod}+B_{tod}=A_m+B_m=2T$ and $A_{t4}+B_{t4}=A_{tev}+B_{tev}=3T$).

(2) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting constant strength periods of the recording power Pw as $A_tT$, $A_1T$, ..., and $A_mT$; setting constant strength periods of the bias power Pb as $B_tT$, $B_{1f}T$, $B_{1e}T$, ..., $B_{mf}T$, $B_{me}T$, and CT (C=−1 to 3) ("f" indicating just before any one of intermediate pulses 1 ... m and "e" indicating just after the intermediate pulse); and dividing the application of the irradiating laser beam into pulses in order of $A_tT$, $B_tT$, $B_{1f}T$, $A_1T$, $B_{1e}T$, ..., $B_{mf}T$, $A_mT$, $B_{me}T$, and CT (m=INT((n−k)/3), where K=3, 4 or 5 and INT is a conversion into an integer closer to 0 and m is the number of the intermediate pulses) (where the constant strength period of the recording power Pw for n=3, n=4, n=5, n≥6 (n=3l), n≥7 (n=3l+1), and n≥8 (n=3l+2) with l being a natural number is set as $A_{t3}$, $A_{t4}$, $A_{t5}$, $A_{t0}$, $A_{t1}$, and $A_{t2}$, the constant strength period of the bias power Pb for n=3, n=4, n=5, n≥6 (n=3l), n≥7 (n=3l+1), and n≥8 (n=3l+2) is set as $B_{t3}$, $B_{t4}$, $B_{t5}$, $B_{t0}$, $B_{t1}$, and $B_{t2}$, and then, $A_{t3}+B_{t3}=A_{t0}+B_{t0}=2T$, $A_{t4}+B_{t4}=A_{t1}+B_{t1}=B_{mf}+A_m+B_{me}=3T$, and $A_{t5}+B_{t5}=A_{t2}+B_{t2}=4T$).

(3) According to a preferred embodiment, the optical recording method stipulated in (1) is characterized in that the constant strength period of the recording power Pw is changed depending on n=3, n=4, n≥5 (n being an odd number), and n≥6 (n being an even number) as having parameters of $A_{t3}$ (n=3), $A_{t4}$ (n=4), $A_{tod}$ (n≥5), and $A_{tev}$ (n≥6), respectively.

(4) According to a preferred embodiment, the optical recording method stipulated in (2) is characterized in that the constant strength period of the recording power Pw is changed depending on n=3, n=4, n=5, n≥6 (n=3l), n≥7 (n=3l+1), and n≥8 (n=3l+2) with l being a natural number as having parameters of $A_{t3}$ (n=3), $A_{t4}$ (n=4), $A_{t5}$ (n=5), $A_{t0}$ (n≥6), $A_{t1}$ (n≥7), and $A_{t2}$ (n≥8), respectively.

(5) According to a preferred embodiment, the optical recording method stipulated in any one of (1) and (3) is characterized in that, if a space that is present just before the mark of length nT and has a length αT (α being an integer equal to or greater than 3) satisfies α=3, α=4, or α≥5, a rise point of the constant strength period $A_{t3}$, $A_{t4}$, $A_{tod}$, or $A_{tev}$ of the recording power Pw is delayed from a rise point of the data by a predetermined time.

(6) According to a preferred embodiment, the optical recording method stipulated in any one of (2) and (4) is characterized in that, if a space that is present just before the mark of length nT and has a length αT (α being an integer equal to or greater than 3) satisfies α=3, α=4, α=5, or α≥6, a rise point of the constant strength period $A_{t3}$, $A_{t4}$, $A_{t5}$, $A_{t0}$, $A_{t1}$, or $A_{t2}$ of the recording power Pw is delayed from a rise point of the data by a predetermined time.

(7) There is provided a phase-change optical recording medium including a substrate having a light incident face to which an irradiating laser beam used for the optical recording method stipulated in any one of (1) to (6) is made incident, at least a first protective layer, a recording layer, a second protective layer, and a reflective layer being successively laminated on the substrate, the irradiating laser beam forming on the recording layer a mark corresponding to data having a length nT (n being an integer equal to or greater than 3 and T being a clock period). The recording layer has an alloy composition of MxSbyTez (0.02≤x≤0.10, 3.4≤(y/z)≤5.0, M being at least one of Ge, In, Ag, Si, Al, Ti, Bi, and Ga). The recording layer has a film thickness of 10 nm to 20 nm. The first protective layer has a film thickness of 50 nm to 70 nm. The second protective layer has a film thickness of 10 nm to 20 nm. The reflective layer is made of metal whose main component is Ag.

(8) According to a preferred embodiment, the optical recording medium stipulated in (7) has a physical shape in which the recording layer is provided with, before data recording, marks formed according to the optical recording method stipulated in any one of (1) to (6).

(9) There is provided an optical recording medium recording apparatus for forming and recording on an optical recording medium a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The apparatus includes means for setting constant strength periods of the recording power Pw as $A_tT$, $A_1T$, ..., and $A_mT$; means for setting constant strength periods of the bias power Pb as $B_tT$, $B_1T$, ..., $B_mT$, and CT (C=−1 to 3); and means for dividing the application of the irradiating laser beam into pulses in order of $A_tT$, $B_tT$, $A_1T$, $B_1T$, ..., $A_mT$, $B_mT$, and CT (m=(n−k)/2, k=3 (if n is an odd number), or k=4 (if n is an even number)) (where the constant strength period of the recording power Pw for n=3, n=4, n≥5 (odd number), and n≥6 (even number) is set as $A_{t3}$, $A_{t4}$, $A_{tod}$, and $A_{tev}$ ("od" indicating an odd number and "ev" indicating an even number), the constant strength period of the bias power Pb for n=3, n=4, n≥5 (odd number), and n≥6 (even number) is set as $B_{t3}$, $B_{t4}$, $B_{tod}$, and $B_{tev}$, and then, $A_{t3}+B_{t3}=A_{tod}+B_{tod}=A_m+B_m=2T$ and $A_{t4}+B_{t4}=A_{tev}+B_{tev}=3T$).

(10) There is provided an optical recording medium recording apparatus for forming and recording on an optical recording medium a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The apparatus includes means for setting constant strength periods of the recording power Pw as $A_tT$, $A_1T$, ..., and $A_mT$; means for setting constant strength periods of the bias power Pb as $B_tT$, $B_{1f}T$, $B_{1e}T$, ..., $B_{mf}T$, $B_{me}T$, and CT (C=−1 to 3) ("f" indicating just before any one of intermediate pulses 1 ... m and "e" indicating just after the intermediate pulse); and means for dividing the application of the irradiating laser beam into pulses in order of $A_tT$, $B_tT$, $B_{1f}T$, $A_1T$, $B_{1e}T$, ..., $B_{mf}T$, $A_mT$, $B_{me}T$, and CT (m=INT((n−k)/3), where K=3, 4 or 5 and INT is a conversion into an integer closer to 0 and m is the number of the intermediate pulses) (where the constant strength period of the recording power Pw for n=3, n=4, n=5, n≥6 (n=3l), n≥7 (n=3l+1), and (n=3l+2) with l being a natural number is set as $A_{t3}$, $A_{t4}$, $A_{t5}$, $A_{t0}$, $A_{t1}$, and $A_{t2}$, the constant strength period of the bias power Pb for n=3, n=4, n=5, n≥6 (n=3l), n≥7 (n=3l+1), and (n=3l+2) is set as $B_{t3}$, $B_{t4}$, $B_{t5}$, $B_{t0}$, $B_{t1}$, and $B_{t2}$, and then, $A_{t3}+B_{t3}=A_{t0}+B_{t0}=2T$, $A_{t4}+B_{t4}=A_{t1}+B_{t1}=B_{mf}+A_m+B_{me}=3T$, and $A_{t5}+B_{t5}=A_{t2}+B_{t2}=4T$).

(11) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting the number m of constant strength pulses of the recording power Pw as m=(n−k)/2, where k=3 (if n is an odd number) or k=4 (if n is an even number).

(12) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting the number m of constant strength pulses of the recording power Pw as m=(n−k)/2, where k=3 (if n is an odd number) or k=4 (if n is an even number); and for recording pulses corresponding to data having a length nT (n≥5) and sequentially consisting of a top pulse, intermediate pulses, and a rear-end pulse, substantially inverting a phase of intermediate pulses among recording pulses representative of a mark whose n is an odd number equal to or greater than 5 relative to a phase of intermediate pulses among recording pulses representative of a mark whose n is an even number equal to or greater than 6.

(13) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting the number m of constant strength pulses of the recording power Pw as m=INT((n−3)/3), where INT is a conversion into an integer closer to 0.

(14) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting the number m of constant strength pulses of the recording power Pw as m=INT((n−3)/3), where INT is a conversion into an integer closer to 0; and for recording pulses corresponding to data having a length nT (n≥6) and sequentially consisting of a top pulse, intermediate pulses, and a rear-end pulse, advancing or delaying a phase of intermediate pulses by 120 degrees between n=3l, n=3l+1, and n=3l+2 (l being a natural number).

(15) There is provided an optical recording apparatus for forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The apparatus includes determination means for determining whether the data of length nT is odd or even; top pulse generation means for generating a top pulse among recording pulses representative of the data from a short width pulse if a determination result of the determination means is odd, and if the determination result is even, generating the top pulse from a pulse whose width is longer than that of the odd case; and multi-pulse generation means for generating multi-pulses with the number m of constant strength pulses of the recording power Pw being m=(n−k)/2, where k=2 (if n=2), k=3 (if n is an odd number), or k=4 (if n is an even number).

(16) There is provided an optical recording apparatus for forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The apparatus includes determination means for determining whether the length nT of a recording signal corresponding to the mark is odd or even; top pulse generation means for generating a top pulse among recording pulses representative of the data from a short width pulse if a determination result of the determination means is odd, and if the determination result is even, generating the top pulse from a pulse whose width is longer than that of the odd case; multi-pulse generation means for generating multi-pulses with the number m of constant strength pulses of the recording power Pw being m=(n−k)/2, where k=2 (if n=2), k=3 (if n is an odd number), or k=4 (if n is an even number); and phase control means for controlling, for recording pulses corresponding to any mark having a length nT (n≥5) and sequentially consisting of a top pulse, intermediate pulses, and a rear-end pulse, phases of intermediate pulses by shifting by 1T a phase of intermediate pulses among recording pulses representative of a mark whose n is an odd number equal to or greater than 5 from a phase of intermediate pulses among recording pulses representative of a mark whose n is an even number equal to or greater than 6.

(17) There is provided an optical recording apparatus for forming a mark corresponding to data having a length nT (n being an integer equal to or greater than 2 and T being a clock period) by modulating the laser power of an irradiating laser beam with three values of recording power Pw, erase power Pe, and bias power Pb (where Pw>Pe>Pb). The apparatus includes determination means for determining whether n of the data length nT is n=3l, n=3l+1, or n=3l+2 (l being a natural number); top pulse generation means for generating a top pulse among recording pulses representative of the data from a short width pulse if a determination result of the determination means is n=3l, generating, if the determination result is n=3l+2, the top pulse from a pulse whose width is longer than that of the case of n=3l, and generating, if the determination result is n=3l+1, the top pulse from a pulse whose width is longer than that of the case of n=3l and shorter than that of the case of n=3l+2; and multi-pulse generation means for generating multi-pulses with the number m of constant strength pulses of the recording power Pw being m=INT((n−3)/3), where INT is a conversion into an integer closer to 0.

(18) There is provided an optical recording apparatus for forming a mark corresponding to data having a length nT (n being an integer equal to or greater than 2 and T being a clock period) by modulating the laser power of an irradiating laser beam with three values of recording power Pw, erase power Pe, and bias power Pb (where Pw>Pe>Pb). The apparatus includes determination means for determining whether n of the data length nT is n=3l, n=3l+1, or n=3l+2 (l being a natural number); top pulse generation means for generating a top pulse among recording pulses representative of the data from a short width pulse if a determination result of the determination means is n=3l, generating, if the determination result is n=3l+2, the top pulse from a pulse whose width is longer than that of the case of n=3l, and generating, if the determination result is n=3l+1, the top pulse from a pulse whose width is longer than that of the case of n=3l and shorter than that of the case of n=3l+2; multi-pulse generation means for generating multi-pulses with the number m of constant strength pulses of the recording power Pw being m=INT((n−3)/3), where INT is a conversion into an integer closer to 0; and phase control means for shifting a phase of multi-pulses by 1T between n=3l, n=3l+1, and n=3l+2 (l being a natural number) of the data of length nT (n≥6).

(19) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes employing heating pulses used for data of a minimum length 3T up to data of a length (2+p)T (p being the period ratio of a multi-pulse to a recording clock) as base pulses; and adding a period of heating pulses selected from 3T up to (2+p)T to a top portion of a recording strategy for data of a length nT longer than (2+p)T, thereby creating the recording strategy for the data of the length nT.

(20) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes employing heating pulses used for data of a minimum length 3T up to data of a length (2+p)T (p being the period ratio of a multi-pulse to a recording clock) as base pulses; adding a period of heating pulses selected from 3T up to (2+p)T to a top portion of a recording strategy for data of a length nT longer than (2+p)T; and if the period of a succeeding multi-pulse is 1/p of the recording clock, setting the number of data pieces from 3T up to (2+p)T as p, thereby creating the recording strategy for the data of the length nT.

(21) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes employing heating pulses used for data of a minimum length 3T up to data of a length (2+p)T (p being the period ratio of a multi-pulse to a recording clock) as base pulses; adding a period of heating pulses selected from 3T up to (2+p)T to a top portion of a recording strategy for data of a length nT longer than (2+p)T; and adjusting the phase of a succeeding multi-pulse whose period is 1/p of the recording clock to the added heating pulses at the top portion, thereby adjusting the phase relationship of a trailing edge waveform of the recording strategy for the data.

(22) There is provided an optical recording method of forming a mark corresponding to data having a length nT (n being an integer equal to or greater than 3 and T being a clock period) by modulating the laser power of an irradiating laser beam with three values of recording power Pw, erase power Pe, and bias power Pb (where Pw>Pe>Pb). The method includes setting a period of recording pulses representative of the data as 1/p by dividing the frequency of a recording clock by p (p being the period ratio of a multi-pulse to the recording clock); and setting the number m of constant strength pulses of the recording power Pw as m=(n−k)/p (k being a positive integer coefficient determined by the recording characteristics of a medium and m being a positive integer including 0 with digits below a decimal point being cut).

(23) There is provided an optical disk for recording information with a laser beam emitted from an optical pickup and having an information management area and an information recording area. The information management area stores, in a plurality of recording management information sections corresponding to multiplied-speed information, recording power and recording strategy information used to store information in the information recording area, as well as linear speed information used to record information on the optical disk. The recording strategy information specifies a recording clock to be used for a low linear speed among compatible linear speeds of the optical disk and a frequency-divided clock of the recording clock to be used for a high linear speed among the compatible linear speeds.

(24) There is provided an optical disk for recording information with a laser beam emitted from an optical pickup and having an information management area and an information recording area, the recording area including blocks serving as recording/reproducing units and involving a block having two block addresses and a block having a block address and management information. The information management area stores, in a plurality of recording management information sections corresponding to multiplied-speed information, recording power and recording strategy information used to store information in the information recording area, as well as linear speed information used to record information on the optical disk. The recording strategy information specifies a recording clock to be used for a low linear speed among compatible linear speeds of the optical disk and a frequency-divided clock of the recording clock to be used for a high linear speed among the compatible linear speeds.

(25) According to a preferred embodiment, the optical disk stipulated in any one of (23) and (24) is characterized in that the number of the plurality of recording management information sections corresponding to multiplied-speed information is changeable according to the compatible linear speeds, and the plurality of recording management information sections serve as a unit that is repeatedly recorded in the information management area.

(26) There is provided an optical disk recording/reproducing apparatus for recording and reproducing an optical disk. The optical disk is for recording information with a laser beam emitted from an optical pickup and has an information management area and an information recording area. The information management area stores, in a plurality of recording management information sections corresponding to multiplied-speed information, recording power and recording strategy information used to store information in the information recording area, as well as linear speed information used to record information on the optical disk. The recording strategy information specifies a recording clock to be used for a low linear speed among compatible linear speeds of the optical disk and a frequency-divided clock of the recording clock to be used for a high linear speed among the compatible linear speeds. The apparatus reads a necessary one from among a plural pieces of the recording power and recording strategy information stored in the plurality of recording management information sections in the information management area, and according to the read information, sets recording power and a recording strategy and records information in the information recording area.

(27) There is provided an optical disk recording/reproducing apparatus for recording and reproducing an optical disk. The optical disk is for recording information with a laser beam emitted from an optical pickup and has an information management area and an information recording area. The recording area includes blocks serving as recording/reproducing units and involving a block having two block addresses and a block having a block address and management information. The information management area stores, in a plurality of recording management information sections corresponding to multiplied-speed information, recording power and recording strategy information used to store information in the information recording area, as well as linear speed information used to record information on the optical disk. The recording strategy information specifies a recording clock to be used for a low linear speed among compatible linear speeds of the optical disk and a frequency-divided clock of the recording clock to be used for a high linear speed among the compatible linear speeds. The apparatus reads a necessary one from among a plural pieces of the recording power and recording strategy information stored in the plurality of recording management information sections in the information management area, and according to the read information, sets recording power and a recording strategy and records information in the information recording area.

(28) There is provided an optical recording method of forming a mark corresponding to data having a length nT (n being an integer and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by p. The method includes adjusting time of the clock period T according to the length of recording data of the period p by changing three time sections among divided recording pulses for forming a mark, i.e., a bias power section before a rear-end recording pulse, a rear-end recording pulse section, and a cooling power section according to the period p.

(29) There is provided optical recording method of forming a mark corresponding to data having a length nT (n being an integer equal to or greater than 3 and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by 2. The method includes adjusting time of the clock period T according to the length of recording data of the frequency-halved period by changing three time sections among divided recording pulses for forming a mark, i.e., a bias power section before a rear-end recording pulse, a rear-end recording pulse section, and a cooling power section according to even and odd recording data in the frequency-halved period.

(30) There is provided an optical recording method of forming a mark corresponding to data having a length nT (n being an integer equal to or greater than 3 and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by 2. The method includes adjusting time of the clock period T according to the length of recording data of the frequency-halved period by forming a mark with divided recording pulses so that a 3T mark is formed with a top pulse having a length T3, a section dT3 for adjusting the length of the top pulse, and a rear-end cooling power section 3Tcl, an odd or even mark equal to or longer than 4T is formed with a multi-pulse period Tmp obtained by halving the frequency of a recording clock, an even mark is formed with three time sections, i.e., a bias power section "(2T−Tmp)−eTdlp1" before a rear-end recording pulse, a rear-end recording pulse section "Tmp−eTdlp2," and a cooling power section eTcl, and an odd mark is formed with three time sections, i.e., a bias power section "(2T−Tmp)+oTdlp1" before a rear-end recording pulse, a rear-end recording pulse section "Tmp+oTdlp2," and a cooling power section oTcl.

(31) There is provided an optical recording medium having a structure to record data with the use of an optical recording method of forming a mark corresponding to data having a length nT (n being an integer and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by p. The method includes adjusting time of the clock period T according to the length of recording data of the period p by changing three time sections among divided recording pulses for forming a mark, i.e., a bias power section before a rear-end recording pulse, a rear-end recording pulse section, and a cooling power section according to the period p.

(32) There is provided an optical recording medium having a structure to record data with the use of an optical recording method of forming a mark corresponding to data having a length nT (n being an integer equal to or greater than 3 and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by 2. The method includes adjusting time of the clock period T according to the length of recording data of the frequency-halved period by changing three time sections among divided recording pulses for forming a mark, i.e., a bias power section before a rear-end recording pulse, a rear-end recording pulse section, and a cooling power section according to even and odd recording data of the frequency-halved period.

(33) There is provided an optical recording medium having a structure to record data with the use of an optical recording method of forming a mark corresponding to data having a length nT (n being an integer equal to or greater than 3 and T being a recording data clock period) by modulating the laser power of an irradiating laser beam with three values of recording power Pw, erase power Pe, and bias power Pb (where Pw>Pe>Pb) with the use of a recording strategy employing as a base period a clock obtained by dividing the frequency of the recording data clock period T by 2. The method includes adjusting time of the clock period T according to the length of recording data of the frequency-halved period by forming a mark with divided recording pulses so that a 3T mark is formed with a top pulse having a length T3, a section dT3 for adjusting the length of the top pulse, and a rear-end cooling power section 3Tcl, an odd or even mark equal to or longer than 4T is formed with a multi-pulse period Tmp obtained by halving the frequency of a recording clock, an even mark is formed with three time sections, i.e., a bias power section "(2T−Tmp)−eTdlp1" before a rear-end recording pulse, a rear-end recording pulse section "Tmp−eTdlp2," and a cooling power section eTcl, and an odd mark is formed with three time sections, i.e., a bias power section "(2T−Tmp)+oTdlp1" before a rear-end recording pulse, a rear-end recording pulse section "Tmp+oTdlp2," and a cooling power section oTcl.

(34) There is provided an optical disk for recording information with a laser beam emitted from an optical pickup and having an information management area and an information recording area. The information management area stores recording power and recording strategy information used to store information in the information recording area, as well as linear speed information used to record information on the optical disk. The recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb). The recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section. The recording strategy information includes a recording strategy employing a period pT obtained by dividing the frequency of the clock period by p as a base period to be used for a high linear speed and is capable of adjusting the recording strategy according to the period pT by changing three time sections among divided recording pulses for forming a mark, i.e., a bias power section before a rear-end recording pulse, a rear-end recording pulse section, and a cooling power section. The recording strategy information is beforehand stored in a plurality of recording management information sections corresponding to multiplied-speed information.

(35) There is provided an optical disk for recording information with a laser beam emitted from an optical pickup and having an information management area and an information recording area. The information management area stores recording power and recording strategy information used to store information in the information recording area, as well as linear speed information used to record information on the optical disk. The recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb). The recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section. The recording strategy information includes a recording strategy employing a period 2T obtained by dividing the frequency of the clock period by 2 as a base period to be used for a high linear speed and is capable of adjusting the recording strategy according to the period 2T by changing, according to even or odd number data, three time sections among divided recording pulses for forming a mark, i.e., a bias power section before a rear-end recording pulse, a rear-end recording pulse section, and a cooling power section. The recording strategy information is beforehand stored in a plurality of recording management information sections corresponding to multiplied-speed information.

(36) For an optical disk for recording information with a laser beam emitted from an optical pickup and having an information management area and an information recording area, in which the information management area stores recording power and recording strategy information used to store information in the information recording area, as well as linear speed information used to record information on the optical disk, the recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb), the recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section, the recording strategy information includes a recording strategy employing a period pT obtained by dividing the frequency of the clock period by p as a base period to be used for a high linear speed and is capable of adjusting the recording strategy according to the period pT by changing, according to the period pT, three time sections among divided recording pulses for forming a mark, i.e., a bias power section before a rear-end recording pulse, a rear-end recording pulse section, and a cooling power section, and the recording strategy information is beforehand stored in a plurality of recording management information sections corresponding to multiplied-speed information, there is provided an optical disk recording/reproducing apparatus for recording/reproducing information to and from the optical disk, including means for reading a necessary one from among a plural pieces of the recording power and recording strategy information stored in the plurality of information management sections of the optical disk, and according to the read recording power and recording strategy, recording information in the information recording area of the optical disk.

(37) For an optical disk for recording information with a laser beam emitted from an optical pickup and having an information management area and an information recording area, in which the information management area stores recording power and recording strategy information used to store information in the information recording area, as well as linear speed information used to record information on the optical disk, the recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb), the recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section, the recording strategy information includes a recording strategy employing a period 2T obtained by dividing the frequency of the clock period by 2 as a base period to be used for a high linear speed and is capable of adjusting the recording strategy according to the period 2T by changing, according to even or odd number data, three time sections among divided recording pulses for forming a mark, i.e., a bias power section before a rear-end recording pulse, a rear-end recording pulse section, and a cooling power section, and the recording strategy information is beforehand stored in a plurality of recording management information sections corresponding to multiplied-speed information, there is provided an optical disk recording/reproducing apparatus for recording/reproducing information to and from the optical disk, including means for reading a necessary one from among a plural pieces of the recording power and recording strategy information stored in the plurality of information management sections of the optical disk, and according to the read recording power and recording strategy, recording information in the information recording area of the optical disk.

BRIEF DESCRIPTION OF THE DRAWINGS

FIG. 9 is a view explaining first to thirteenth embodiments of an optical recording medium according to the present invention.

FIG. 10 is a view explaining methods of forming divided pulse strings (n=3, 4) according to the first and third embodiments of an optical recording method according to the present invention.

FIG. 12 shows waveforms or eye patterns recorded at 6× speed by multi-pulse strategy optical recording methods, in which FIG. 12A shows eye patterns employing an optical recording method and optical recording medium according to the present invention and FIG. 12B shows eye patterns according to a conventional optical recording method.

FIG. 13 is a view showing parameters for calculating a modulation factor of eye patterns.

FIG. 14 shows pulse waveforms of laser emission employing multi-pulse strategy optical recording methods, in which

FIG. 20 is a view showing divided pulse waveforms corresponding to recording signals having lengths 11T and 14T among the divided pulse strings shown in FIG. 17.

FIG. 21 is a view explaining twenty-first to thirty-second embodiments of an optical recording medium according to the present invention.

FIG. 23 is a view showing information recorded in field IDs of an optical disk according to the present invention.

FIG. 24 is a view showing information recorded in field IDs of an optical disk according to the present invention.

FIG. 25 is a view showing information recorded in a field ID of an optical disk according to the present invention.

FIG. 26 is a view showing information recorded in a field ID of an optical disk according to the present invention.

FIG. 27 is a view showing information recorded in a field ID of an optical disk according to the present invention.

FIG. 28 is a view showing information recorded in a field ID of an optical disk according to the present invention.

FIG. 29 is a view showing information recorded in a field ID of an optical disk according to the present invention.

FIG. 30 is a view showing information recorded in field IDs of an optical disk according to the present invention.

FIG. 31 is a view showing an overall structure of an optical disk according to the present invention.

FIG. 34 is a view showing information recorded in an RMD of an optical disk according to an embodiment of the present invention.

BEST MODE FOR CARRYING OUT THE INVENTION

Best mode of implementation of the present invention will be explained with reference to the embodiments and drawings.

First Embodiment of Optical Recording Method

Figure 4:
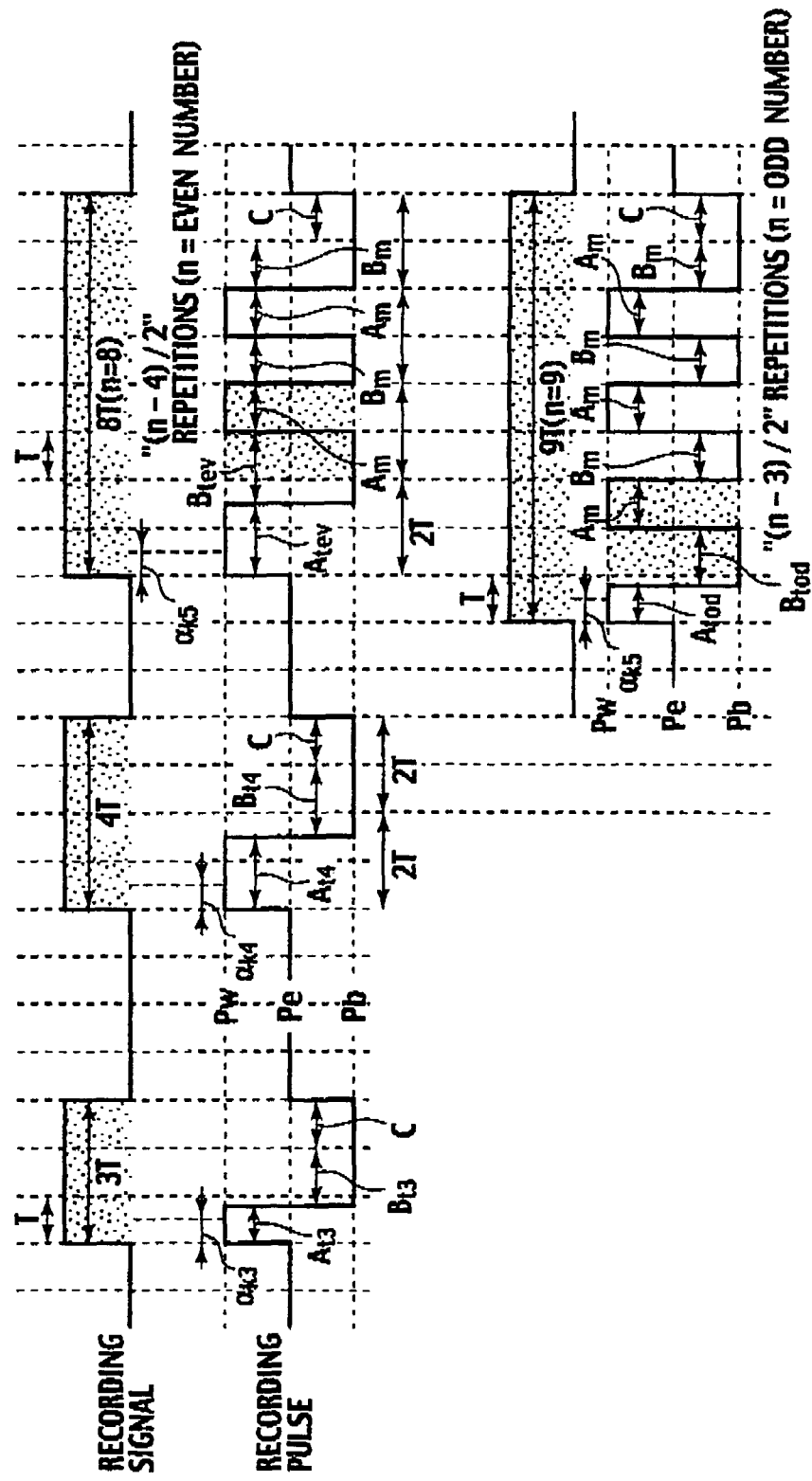
FIG. 4 is a view explaining divided pulse strings according to a first embodiment of an optical recording method of the present invention.

A first embodiment of an optical recording method according to the present invention will be explained. FIG. 4 is a view explaining strings of divided pulse strings according to the first embodiment of an optical recording method according to the present invention.

As shown in FIG. 4, a clock period T is employed for a multiplied linear speed. To record a mark having a length nT, pulses are divided according to a rule of m=(n−k)/2 (m is a positive integer) with k=3 (if n is an odd number) or k=4 (if n is an even number). For this, an irradiating laser beam is modulated with three power values of recording power Pw, erase power Pe, and bias power Pb (Pw>Pe>Pb). Constant strength periods ($A_t$) of the recording power Pw are set as $A_tT$, $A_1T$, ..., and $A_mT$. Constant strength periods ($B_t$) of the bias power are set as $B_tT$, $B_1T$, ..., $B_mT$, and CT (C=−1 to 3). The power is applied in order of $A_tT$, $B_tT$, $A_1T$, $B_1T$, ..., $A_mT$, $B_mT$, and CT to modulate a laser beam. The constant strength period $A_t$ for n=3, n=4, n≥5 (odd number), and n≥6 (even number) is set as $A_{t3}$, $A_{t4}$, $A_{tod}$, and $A_{tev}$, and the constant strength period $B_t$ for n=3, n=4, n≥5 (odd number), and n≥6 (even number) is set as $B_{t3}$, $B_{t4}$, $B_{tod}$, and $B_{tev}$. Then, $A_{t3}+B_{t3}=A_{tod}+B_{tod}=A_m+B_m=2T$ and $A_{t4}+B_{t4}=A_{tev}+B_{tev}=3T$.)

Figure 5:
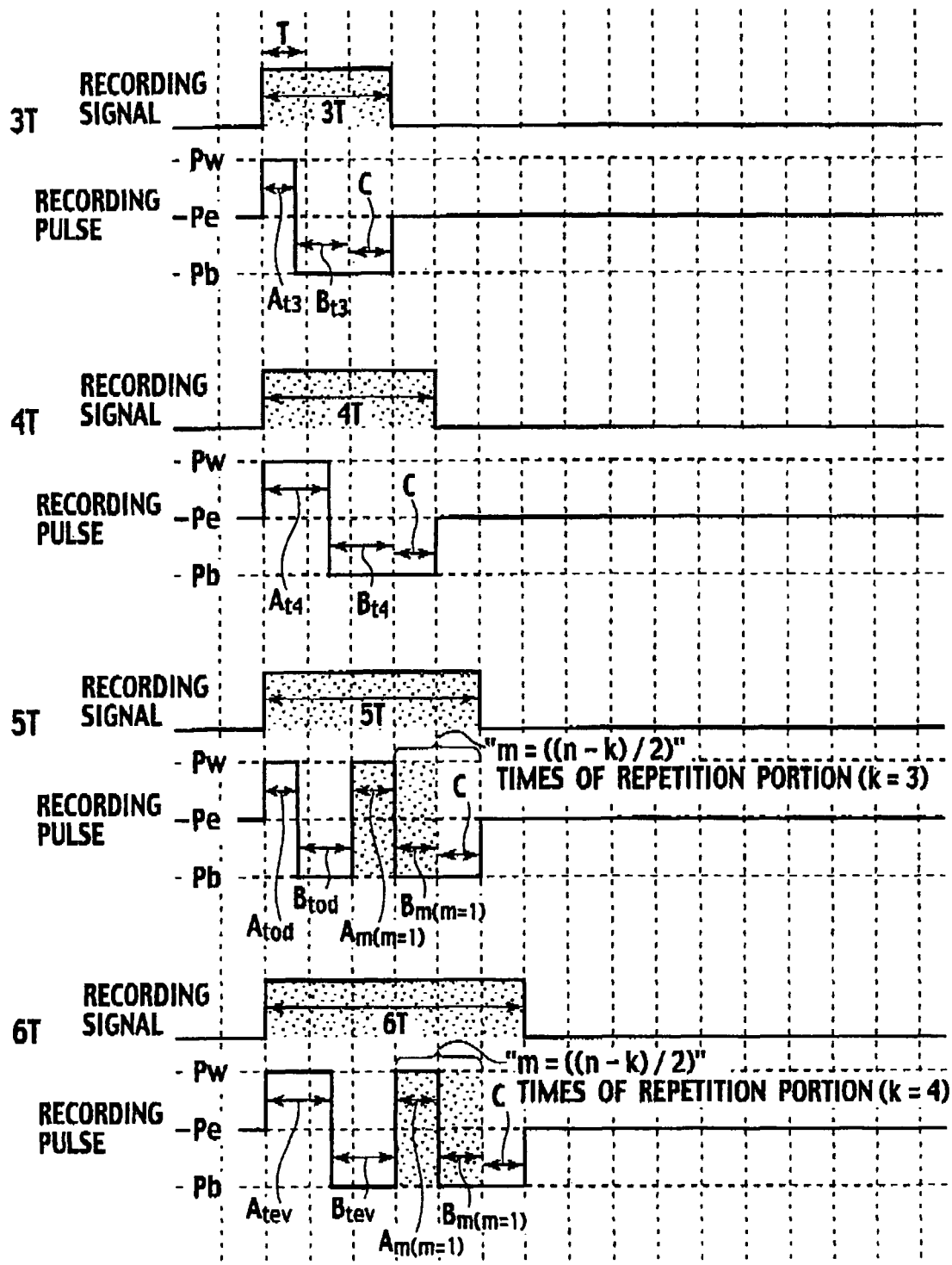
FIG. 5 is a view showing divided pulse waveforms corresponding to recording signals having lengths 3T, 4T, 5T, and 6T among the divided pulse strings shown in FIG. 4.
Figure 6:
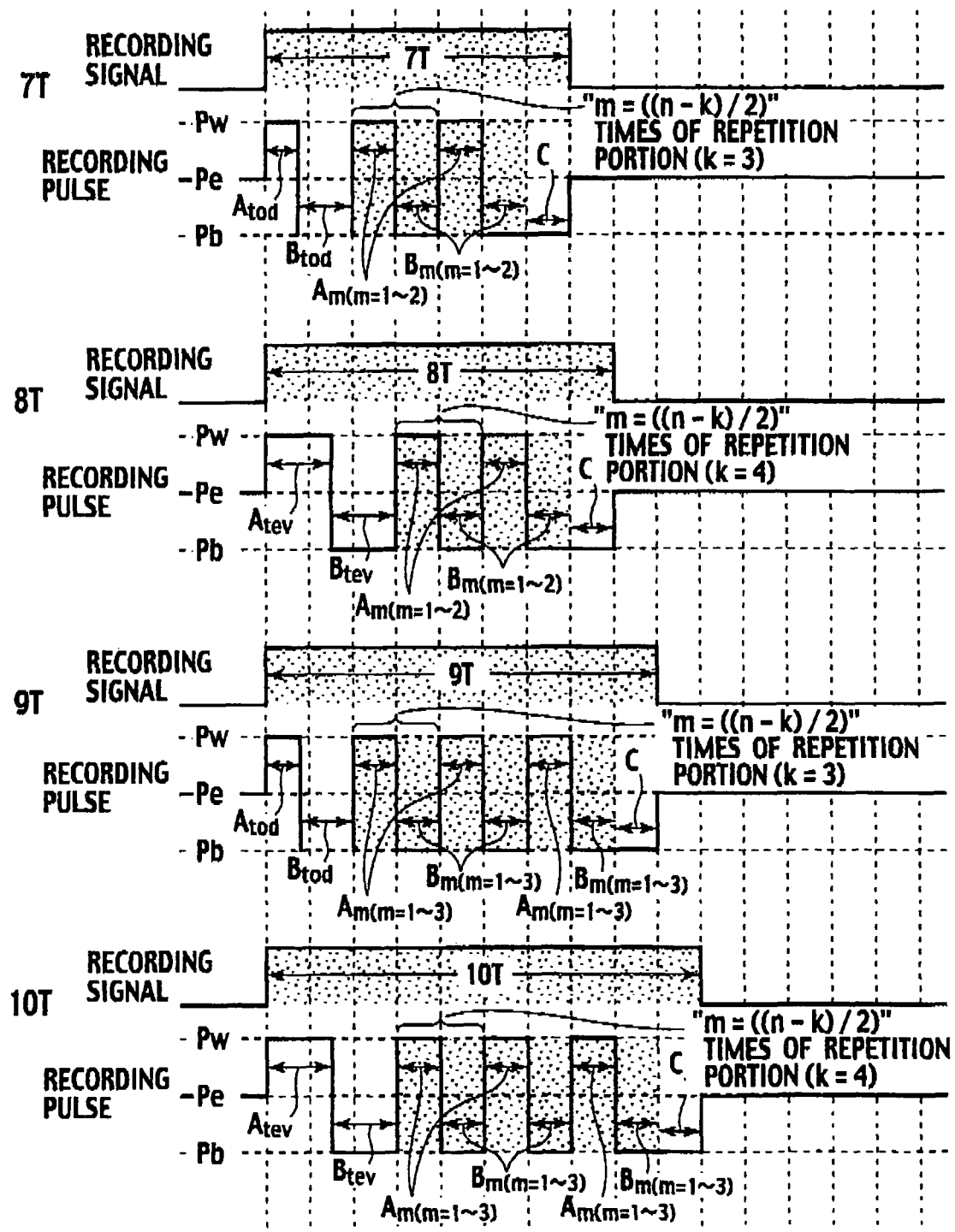
FIG. 6 is a view showing divided pulse waveforms corresponding to recording signals having lengths 7T, 8T, 9T, and 10T among the divided pulse strings shown in FIG. 4.
Figure 7:
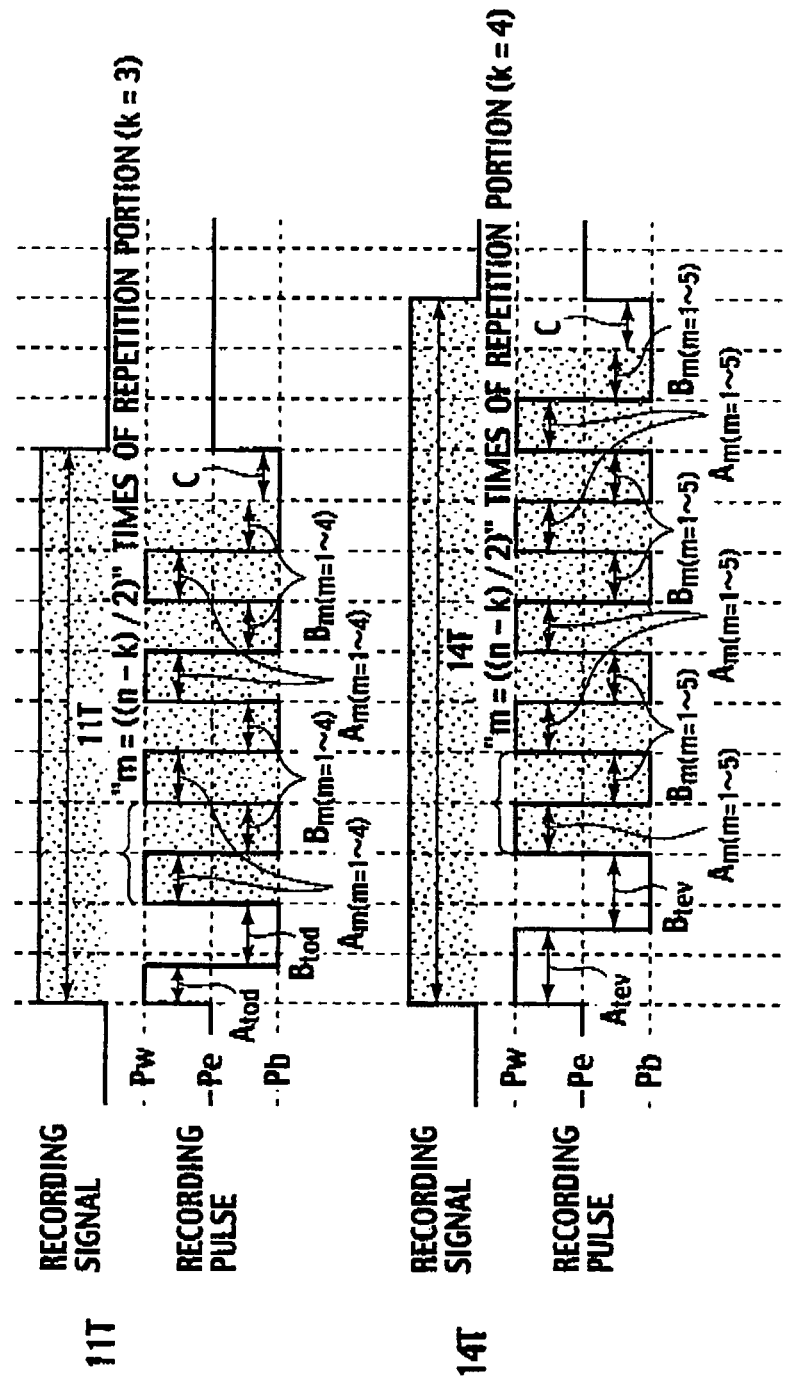
FIG. 7 is a view showing divided pulse waveforms corresponding to recording signals having lengths 11T and 14T among the divided pulse strings shown in FIG. 4.

This can realize a sufficient quenching history even for an optical recording medium having a high crystallization speed. This results in suppressing recrystallization and changing a mark thickness and a mark length as designed, to provide a sufficient signal amplitude. As shown in FIGS. 5 to 7, signal characteristics are improved by changing $A_t$ for n=3, n=4, n≥5 (odd number), and n≥6 (even number) as $A_{t3}$ (n=3), $A_{t4}$ (n=4), $A_{tod}$ (n≥5), and $A_{tev}$ (n≥6), respectively. In addition, in connection with a space length αT before a mark having a length nT, delay time $α_{kl}$ (k being n of a preceding space length and l being n of a subsequent mark length) for $A_{t3}$, $A_{t4}$, $A_{tod}$, and $A_{tev}$ according to α=3, α=4, and α≥5, to more correctly form the mark.

It is also effective to increase parameters for $A_t$ according to n, such as $A_{t3}$, $A_{t4}$, $A_{t5}$, $A_{tev}$, and $A_{tod}$ according to n=3, n=4, n=5, n≥6 (n is an even number), and n≥7 (n is an odd number). In addition, delay time of marks $A_{t3}T$, $A_{t4}T$, $A_{t5}T$, $A_{tod}T$, and $A_{tev}T$ may be increased by increasing α, such as α=3, α=4, α=5, and α≥6 in connection with a space length αT in front of a mark having a length nT. To form a mark nT, a laser beam is modulated in order of $A_tT$, $B_tT$, $A_1T$, $B_1T$, ..., $A_mT$, $B_mT$, and CT. The length of C may be changed according to n.

A modulation method for a recording signal may be 1-7 modulation, 8-16 modulation (EFM), EFM+ modulation, and the like.

Figure 8:
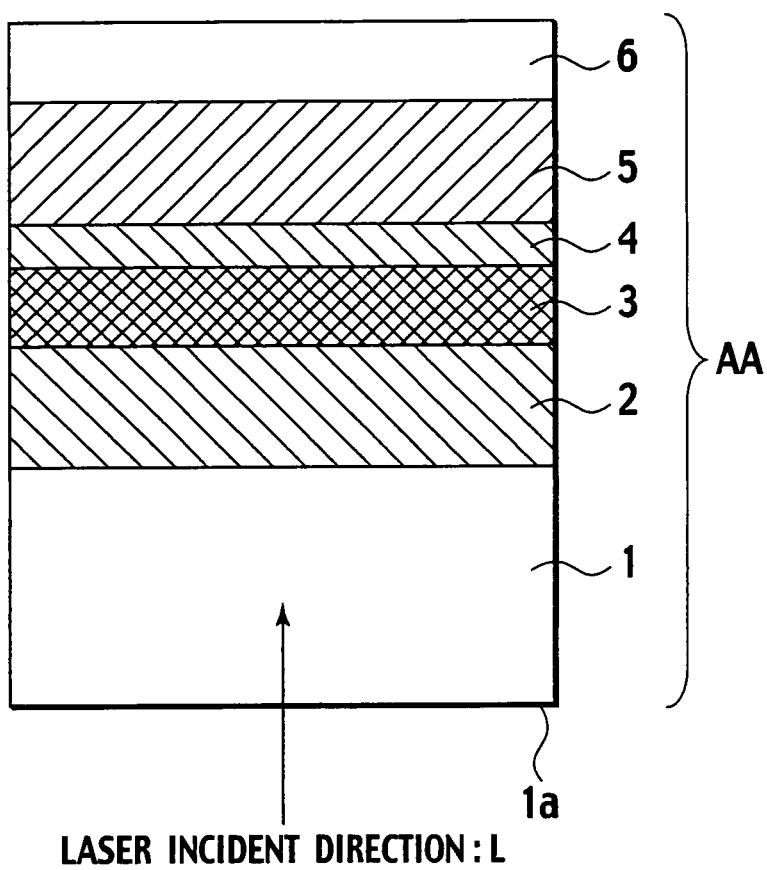
FIG. 8 is a view explaining a vertical section of an optical recording medium according to the present invention.

FIG. 8 shows an optical recording medium AA employed by the present invention. On a substrate 1, a first protective layer (lower dielectric layer) 2, a recording layer 3, a second protective layer (upper dielectric layer) 4, a reflective layer 5, and a protective film 6 are successively laminated. A recording or reproducing laser beam is made incident to an incident face 1a of the substrate 1 (in an irradiating direction L).

Material for the substrate 1 of the optical recording medium AA may be selected from various types of transparent synthetic resin, transparent glass, and the like. To avoid the influence of dust or flaws on the substrate 1, it is preferable to employ a transparent substrate and to record data from the substrate 1 side with a condensed laser beam. Material for the transparent substrate 1 may be glass, polycarbonate, polymethyl methacrylate, polyolefin resin, epoxy resin, polyimide resin, and the like. In particular, polycarbonate resin is preferable because it involves small optical birefringence and small moisture absorption and is easy to mold.

The thickness of the substrate 1 is not particularly limited. In consideration of compatibility with digital versatile disks (hereinafter referred to as DVDs), it is preferable to be 0.6 mm. In practice, the thickness must be in the range of 0.01 mm to 5 mm. If the thickness of the substrate 1 is smaller than 0.01 mm, dust will influence even if recording is conducted with a condensed laser beam made incident to the substrate 1 side. If the thickness is over 5 mm, it will be difficult to increase the numerical aperture of an object lens, to thereby increase the size of a laser beam spot and deteriorate recording density.

The substrate 1 may be flexible or rigid. A flexible substrate may be in the form of a tape, sheet, or card. A rigid substrate may be in the form of a card or disk.

Two pieces of the substrates 1 each having the laminated recording layer 3, protective layers 2 and 4, reflective layer 5, and protective film 6 may be attached back to back to form an air sandwich structure, an air incident structure, or a tightly bonded structure. The first and second protective layers 2 and 4 prevent thermal deformation of the substrate 1 and recording layer 3 and deterioration of a recording characteristic during recording. In this way, the protective layers 2 and 4 provide an effect of protecting the substrate 1 and recording layer 3 from heat, an optical interference effect, and an effect of improving a signal contrast during reproduction.

The first protective layer 2 and second protective layer 4 are transparent with respect to a recording/reproducing laser beam and have a refractive index n in the range of 1.9≤n≤2.3. The first protective layer 2 and second protective layer 4 may be made of different materials or compositions. In particular, a mixed film of ZnS and $SiO_2$ is preferable because it can secure recording sensitivity, C/N, erase rate, and the like with respect to repetitive recording and erasing operations.

The thickness of the first protective layer 2 is in the range of about 5 to 500 nm. It is preferable to be in the range of 40 to 300 nm with which the first protective layer 2 is hardly removed from the substrate 1 and recording layer 3 to thereby prevent defects such as cracks.

The thickness of the second protective layer 4 is preferably in the range of 0.5 to 50 nm to secure recording characteristics such as C/N and erase rate and stabilize many times of rewrite operation.

The reflective layer 5 may be made of an alloy containing light reflective metal such as Al, Au, and Ag as a main component and an additive including at least one kind of metal or semiconductor, or a mixture of metal such as Al, Au, and Ag and a metal compound such as nitride, oxide, and chalcogenide of Al and Si.

Metal such as Al, Au, and Ag and alloys containing such metal as a main component are preferable because they have high light reflectivity and high thermal conductivity. Examples of such alloys are those made of Al with at least one of Si, Mg, Cu, Pd, Ti, Cr, Hf, Ta, Nb, Mn, and Zr, or Au or Ag with at least one of Cr, Ag, Cu, Pd, Pt, Ni, and Nd.

To realize high linear speed recording, metal or an alloy containing Ag as a main component is preferable because Ag has a high thermal conductivity and realizes a proper recording characteristic. The thickness of this reflective layer 5 is dependent on the thermal conductivity of the metal or alloy that forms the reflective layer 5. It is preferable that the thickness is in the range of 50 nm to 300 nm. The thickness of reflective layer 5 greater than 50 nm may have no optical influence, i.e., no influence on reflectance but it influences a cooling speed.

The thickness greater than 300 nm elongates a manufacturing time. Accordingly, the layer thickness of the reflective layer 5 must be controlled by employing a material having a high thermal conductivity. If the reflective layer 5 is made of pure silver or a silver alloy, it is preferable to employ material containing no S for a layer that is in contact with the reflective layer 5, to prevent the formation of an AgS compound.

The recording layer 3 may be an alloy layer made of an Sb—Te alloy containing Ge or at least one of In, Ag, Si, Al, Ti, Bi, and Ga. The thickness of the recording layer 3 is preferably in the range of 10 to 25 nm, which can reduce recording laser power.

Each or both faces of the recording layer 3 may be provided with an interface layer. It is important that this interface layer must be made of material containing no sulfur. If the interface layer is made of material containing sulfur, repetitive overwrite operations may diffuse the sulfur in the interface layer into the recording layer 3 to deteriorate recording characteristics.

In addition, it deteriorates erasing characteristics. Preferable material is material containing at least one of nitride, oxide, and carbide. More precisely, material containing at least one of germanium nitride, silicon nitride, aluminum nitride, aluminum oxide, zirconium oxide, chrome oxide, silicon carbide, and carbon is preferable. The material may additionally contain oxygen, nitrogen, or hydrogen. The nitride, oxide, or carbide mentioned above may be not of a stoichiometric composition. It may be in excess of or in short of nitrogen, oxygen, or carbon. This sometimes leads to improving the characteristics of the interface layer, such as the adhesion, quality preservation, and durability of the interface layer.

A method of manufacturing the optical recording medium AA will be explained.

Laminating the protective layers 2 and 4, recording layer 3, reflective layer 5, and the like on the substrate 1 may be conducted according to a known vacuum thin film forming method such as a vacuum vapor deposition method (resistive heating type or electron beam type), an ion plating method, or a spattering method (DC spattering, AC spattering, or reactive spattering). In particular, the spattering method is preferable because it can easily control composition and film thickness.

It is preferable to employ a batch method that simultaneously form films on a plurality of substrates 1 in a vacuum chamber, or a sheet-type film forming apparatus that processes substrates 1 one by one. The thicknesses of the protective layers 2 and 4, recording layer 3, reflective layer 5, and the like to be formed are easy to control by controlling the power and time of a spattering power source or by monitoring a deposition state with, for example, a quartz oscillation film thickness meter.

Formation of the protective layers 2 and 4, recording layer 3, reflective layer 5, and the like may be made with the substrate 1 being fixed, moved, or rotated. To realize a uniform in-plane film thickness, rotating the substrate 1 is preferable. It is more preferable to additionally revolve the substrate 1. The substrate 1 may be cooled as and when needed, to reduce warp of the substrate 1.

A dielectric layer made of ZnS or $SiO_2$ or a resin protective layer made of ultraviolet-ray hardening resin may be formed as and when needed within the range of not deteriorating the effect of the present invention, after the formation of the reflective layer 5 and the like to prevent deformation of the reflective layer 5 and the like. After the formation of the reflective layer 5 and the like or after the formation of the resin protective layer, two substrates 1 may be faced and adhered to each other with, for example, an adhesive.

Before actual recording, it is preferable to crystallize the recording layer 3 with a laser beam or a beam from a xenon flash lamp.

First to thirteenth embodiments of optical recording media according to the present invention and first to eighth comparisons will successively be explained with reference to FIG. 9. The explanation is made in connection with phase-change optical disks as examples of the optical recording medium AA.

In the following embodiments, a PULSTEC disk drive tester (DDU1000) with a laser diode of 660 nm wavelength and an optical lens of NA=0.65, a PULSTEC MSG2B signal generator, and a HEWLETT PACKARD HP81200 signal generator were used for recording (one beam overwrite).

Recording linear speeds were 14 m/s (corresponding to 4× speed of DVD standard) and 21 m/s (corresponding to 6× speed of DVD standard), and evaluations were made with 8-16 (EFM) modulation random patterns. Clock periods T of 9.6 ns and 6.3 ns were used. A bit length was 0.267 μm/bit. Recording was made at the same density as that for DVD-ROM of 4.7 gigabytes.

Recording was made through ten times of overwriting on target and adjacent tracks. A reproduced signal was sliced at the center of the amplitude of the signal, and clock-to-data jitters were measured. The measurement was made with a ShibaSoku reproduction dedicated machine (LM220A) at a linear speed of 7.0 m/s. Constant reproduction power Pr of 0.7 mW was used.

Quantitative analyses of recording film compositions were made with SIEMENS fluorescence X-ray analyzer SRS303.

First Embodiment of Optical Recording Medium

Each layer was formed on a substrate 1 made of polycarbonate resin having a diameter of 120 mm and a plate thickness of 0.6 mm. The substrate 1 was provided with blank grooves at track pitches of 0.74 μm. The grooves had a depth of 25 nm and the ratio of a groove width to a land width of about 40:60.

A vacuum chamber was discharged to $3 \times 10^{-4}$ Pa, and in an Ar gas atmosphere of $2 \times 10^{-1}$ Pa, ZnS containing 20-mol % $SiO_2$ was subjected to a high-frequency magnetron spattering method to form a first protective layer 2 having a layer thickness of 60 nm on the substrate 1.

Thereafter, a recording layer 3 having a layer thickness of 16 nm (composition ratio of $Ge_2In_5Sb_{76}Te_{17}$) was formed by co-spattering of a three-element single alloy target In—Sb—Te and a simple Ge target. A second protective layer 4 of 16 nm thick was formed from the same material as that of the first protective layer 2, and then, a reflective layer 5 of 120 nm thick was formed from an Ag—Pd—Cu target.

The substrate 1 was taken out of the vacuum chamber. Over the reflective layer 5, acryl-based ultraviolet-ray hardening resin (SONY CHEMICAL SK5110) was spin-coated and was hardened with ultraviolet rays to form a protective film 6 having a film thickness of 3 μm. Thus, an optical disk was obtained.

Two substrates 1 made as mentioned above were bonded together with an adhesive seal, to provide a both-side-recording optical disk. The optical disk was irradiated with a wide laser beam having a track-direction beam width wider than a radial-direction beam width. The beam heated the recording layer 3 above a crystallization temperature, to finish an initialization process. Recording was made from the substrate 1 side to a guide groove of the phase-change recording layer 3. The groove had a convex shape when seen from the laser beam incident direction.

A recording strategy employing pulse strings according to the present invention was carried out. Namely, pulse widths used for recording at the linear speed of 14 m/s (hereinafter referred to as 4× speed) were $A_{t3}=A_{tod}=0.85[T]$, $A_{t4}=A_{tev}=1.10[T]$, $A_m=0.95[T]$, and $C=1.00[T]$ and those for recording at the linear speed of 21 m/s (hereinafter referred to as 6× speed) were $A_{t3}=A_{tod}=0.90[T]$, $A_{t4}=A_{tev}=1.50[T]$, $A_m=0.90[T]$, and $C=0.50[T]$ (refer to FIG. 4).

Figure 11:
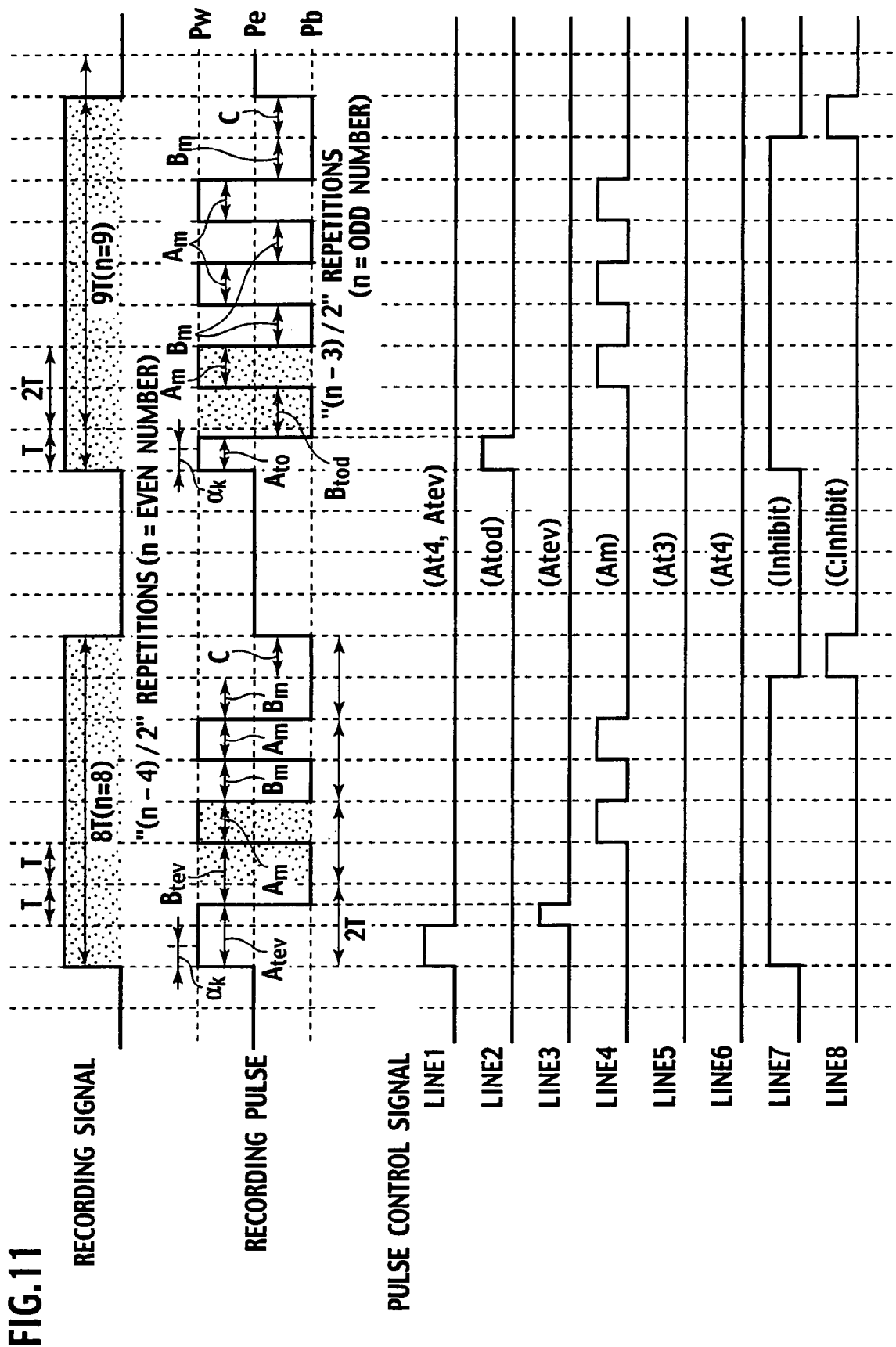
FIG. 11 is a view explaining methods of forming divided pulse strings (n≥5) according to the first embodiment of an optical recording method according to the present invention.

The recording strategy (pulse strings) consists of combinations of eight signals (refer to FIGS. 10 and 11). Recording power Pw and erase power Pe were selected so that Pw/Pe=18.0/9.0 mW for 4× speed and Pw/Pe=22.5/10.5 mW for 6× speed. For both the speeds, bottom power was 0.5 mW. Ten times of overwrite operation were conducted on tracks including adjacent tracks.

Then, clock-to-data jitters and signal strength (hereinafter referred to as modulation factor) were measured on reproduced signals. For 4× speed and 6× speed, the jitters were 9.5% and 11.5%, respectively, and the modulation factors were 72% and 67%, respectively. These values indicate good characteristics (refer to FIG. 12A for eye patterns of 6× speed). The modulation factor is expressed as (I14)/(I14H)× 100 (refer to FIG. 13).

Figure 14A:
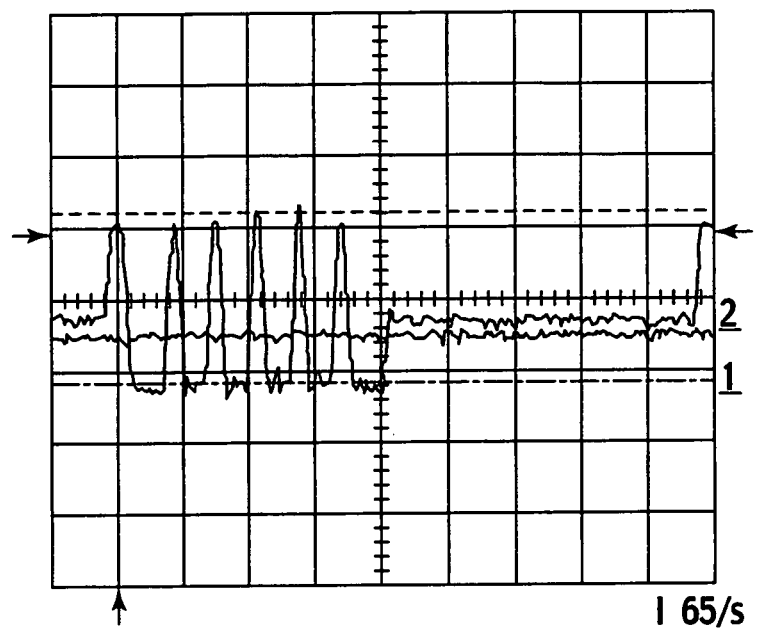
FIG. 14A shows a pulse waveform employing an optical recording method according to the present invention and FIG. 14B shows a pulse waveform according to a conventional optical recording method.

FIG. 14A shows a waveform of pulses emitted for 14T at 6× speed. It is understood that the pulses completely rise to substantially form a rectangle.

Second Embodiment of Optical Recording Medium

Pulse widths used for recording at 4× speed were $A_{t3}=0.95$ [T] and $A_{tod}=0.75$[T] and those for recording at 6× speed were $A_{t3}=0.80$[T] and $A_{tod}=0.95$[T]. The other conditions were the same as those of the recording strategy of the first embodiment.

The same measurements as those of the first embodiment were carried out, and as shown in FIG. 9, jitters of the 4×-speed recording and 6×-speed recording were 8.3% and 9.9%, respectively, which were better than those of the first embodiment.

Third Embodiment of Optical Recording Medium

For the 6×-speed recording, delay times $\alpha_{3i}(T)$ of the top pulses $A_t$ of marks having lengths 3T, 4T, and 5T or longer that follow a 3T space were set as $\alpha_{33}=\alpha_{34}=0.1$ and $\alpha_{35}=0.2$, delay times $\alpha_{41}(T)$ of the top pulses $A_t$ of marks having lengths 3T, 4T, and 5T or longer that follow a 4T space were set as $\alpha_{43}=\alpha_{44}=0.2$ and $\alpha_{45}=0.3$, and delay times $\alpha_{5i}(T)$ of the top pulses $A_t$ of marks having lengths 3T, 4T, and 5T or longer that follow a 5T space were set as $\alpha_{53}=\alpha_{54}=0.3$ and $\alpha_{55}=0.4$. The other conditions were the same as those of the recording strategy of the second embodiment.

Measurements similar to those of the second embodiment were carried out, and as shown in FIG. 9, a jitter of the 6×-speed recording was 9.6% that is better than that of the second embodiment.

Fourth Embodiment of Optical Recording Medium

The recording layer 3 was made by the co-spattering of a three-element single alloy target of In—Sb—Te and a simple Sb target, to have a composition ratio of $In_5Sb_{74}Te_{21}$. Except this, the same conditions as those of the first embodiment were used to form an optical recording medium. The 4×-speed recording, i.e., 14-m/s linear speed recording was carried out with a recording strategy involving pulse widths of $A_{t3}=1.10$[T], $A_{t4}=1.50$[T], $A_{tod}=1.00$[T], $A_{tev}=1.50$[T], $A_m=1.00$[T], and $C=0.30$[T]. The same 4×-speed measurement as that of the second embodiment was conducted, and as shown in FIG. 9, substantially the same characteristics as those of the second embodiment were obtained.

Fifth Embodiment of Optical Recording Medium

The recording layer 3 was made by the co-spattering of a three-element single alloy target of In—Sb—Te and a simple Sb target, to have a composition ratio of $In_5Sb_{79}Te_{16}$. Except this, the same conditions as those of the first embodiment were used to form an optical recording medium. The 6×-speed recording, i.e., 21-m/s linear speed recording was carried out with a recording strategy involving pulse widths of $A_{t3}=0.80$[T], $A_{t4}=1.00$[T], $A_{tod}=0.65$[T], $A_{tev}=1.00$[T], $A_m=0.80$[T], and $C=1.50$[T]. The same 6×-speed measurement as that of the second embodiment was conducted, and as shown in FIG. 9, substantially the same characteristics as those of the second embodiment were obtained.

Sixth Embodiment of Optical Recording Medium

The recording layer 3 was made by the co-spattering of a three-element single alloy target of In—Sb—Te and a Ge target, to have a composition ratio of $In_2Sb_{80}Te_{18}$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Seventh Embodiment of Optical Recording Medium

The recording layer 3 was made by the co-spattering of a three-element single alloy target of In—Sb—Te and a Ge target, to have a composition ratio of $Ge_4In_5Sb_{75}Te_{16}$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Eighth Embodiment of Optical Recording Medium

The recording layer 3 was made by the co-spattering of a four-element single alloy target of Ge—In—Sb—Te and an Ag target, to have a composition ratio of $Ge_1In_5Sb_{76}Te_{17}Ag_1$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Ninth Embodiment of Optical Recording Medium

The recording layer 3 was made by the co-spattering of a four-element single alloy target of Ge—In—Sb—Te and a Ti target, to have a composition ratio of $Ge_1In_5Sb_{76}Te_{17}Ti_1$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Tenth Embodiment of Optical Recording Medium

The recording layer 3 was made by the co-spattering of a four-element single alloy target of Ge—In—Sb—Te and an Si target, to have a composition ratio of $Ge_1In_5Sb_{76}Te_{17}Si_1$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Eleventh Embodiment of Optical Recording Medium

The recording layer 3 was made by the co-spattering of a four-element single alloy target of Ge—In—Sb—Te and an Al target, to have a composition ratio of $Ge_1In_5Sb_{76}Te_{17}Al_1$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Twelfth Embodiment of Optical Recording Medium

The recording layer 3 was made by the co-spattering of a four-element single alloy target of Ge—In—Sb—Te and a Bi target, to have a composition ratio of $Ge_1In_5Sb_{74}Te_{16}Bi_2$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

Thirteenth Embodiment of Optical Recording Medium

The recording layer 3 was made by the co-spattering of a four-element single alloy target of Ge—In—Sb—Te and a Ga target, to have a composition ratio of $Ge_1In_5Sb_{74}Te_{16}Ga_2$. Except this, the same optical recording medium as that of the second embodiment was prepared. Measurements similar to those of the second embodiment were carried out, and as shown in FIG. 9, characteristics substantially equivalent to those of the second embodiment were obtained for both the 4×-speed recording and 6×-speed recording.

<Comparison 1>

A conventional multi-pulse strategy (FIG. 1) involving, for 4× speed, $T_{top}$=0.30[T], $T_{mp}$=0.30[T], $T_{cl}$=1.50[T], and Pw/Pe=20.0/9.0 mW, and for 6× speed, $T_{top}$=0.5[T], $T_{mp}$=0.40[T], $T_{cl}$=0.80[T], and Pw/Pw=22.5/8.5 mW was used to conduct recording on an optical recording medium that is similar to that of the second embodiment. However, as shown in FIG. 9, jitters were 9.9% and 16.2% and modulation factors were 50% and 41% at 4× speed and 6× speed, respectively. The modulation factors were significantly inferior to those of the first to thirteenth embodiments (eye patterns for the 6×-speed recording are shown in FIG. 12B).

Figure 14B:
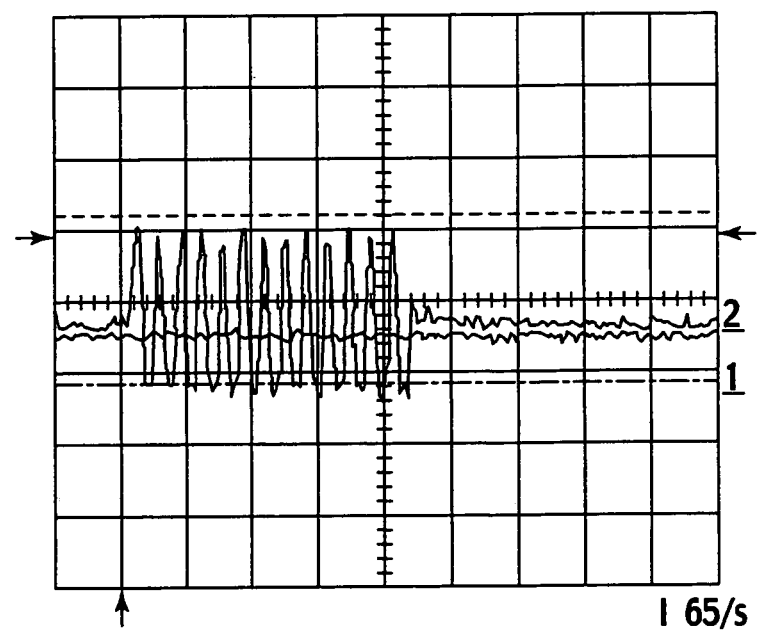

FIG. 14B shows a waveform of pulses emitted for 14T at 6× speed. It is understood that the pulses incompletely rise and fall and form triangular waves not reaching the peak power Pw and bottom power Pb.

<Comparison 2>

Figure 2:
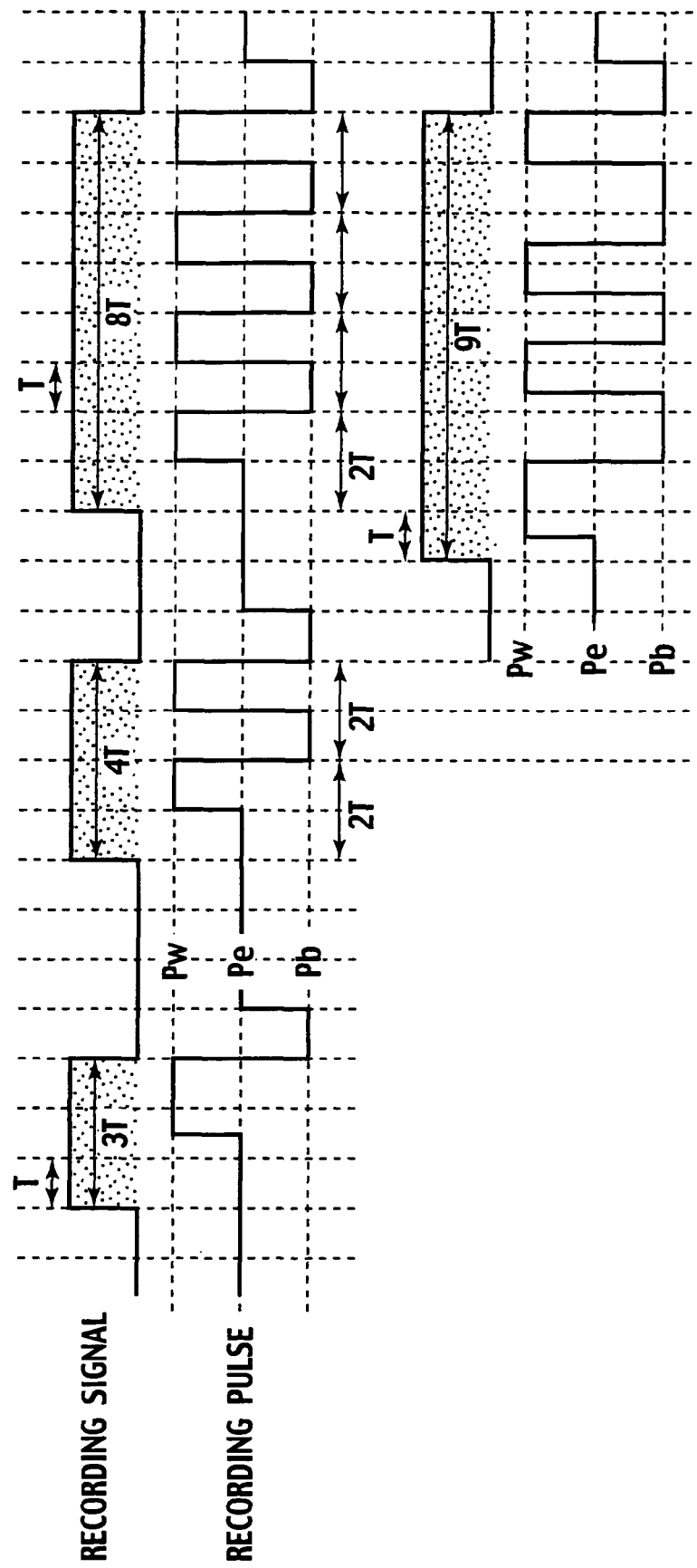
FIG. 2 is a view explaining recording pulse strings of a multi-pulse strategy used by a conventional optical recording method.

A recording strategy (FIG. 2) of ODS '00 Technical Digest PD1 in which the number of pulses N is set as N=n/2 if n (mark length) is an even number and as N=(n−1)/2 if n is an odd number was used to conduct recording at 4× speed and 6× speed with optimum pulse widths on an optical recording medium that is similar to that of the second embodiment. However, as shown in FIG. 9, jitters were 10.4% and 15.2% and modulation factors were 70% and 66% at 4× speed and 6× speed, respectively. The jitter at 6× speed was significantly inferior to those of the first to thirteenth embodiments.

<Comparison 3>

Figure 3:
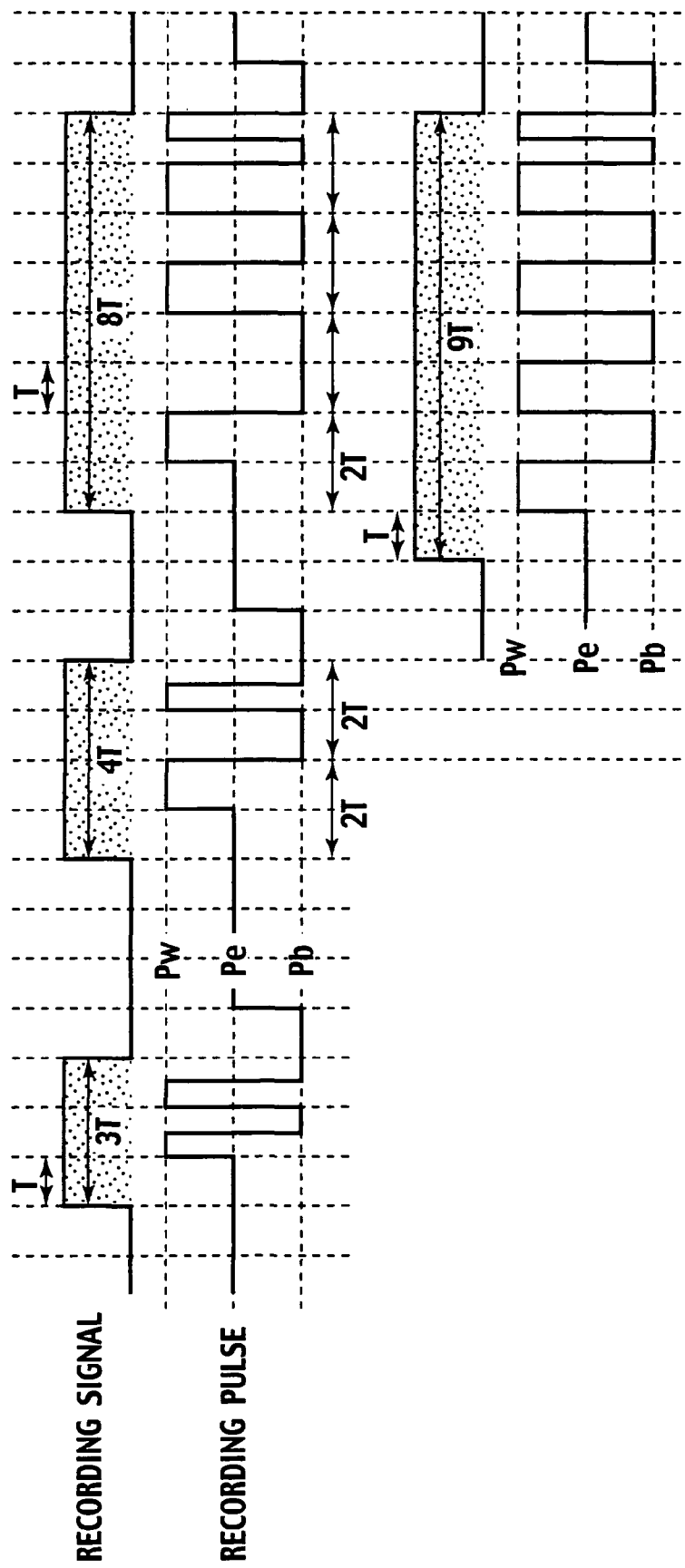
FIG. 3 is a view explaining recording pulse strings of a multi-pulse strategy used by a conventional optical recording method.

A strategy (FIG. 3) of modulation within 2T that is incorporated in PULSTEC MSG2B signal generator was used to conduct recording at 4× speed and 6× speed with optimum pulse widths on an optical recording medium that is similar to that of the second embodiment. However, as shown in FIG. 9, jitters were 12.7% and 16.2% and modulation factors were 69% and 64% at 4× speed and 6× speed, respectively. The jitter was significantly inferior to those of the first to thirteenth embodiments.

<Comparison 4>

The recording layer 3 was made by the co-spattering of a three-element single alloy target of In—Sb—Te and an Sb target, to have a composition ratio of $In_5Sb_{72}Te_{23}$. Except this, the same optical recording medium as that of the second embodiment was prepared. However, at or over 4× speed where the recording pulse strategy of the present invention becomes effective, a crystallization speed was insufficient and part of a mark was formed in a space portion to hinder proper recording.

<Comparison 5>

The recording layer 3 was made by the co-spattering of a three-element single alloy target of In—Sb—Te and an Sb target, to have a composition ratio of $In_5Sb_{80}Te_{15}$. Except this, the same optical recording medium as that of the second embodiment was prepared. However, as shown in FIG. 9, a modulation factor of 60% of the DVD standard was not sufficiently obtained and hindered proper recording.

<Comparison 6>

The recording layer 3 was made by the co-spattering of a three-element single alloy target of In—Sb—Te and a Ge target, to have a composition ratio of $Ge_7In_5Sb_{72}Te_{16}$. Except this, the same optical recording medium as that of the second embodiment was prepared. Measurements similar to those of the second embodiment were conducted, and as shown in FIG. 9, characteristics substantially equivalent to those of the second embodiment were obtained for both the 4×-speed recording and 6×-speed recording. However, as shown in FIG. 9, jitters were 14.1% and 17.3% and modulation factors were 71% and 68% at 4× speed and 6× speed, respectively. The jitter was significantly inferior to those of the first to thirteenth embodiments.

<Comparison 7>

The recording layer 3 was made by the co-spattering of a two-element single alloy target of Sb—Te and an Sb target, to have a composition ratio of $Sb_{80}Te_{20}$. Except this, the same optical recording medium as that of the second embodiment was prepared. Although good recording characteristics were obtained at both the 4×-speed recording and 6×-speed recording, the sample crystallized (mark disappeared) and was extremely inferior during a preservation characteristic test (acceleration test at 80° C.).

<Comparison 8>

The recording layer 3 was made by the co-spattering of a three-element single alloy target of In—Sb—Te and a Co target, to have a composition ratio of $In_5Sb_{76}Te_{17}Co_2$. Except this, the same optical recording medium as that of the second embodiment was prepared. Measurements similar to those of the second embodiment were conducted. As shown in FIG. 9, jitters were 17.4% and 20.3% at the 4×-speed recording and 6×-speed recording, respectively. The jitters were significantly inferior to those of the first to thirteenth embodiments.

The results mentioned above will be summarized as mentioned below from the viewpoint of recording methods.

Figure 1:
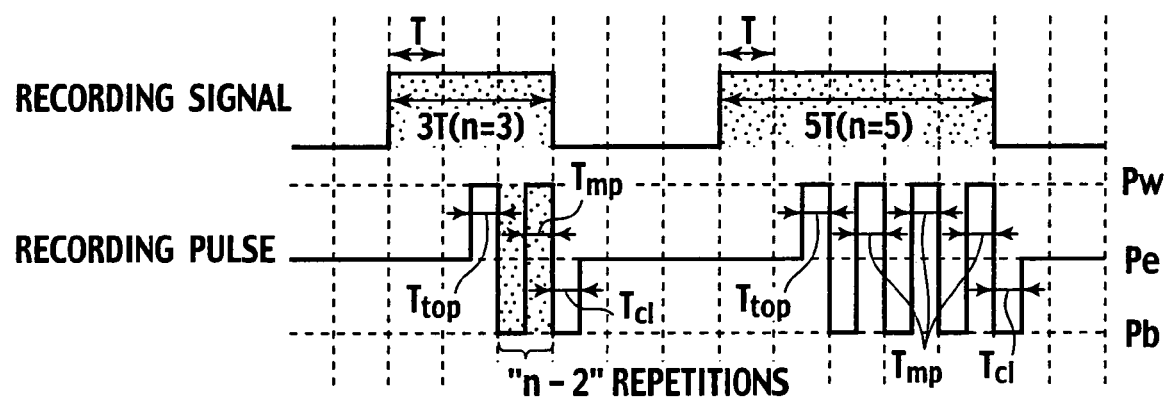
FIG. 1 is a view explaining recording pulse strings of a multi-pulse strategy used by a conventional optical recording method.

The comparison 1 employs the conventional multi-pulse strategy (FIG. 1). Due to the influence of rise and fall characteristics of a laser (FIG. 14B), an amplitude sufficient for recording is not obtained, and therefore, a mark to be written becomes incompletely amorphous. This seems to be the reason why the drastically inferior modification factors of 50% and 41% were obtained.

Accordingly, this method is improper for the recording speed ranges of the embodiments.

The comparison 2 employs the recording strategy (FIG. 2) that employs a halved recording clock. This resulted in drastically inferior jitters at 6× speed. The reason of this has been clarified that the recording pulses of a 4T signal that greatly affect jitters included two recording pulses and the latter pulse elongated the trailing edge of the 4T mark to deteriorate jitters. When generating a 9T signal, this recording strategy must change the clock timing of the other multi-pulses, to increase circuit size.

The comparison 3 employs the strategy (FIG. 3) that conducts modulation within 2T. Compared with the comparison 2, this example shortens the width of a rear-end pulse for 4T and other signals, to improve jitters. For a medium compatible with high linear speeds, employing a doubled clock only for the rear-end pulse results in forming an insufficient mark like the conventional multi-pulse strategy of the comparison 1, and therefore, is incapable of improving jitters.

The shape of the start of a mark to be formed on, in particular, a phase-change medium and to influence jitters, is substantially uniquely determined by the rise characteristics of a laser. On the other hand, the shape of the end of the mark is determined by the material of the medium, a crystallization speed corresponding to a linear speed, and the like, and therefore, is hardly sharpened to improve jitters.

There is, therefore, a requirement for providing a method of stabilizing jitters at a pulse trailing edge in a recording strategy waveform. As mentioned above, employing a strategy period of 2T with respect to a recording data clock of T and changing the shape of a trailing edge according to whether recording data is with even T or odd T result in deteriorating jitters. For this, an improvement is needed.

The present invention reasonably solves the above-mentioned problems as mentioned below.

(1) A recording signal 3T (a rectangular pulse having length 3T) is recorded with a top pulse $A_{t3}$ having peak power Pw and $B_{t3}$+C, which is a cooling interval, both having bias power Pb (refer to FIG. 4).

(2) A recording signal 4T is recorded with a top pulse $A_{t4}$ having peak power Pw and $B_{t4}$+C, which is a cooling interval, both having bias power Pb, i.e., with a single recording pulse like recording the signal 3T (refer to FIG. 4). This method may slightly widen in a track direction the shape of a mark recorded with the signal 4T on a medium, but can greatly improve jitters related to the recorded signal 4T.

(3) If the cooling interval C is fixed, the sum of the top pulse $A_{t3}$ and $B_{t3}$ of the recorded signal 3T becomes substantially 2T, and the sum of the top pulse $A_{t4}$ and $B_{t4}$ becomes substantially 3T.

The cooling interval C is part of a cooling pulse interval necessary for forming the trailing edge of a mark and is an element time period determined by the physical properties of a medium, a recording linear speed, and the like.

(4) In connection with recording pulses for recording signals equal to or longer than 5T, any recording signal of an odd number T (length of odd number times the length T) may consist of the sum of the top pulse $A_{t3}$ and $B_{t3}$ of the recording signal 3T and successively added 2T multi-pulses each composed of a pulse having length T and level of peak power PW and a pulse having length T and level of peak power Pb. Any recording signal of an even number T may consist of the sum of the top pulse $A_{t4}$ and $B_{t4}$ of the recording signal 4T and successively added 2T multi-pulses each composed of a pulse having length T and level of peak power PW and a pulse having length T and level of peak power Pb.

(5) This can be generalized as shown in FIG. 4.

Namely, among recording signals of 5T or longer, any recording signal of an odd number T may be made from the top pulse $A_{tod}$ and $B_{tod}$ based on the recording signal 3T followed by multi-pulses (intermediate pulses) $A_m$ of 2T. The number of multi-pulses is defined as $A_m = (n-3)/2$.

More generally, it is as follows:

$$A_m = (n-k)/2 \qquad \text{(Equation 1)}$$

where k=3 (k is a coefficient determined according to recording characteristics) (n is the number of recording signal periods T and is an odd number).

Any recording signal of an even number T may be made from the top pulse $A_{tev}$ and $B_{tev}$ based on the recording signal 4T followed by multi-pulses $A_m$ of 2T. The number of the multi-pulses $A_m$ is defined as $A_m = (n-4)/2$.

More generally, it is as follows:

$$A_m = (n-k)/2 \qquad \text{(Equation 2)}$$

where k=4 (k is a coefficient determined according to recording characteristics) (n is the number of recording signal periods T and is an even number).

The equations can be made common to odd and even numbers as follows:

$$A_m = \text{INT}((n-k)/2) \qquad \text{(Equation 3)}$$

where k=3 (k is a coefficient determined according to recording characteristics) (n is the number of recording signal periods T) ($A_m$ is a positive integer including 0).

Here, INT is an integer operation that cuts digits below a decimal point of a quotient, to integrate the two equations for odd and even numbers into a common one. If n=2, $A_m$ will be a negative value. In this case, digits below a decimal point are cut to obtain a target number.

Figure 15:
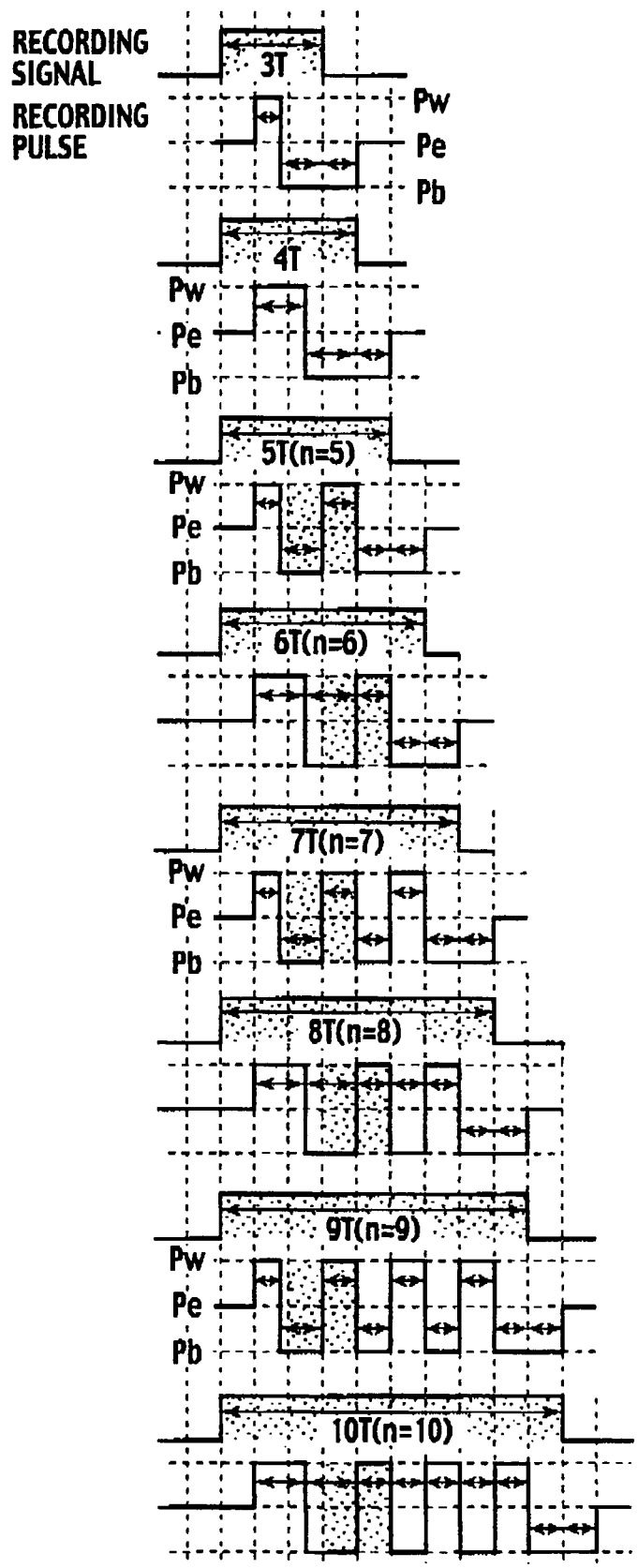
FIG. 15 is a view explaining divided pulse strings according to the second embodiment of an optical recording method of the present invention.

(6) FIGS. 4 and 15 show the waveforms of recording pulses corresponding to recording signals T (rectangular pulses each having length 3T) based on this idea.

As is apparent from these figures, alternating the recording top pulses between a recording signal of odd T (length of odd number times the length T) and a recording signal of even T (length of even number times the length T), inverting the phases of multi-pulses (intermediate pulses) or shifting them by 1T between adjacent recording signals T, and adding a multi-pulse (intermediate pulse) of a period 2T whenever a recording signal is elongated by 2T can equalize recording pulse waveforms at the trailing edge of each recording signal T, thereby reducing jitters.

The present invention forms recording pulses corresponding to a recording signal (data) of a length nT (n≥5) in order of a top pulse, intermediate pulses, and a rear-end pulse. The phase of intermediate pulses of recording pulses corresponding to a mark whose n is an odd number equal to or greater than 5 is substantially opposite to the phase of intermediate pulses of recording pulses corresponding to a mark whose n is an even number equal to or greater than 6. For example, FIG. 5 shows a phase relationship that a recording pulse at a 3T position from the leading edge of a recording signal of length 5T involves an intermediate pulse $A_m$, and on the other hand, a recording pulse at a 3T position from the leading edge of a recording signal of length 6T involves no intermediate pulse. FIG. 6 shows a phase relationship that recording pulses at 3T and 5T positions from the leading edge of a recording signal of length 7T involve two intermediate pulses $A_m$, and on the other hand, recording pulses at 3T and 5T positions from the leading edge of a recording signal of length 8T involve no intermediate pulses. Also shown is a phase relationship that recording pulses at 3T, 5T, and 7T positions from the leading edge of a recording signal of length 9T involve three intermediate pulses $A_m$, and on the other hand, recording pulses at 3T, 5T, and 7T positions from the leading edge of a recording signal of length 10T involve no intermediate pulses.

Forming these recording pulse waveforms is realized by a circuit structure based on the above-mentioned combination. Namely, a simple circuit structure is sufficient to achieve the waveforms.

The 8-16 modulation employed by DVDs and the like employs 3T to 11T and 14T. FIG. 15 shows recording signals of 3T to 10T because, as explained above, the same idea is applicable to generate any recording pulse.

Between FIG. 4 and FIG. 15, there is a difference in a timing relationship between recording signals and recording pulses. Namely, FIG. 15 is 1T behind FIG. 4. This phase relationship difference is simply a design matter. Even if FIG. 15 is behind FIG. 4 by 2T, the same operation and effect will be provided.

Although the embodiments show only basic recording strategy arrangements, improvements given below are also possible.

In FIG. 4:

a) a time $A_{tn}$ for the top pulse of a recording signal nT is increased as in the cases of n=3, n=4, n=5, and n≥6 (n being a positive number) by increasing a parameter for T according to n ($A_{t3}<A_{t5}<A_{tod}$, and $A_{t4}<A_{tev}$);

b) a delay time α for the timing of a leading edge of the top pulses $A_{t3}T$, $A_{t4}T$, $A_{t5}T$, $A_{tod}T$, and $A_{tev}T$ of marks having lengths nT may be changed as α=3, α=4, α=5, and α≥6;

c) a delay time for the timing of a leading edge of the top pulses $A_{t3}T$, $A_{t4}T$, $A_{t5}T$, $A_{tod}T$, and $A_{tev}T$ may be changed by increasing a parameter α of a space length αT in front of a mark having a length nT like α=3, α=4, α=5, and α≥6;

d) although not shown in detail in FIG. 4, the timing of the trailing edge of a top pulse is changed according to a recording signal nT;

e) the timing of the leading edge of a first multi-pulse $A_m$ among multi-pulses (intermediate pulses) $A_m$ is changed according to a recording signal nT;

f) the timing of the trailing edge of a last multi-pulse $A_m$ among multi-pulses (intermediate pulses) $A_m$ is changed according to a recording signal nT;

g) a bias section C at the trailing edge of a last multi-pulse $A_m$ among multi-pulses (intermediate pulses) $A_m$ is changed according to a recording signal nT;

h) a duty between a multi-pulse intermediate pulse $A_m$ and a bias section $B_m$ within 2T is changed according to a medium kind and the like; and i) any one of the items a to h or a combination thereof can improve characteristics.

Second Embodiment of Optical Recording Method

A second embodiment of an optical recording method according to the present invention will be explained.

According to an increase in recording clock speed, the present invention employs 2T, i.e., two clock periods as a period of a multi-pulse. For higher speed recording, for example, 16×-speed recording of DVD-RW, it will be necessary to extend a clock period for generating a multi-pulse. Namely, it will be necessary for forming multi-pulse periods of 3T, 4T, . . . , and pT (p is an integer larger than 2. For this, the idea mentioned above must further be generalized.

FIG. 15 is a view explaining divided pulse strings according to the second embodiment of an optical recording method according to the present invention.

In FIGS. 4 and 15, a multi-pulse employs a quotient obtained by dividing the frequency of a recording clock by 2 (p=2). Heating pulses for minimum period recording data 3T and 4T are used to form strategies for data of 5T or longer. Namely, a heating pulse for an odd 3T is used as a top heating pulse for odd data, and a heating pulse for an even 4T is used as a top heating pulse for even data.

Each multi-pulse that follows the top heating pulse is formed by dividing the frequency of a recording clock by 2 (p=2). An adjustment is made to form an equal relationship for the phases of pulses at the trailing edges of even and odd data according to the lengths of the data. The phase adjustment is carried out by shifting one clock corresponding to a half phase of a two-clock period. This method can equalize the formation of a mark trailing edge for each T, to optimize jitters of data.

This is applicable for higher speed recording that employs multi-pulses having a period obtained by dividing the frequency of a recording clock by, for example, 3 (p=3) and corresponding to three clocks. Heating pulses of the minimum period recording data 3T, 4T, and 5T are used to form strategies for data of 6T or longer. Heating pulses for 6T consisting of 3T plus 3 clocks are made by adding the heating pulses of 3T to the start of a 6T strategy. Heating pulses for 7T consisting of 4T plus 3 clocks are made by adding the heating pulses of 4T to the start of a 7T strategy. Heating pulses for 8T consisting of 5T plus 3 clocks are made by adding the heating pulses of 5T to the start of an 8T strategy. These are repeated every three clocks, to generate a top heating pulse of a strategy for every piece of recording data nT.

Each multi-pulse that follows the top heating pulse mentioned above is formed by dividing the frequency of a recording clock by 3 (p=3). The top pulse of a three-clock period is followed by multi-pulses each of three-clock period, the multi-pulse being shifted by one clock corresponding to a third of the three-clock period according to the length of data, to maintain the same phase relationship for a pulse at the trailing edge of the data. This phase relationship adjusting method can equalize the formation of a mark trailing edge for each T, to optimize jitters of data.

This will further be generalized. Multi-pulses employ a quotient obtained by dividing the frequency of a recording clock by p (p is an integer larger than 2). Heating pulses for p clocks of from shortest recording data 3T to (3+p−1=2+p)T (p pieces of data) are used to form a strategy for data of (3+p)T or over. Heating pulses for (3+p)T consisting of 3T plus p clocks are made by adding the heating pulses for 3T to the start of a (3+p)T strategy. Heating pulses for (4+p)T consisting of 4T plus p clocks are made by adding the heating pulses for 4T to the start of a (4+p)T strategy. Heating pulses for (3+2*p−1=2+2*p)T consisting of (3+p−1=2+p)T plus p clocks are made by adding the heating pulses for (3+p−1=2+p)T to the start of a related strategy. These are repeated every p clocks, to generate top heating pulses of a strategy for every piece of recording data nT.

Each multi-pulse that follows the top heating pulse mentioned above is formed by dividing the frequency of a recording clock by p. The top pulse of a p-clock period is followed by multi-pulses each of p-clock period, the multi-pulse being shifted by one clock corresponding to 1/p of the p-clock period according to the length of data, to maintain the same phase relationship for a pulse at the trailing edge of the data. This phase relationship adjusting method can equalize the formation of a mark trailing edge for each T, to optimize jitters.

The idea mentioned here is a basic idea. As explained above, it is known that short data such as 3T, 4T, and 5T can be improved by finely changing the data according to the recording grooves of a medium, the characteristics of a recording film, and the overshoot of a laser. Accordingly, instead of employing heating pulses at the start of short data as they are for long data, the heating pulses at the start may finely be adjusted according to respective T without departing from the scope of the present invention.

This explanation has been made based on the 8-16 modulation method with shortest data 3T serving as a base. A modulation method using shortest data of 2T of 1-7 modulation and the like may also be employable by replacing 3T in the above explanation with 2T as shortest data.

As explained above, the number m (m is zero or a positive integer) of multi-pulses that follow a first heating pulse with the period of a multi-pulse being equal to three recording clocks is calculated as m=(n−3)/3, where m is an integer obtained by cutting digits below a decimal point.

More precisely, if recording data nT is of a multiple of 3, then m=(n−3)/3. If recording data nT is of a multiple of 3 plus 1, then m=(n−4)/3. If recording data nT is of a multiple of 3 plus 2, then m=(n−5)/3.

Accordingly, it is generalized as m=(n−k)/3(k=3, 4, or 5).

The number m of multi-pulses that follow a top heating pulse when the period of a multi-pulse is equal to p recording clocks is m=(n−k)/p (k is an integer larger than 2 and p is an integer larger than 1), where m is an integer obtained by cutting digits below a decimal point.

Namely, the number of multi-pulses is given by subtracting a coefficient k determined by recording characteristics from recording data and by dividing the difference by a frequency dividing ratio p of a recording clock.

In connection with the 8-16 modulation, it has been found, as mentioned above, from test results of recording/reproducing characteristics that good characteristics are obtainable when k is equal to or greater than 3.

Embodiment of Optical Recording Medium Recording Apparatus

Figure 16:
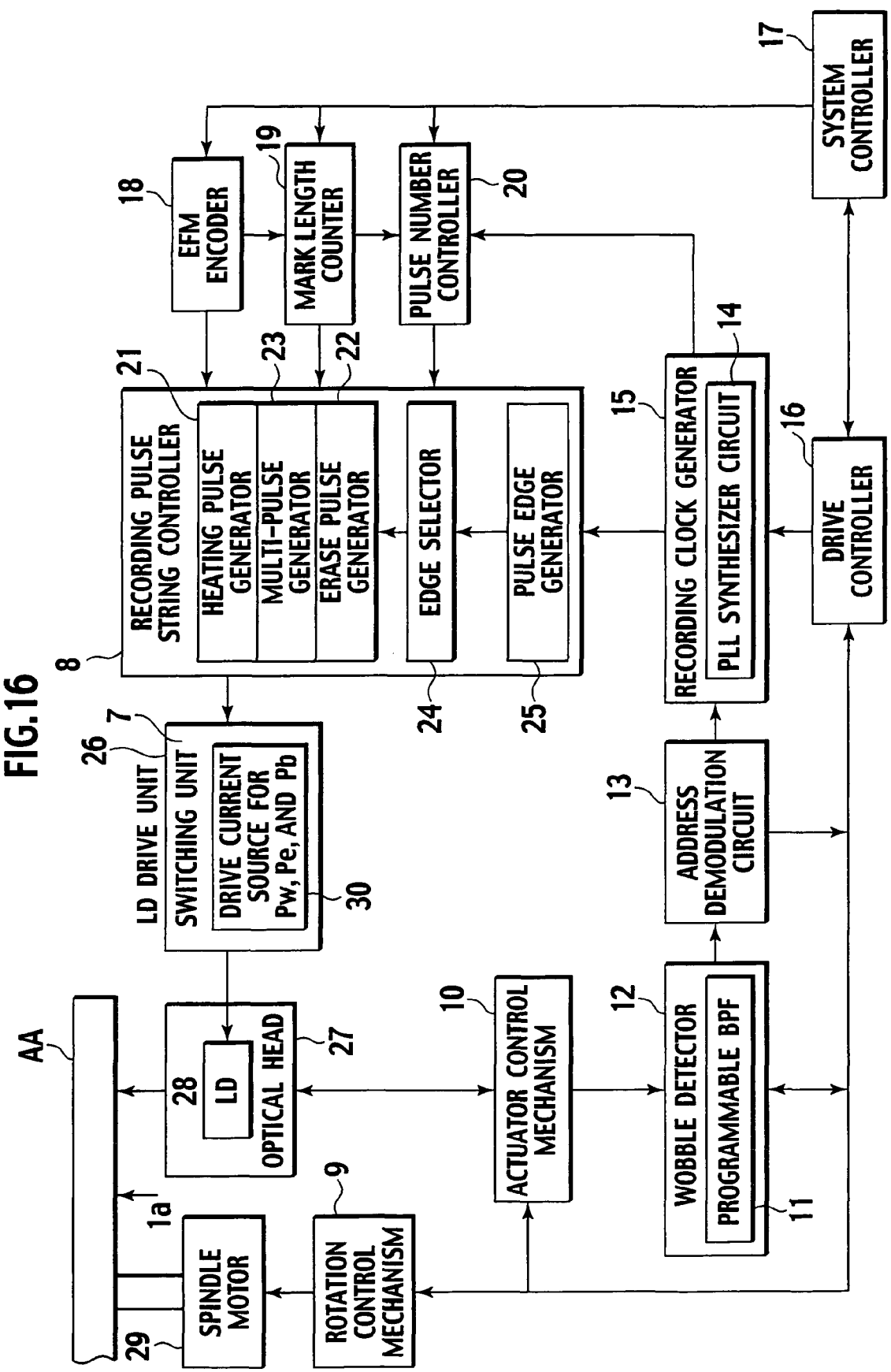
FIG. 16 is a schematic view partly showing an embodiment of an optical recording medium recording apparatus according to the present invention.

An explanation will be made with reference to FIG. 16 in connection with an information recording/reproducing apparatus according to an embodiment of an optical recording medium recording apparatus for recording information on an optical recording medium (optical recording medium AA) with the use of the first and second embodiments of an optical recording method according to the present invention.

For a phase-change optical disk AA, there is arranged a rotation control mechanism 9 including a spindle motor 29 for rotating the phase-change optical disk AA. An object lens for condensing and emitting a laser beam to the phase-change optical disk AA and a light source such as a semiconductor laser LD 28 are provided for an optical head 27, which is freely movable in a radial direction of the disk, to seek the disk. An object lens driver and output system of the optical head 27 are connected to an actuator control mechanism 10.

The actuator control mechanism 10 is connected to a wobble detector 12 including a programmable BPF 11. The wobble detector 12 is connected to an address demodulation circuit 13 for demodulating an address from a detected wobble signal. The address demodulation circuit 13 is connected to a recording clock generator 15 including a PLL synthesizer circuit 14. The PLL synthesizer circuit 14 is connected to a drive controller 16.

The drive controller 16 is connected to a system controller 17 and also to the rotation control mechanism 9, actuator control mechanism 10, wobble detector 12, and address demodulation circuit 13.

The system controller 17 is connected to an EFM encoder 18, a mark length counter 19, and a pulse number controller 20. The EFM encoder 18, mark length counter 19 (including the determination of an odd number or an even number), and pulse number controller 20 (including the control of an odd or even number of multi-pulses $A_m$) are connected to a recording pulse string controller 8. The recording pulse string controller 8 includes a heating pulse generator (recording pulse generator, top pulse generator) 21 to generate a heating pulse control signal containing a top heating portion and a succeeding heating portion (and a cooling pulse portion), an erase pulse generator 22 to generate an erase pulse control signal, a multi-pulse generator 23 to generate a control signal for multi-pulses $A_m$, an edge selector 24 serving as a selector, and a pulse edge generator 25.

An output side of the recording pulse string controller 8 is connected to an LD driver 26 to switch a drive current source 30 for heating power (recording power) Pw, cooling power (bias power) Pb, and erase power Pe to thereby drive the semiconductor laser 28 in the optical head 27.

Pw and Pb in the drive current source 30 serve as heating power driver and cooling power driver, respectively, and Pe as an erase power driver.

To record information on the phase-change optical disk AA with such an arrangement, the rotation control mechanism 9 controls the rotation speed of the spindle motor 29 at a recording linear speed corresponding to an objective recording speed. Thereafter, the optical head 27 provides a push-pull signal from which the programmable BPF 11 detects and separates a wobble signal, which is demodulated into an address. Then, the PLL synthesizer circuit 14 generates a recording channel clock.

The semiconductor laser LD 28 generates a recording pulse string. To achieve this, the recording pulse string controller 8 receives the recording channel clock and EFM data which is recording information, and the heating pulse generator 21 in the recording pulse string controller 8 generates a top heating pulse control signal.

Then, the multi-pulse generator 23 in the recording pulse string controller 8 generates a succeeding heating multi-pulse control signal.

The erase pulse generator 22 generates an erase pulse control signal for an erase portion. The LD driver 26 switches the drive current source 30 to provide light emission power Pw, Pb, and Pe to thereby provide LD light emission waveforms for the recording pulse string.

According to this embodiment, the heating pulse generator 21 is provided with the multi-stage pulse edge generator 25 having a resolution of 1/40 of a recording channel clock period T. An edge pulse supplied to the edge selector (multiplexer) 24 and selected by the system controller 17 is used to generate the top heating pulse control signal and heating multi-pulse control signal. This realizes an adaptive adjustment. A multi-stage delay circuit for the pulse edge generator 25 may consist of high-resolution gate delay elements, a ring oscillator, and a PLL circuit.

The heating pulses thus generated generate a multi-pulse string in synchronization with the recording channel clock, and at the same time, the duty of a heating multi-pulse width determines the pulse width of a cooling pulse.

Similarly, a last cooling pulse is generated. The heating pulse generator 21 separately incorporates a last cooling pulse generator or a cooling pulse generator that includes a multi-stage delay circuit. This delay circuit generates an edge pulse, which is supplied to the edge selector 24 and is selected by the system controller 17 to determine the trailing edge of the last cooling pulse.

The erase pulse generator 22 can finely change a pulse width according to the timing of a heating pulse generated by another multi-stage delay circuit.

A group of these pulses forms an overall recording multi-pulse string. In the recording pulse string controller 8 according to this embodiment, the mark length counter 19 counts, according to a recording clock (period T) (also called a recording channel clock), the mark length of an EFM signal provided by the EFM encoder 18. It determines whether the mark length of the EFM signal is an even number or an odd number. If it is an odd number, the above-mentioned 2T-based top heating pulse is generated, and if it is an even number, the above-mentioned 3T-based top heating pulse is generated. Thereafter, according to the equations 1, 2, and 3 mentioned above, a set of a heating multi-pulse and a cooling multi-pulse associated with the heating multi-pulse is generated whenever the mark count value is incremented by 2T. These multi-pulses are generated through the pulse count controller 20.

At this time, the multi-pulse generation timing is such that it is generated after the 2T-based top heating pulse if an odd number is counted, and if an even number is counted, it is generated after the 3T-based top heating pulse with a 1T-delay from the multi-pulse of the odd-number case.

This operation is realized by selecting the trailing edge of a top heating pulse with the edge selector 24, selecting the leading edge of a succeeding multi-pulse with an edge pulse generated at the next recording channel clock period, and selecting the trailing edge of the multi-pulse with a pulse edge generated at the next recording channel clock period.

The multi-pulse generator may be configured to generate a frequency-divided recording clock by halving the frequency of the recording channel clock, generate an inverted frequency-divided recording clock by inverting the phase of the frequency-divided recording clock by 180 degrees, generate an edge pulse with the use of the generated clock and a multi-stage delay circuit, select front and rear edges with the edge selector, generate a set of a heating multi-pulse and cooling multi-pulse whenever the recording channel clock is incremented by 2T according to the above-mentioned relational expressions, determine whether the mark length of an EFM signal is an even number or an odd number, employ the frequency-divided recording clock if it is an odd number, and employ the inverted frequency-divided recording clock if it is an even number, to generate a phase difference of 1T depending on an even/odd number. According to this configuration, an actual operation frequency of the multi-pulse generator becomes ½ to further increase the speed of a recording operation.

A conventional phase-change optical disk 1 such as a CD-RW or DVD-RW involves a recording pulse string controller to generate pulses such that a set of heating and cooling pulses is incremented set by set whenever a mark data length is incremented by 1T at a given recording speed. According to a recording speed selected from a predetermined recording speed range, a top heating pulse width $A_{top}$, a succeeding heating multi-pulse width $A_m$, a last cooling pulse width $B_r$, and respective light emission power are optimized.

On the other hand, this embodiment may select a recording speed exceeding the predetermined recording speed range. In this case, according to the above-mentioned expressions 1, 2, or 3, the recording pulse string controller 8 is switched to generate pulses so as to increase the number of heating and cooling pulses set by set whenever a mark data length is incremented by 2T. With this, the embodiment can provide an information recording/reproducing apparatus that can cope with a wide range of recording speeds. For example, it is possible to record information on a DVD-RW medium compatible with 2× to 4× recording speed at a high recording speed of about 4× to 8× speed. A DVD-RW medium may be tuned to the high-speed recording method of this embodiment to realize better recording.

A standard information recording/reproducing apparatus employs a semiconductor laser LD4A as a light source. An inexpensive driving circuit can at most provide a rise/fall time of an emission waveform of about 2 nsec. For a phase-change medium employing the above mentioned recording material, sufficient heating time and cooling time are needed. It is necessary, therefore, to secure a settling time of about 2 nsec or over. Accordingly, a maximum recording channel clock frequency will be about 100 MHz. This is equal to about 4× speed (26.16 MHz×4) for DVD-RW. The information recording/reproducing apparatus according to the embodiment, however, can halve the practical frequency of an emission waveform and realize 4× speed to about 8× speed for DVD-RW without increasing the speed of the LD driver 26 serving as a light source driver or without employing expensive arrangements.

The top heating pulse width, last cooling pulse width, and other set values mentioned above are typical values. In practice, optimum values may be employed according to recording materials and medium phase structures. A different recording modulation method, a different recording density, or a different laser beam spot diameter on a medium involves a different cumulative recording waveform length and a different mark length, and therefore, the above-mentioned correspondence examples between mark lengths and recording waveforms may vary.

Although the above-mentioned embodiments employ the EFM method as a recording modulation method to generate recording mark data, the present invention is also applicable to a 1-7 modulation method and the like.

Third Embodiment of Optical Recording Method

A third embodiment of an optical recording method according to the present invention will be explained.

Although not necessary to reiterate, an object of the present invention is to solve the problems given below that occur when the conventional 2T-based strategies are employed for high recording speeds.

1) As shown in the recording pulse string of the conventional multi-pulse strategy (FIG. 3), the method of adjusting the leading edge of a recording pulse to 2T of a recording signal needs "½ T" to adjust the trailing edge of the recording pulse to the trailing edge of the recording signal. This results in increasing circuit scale.

2) As shown in the recording pulse string of the conventional multi-pulse strategy (FIG. 2), the method of adjusting the characteristics of the leading edge and trailing edge of a recording pulse needs "½ T" to adjust the trailing edge of the recording pulse to the trailing edge of the recording signal, like the item 1). This results in increasing circuit scale.

Accordingly, the present invention proposes to turn the phase of a recording clock for a period of 3T of a multi-pulse by 120 degrees between n=3l (n is a positive integer), n=3l+1, and n=3l+2. Also proposed is to differ one clock of recording clocks corresponding to a 3T period depending on whether a recording signal is of an even number or of an odd number.

The number of multi-pulses is set to be an integer expressed as INT((n−3)/3). The sum of the heating and cooling of a top recording pulse is basically set to 2T, 3T, and 4T for n=3l, n=3l+1, and n=3l+2, respectively. (However, they may slightly be changed according to a medium or a recording linear speed, and variable (adaptive) control may be conducted according to a medium, a recording density, or a front-and-rear signal relationship.)

With this arrangement of the present invention, a recording clock for forming a recording signal strategy is achievable with the use of 3T and by finely adjusting the timing of a leading edge and/or a trailing edge. This can reduce circuit scale and jitters.

Figure 17:
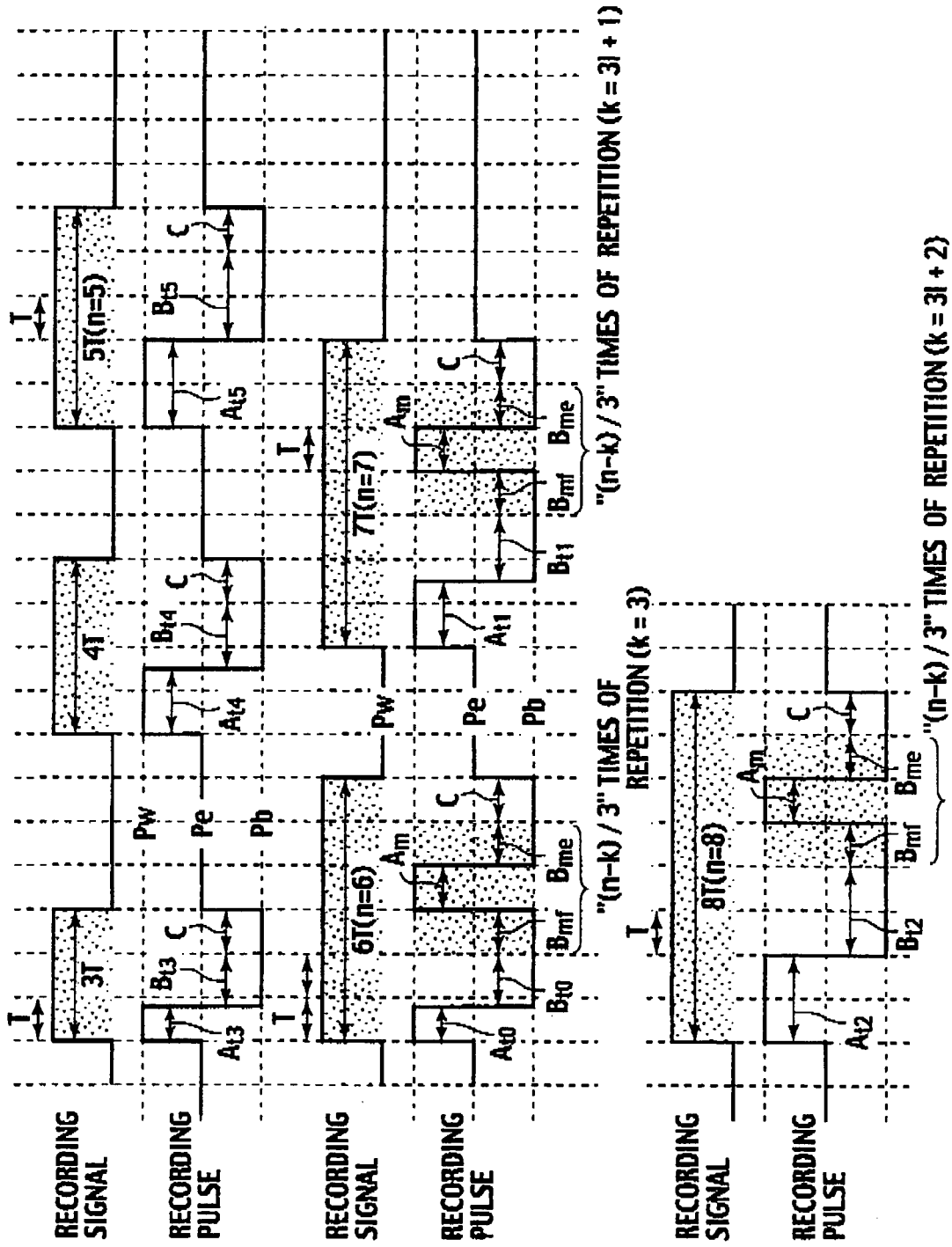
FIG. 17 is a view explaining divided pulse strings according to the third embodiment of an optical recording method of the present invention.

FIG. 17 is a view explaining divided pulse strings according to the third embodiment of an optical recording method of the present invention.

A clock period T is employed at a given linear speed, to record a mark of length nT. Pulse division is conducted to provide m multi-pulses, where m=INT((n−3)/3) with INT being an integer closer to 0. The laser power of an irradiating laser beam is modulated with three values of recording power Pw, erase power Pe, and bias power Pb (where Pw>Pe>Pb). Constant strength periods ($A_t$) of the recording power Pw are set as $A_tT$, $A_1T$, . . . , and $A_mT$. Constant strength periods ($B_t$) of the bias power Pb are set as $B_tT$, $B_{1f}T$, $B_{1e}T$, . . . , $B_{mf}T$, $B_{me}T$, and CT (C=−1 to 3). The power is applied in order of $A_tT$, $B_tT$, $B_{1f}T$, $A_1T$, $B_{1e}T$, . . . , $B_{mf}T$, $A_mT$, $B_{me}T$, and CT to modulate a laser beam. The constant strength period $A_t$ for n=3, n=4, n=5, n≥6 (n=3l), n≥7 (n=3l+1), and n≥8 (n=3l+2) with l being a natural number is set as $A_{t3}$, $A_{t4}$, $A_{t5}$, $A_{t0}$, $A_{t1}$, and $A_{t2}$, the constant strength period $B_t$ for n=3, n=4, n=5, n≥6 (n=3l), n≥7 (n=3l+1), and n≥8 (n=3l+2) is set as $B_{t3}$, $B_{t4}$, $B_{t5}$, $B_{t0}$, $B_{t1}$, and $B_{t2}$, and then, $A_{t3}+B_{t3}=A_{t0}+B_{t0}=2T$, $A_{t4}+B_{t4}=A_{t1}+B_{t1}=B_{mf}+A_m+B_{me}=3T$, and $A_{t5}+B_{t5}=A_{t2}+B_{t2}=4T$).

This can provide a sufficient quenching thermal history for a recording medium having a high crystallization speed, to prevent recrystallization and change a mark thickness and mark length according to set values, thereby providing a sufficient signal amplitude. To improve signal characteristics, for a space length αT in front of a mark having a length nT, a delay time σ of $A_{t3}$, $A_{t4}$, $A_{t5}$, $A_{t0}$, $A_{t1}$, or $A_{t2}$ may be changed according to α=3, α=4, α=5, or α≥6. This results in forming the mark more correctly.

To form a mark nT, a laser beam is modulated in order of $A_tT$, $B_tT$, $A_1T$, $B_1T$, . . . , $A_mT$, $B_mT$, and CT. The length of C may be changed according to n.

Figure 18:
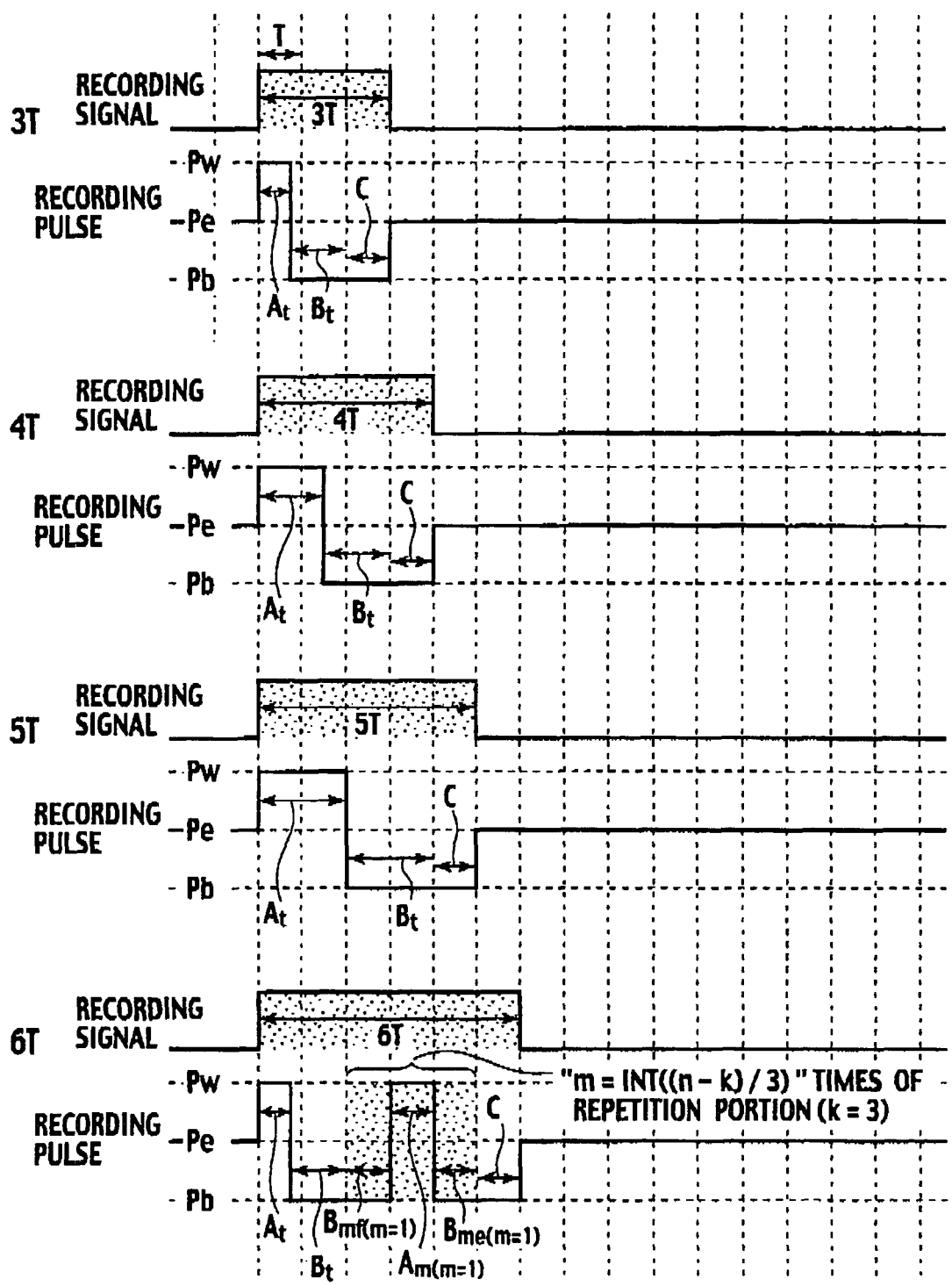
FIG. 18 is a view showing divided pulse waveforms corresponding to recording signals having lengths 3T, 4T, 5T, and 6T among the divided pulse strings shown in FIG. 17.
Figure 19:
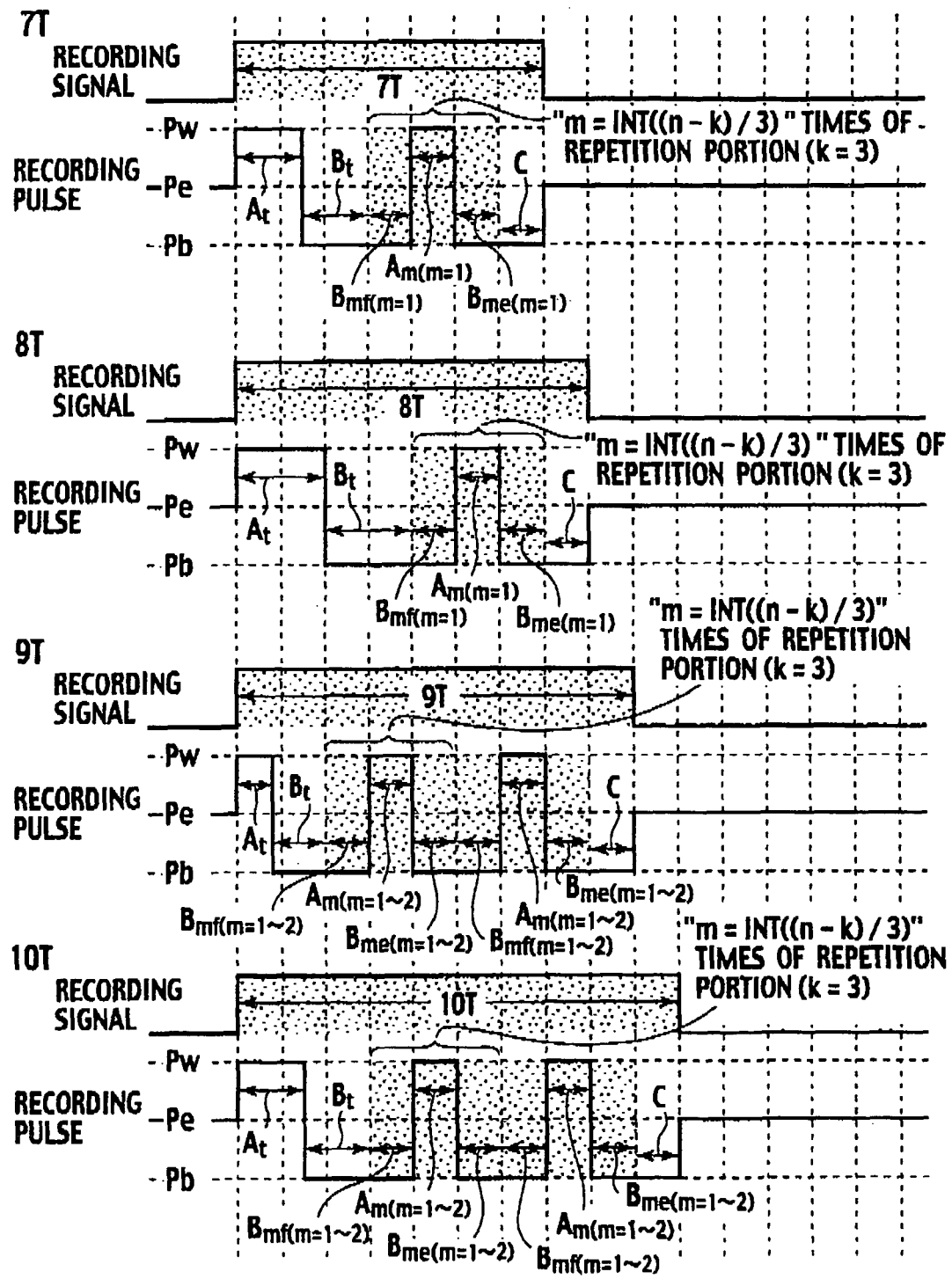
FIG. 19 is a view showing divided pulse waveforms corresponding to recording signals having lengths 7T, 8T, 9T, and 10T among the divided pulse strings shown in FIG. 17.

For recording pulses corresponding to data having a length nT (n≥6) and sequentially consisting of a top pulse, intermediate pulses, and a rear-end pulse, the embodiment advances or delays a phase of intermediate pulses by 120 degrees between n=3l, n=3l+1, and n=3l+2 (l being a natural number). For example, as shown in FIG. 18, recording pulses at 3T to 5T positions from the leading edge of a recording signal of length 6T involve an intermediate pulse $A_m$ only at a 4T position (one intermediate pulse $A_m$ in a 3T period). As shown in FIG. 19, recording pulses at 4T to 6T positions from the leading edge of a recording signal of length 7T involve an intermediate pulse $A_m$ only at a 5T position. Recording pulses at 5T to 7T positions from the leading edge of a recording signal of length 8T involve an intermediate pulse $A_m$ only at a 6T position. Recording pulses at 3T to 5T positions from the leading edge of a recording signal of length 9T involve an intermediate pulse $A_m$ at a 4T position, and recording pulses at 6T to 8T positions from the leading edge thereof involve an intermediate pulse $A_m$ at a 7T position. Recording pulses at 4T to 6T positions from the leading edge of a recording signal of length 10T involve an intermediate pulse $A_m$ at a 5T position, and recording pulses at 7T to 9T positions from the leading edge thereof involve an intermediate pulse $A_m$ at an 8T position. As shown in FIG. 20, recording pulses at 5T to 7T positions from the leading edge of a recording signal of length 11T involve an intermediate pulse $A_m$ at a 6T position, and recording pulses at 8T to 10T positions from the leasing edge thereof involve an intermediate pulse am at a 9T position. Recording pulses at 5T to 7T positions from the leading edge of a recording signal of length 14T involve an intermediate pulse $A_m$ at a 6T position, and recording pulses at 8T to 10T and 11T to 13T positions from the leading edge thereof involve intermediate pulses $A_m$ at 9T and 12T positions, respectively.

A recording signal modulation method may be 1-7 modulation, 8-16 (EFM) modulation, EFM+ modulation, and the like. An optical recording medium used for the present invention is the same as the optical recording medium AA shown in FIG. 8, and therefore, the explanation thereof is omitted.

Twenty-first to thirty-second embodiments of an optical recording medium according to the present invention, as well as comparisons 21 to 28 will be explained with reference to FIG. 21. As an example of the optical recording medium AA, a phase-change optical disk will be explained. The comparisons 21 to 28 are the same as the comparisons 1 to 8 shown in FIG. 9, and therefore, their explanations are omitted. Measurement conditions are the same as those used to measure the data of FIG. 9, and therefore, their explanations are omitted.

Twenty-First Embodiment of Optical Recording Medium

Pulse strings according to the present invention were used. Pulse widths in recording conditions of a recording strategy for a linear speed of 14 m/s (hereinafter referred to as 4× speed) were $A_{t3}=A_{t0}=0.85[T]$, $A_{t4}=A_{t1}=1.10[T]$, $A_{t5}=A_{t2}=1.30[T]$, $A_m=0.95[T]$, and C=1.00[T] and those for a linear speed of 21 m/s (hereinafter referred to as 6× speed) were $A_{t3}=A_{t0}=0.90[T]$, $A_{t4}=A_{t1}=1.50[T]$, $A_{t5}=A_{t2}=1.80[T]$, $A_m=0.90[T]$, and C=0.50[T] (refer to FIG. 17). Recording power Pw and erase power Pe were selected so that Pw/Pe=18.0/9.0 mW for 4× speed and Pw/Pe=22.5/10.5 mW for 6× speed. For both the speeds, bottom power was 0.5 mW. Ten times of overwrite operation were conducted on tracks including adjacent tracks.

Then, clock-to-data jitters and signal strength (hereinafter referred to as modulation factor) were measured on reproduced signals. For 4× speed and 6× speed, the jitters were 9.0% and 10.5%, respectively, and the modulation factors were 72% and 67%, respectively. These values indicate good characteristics (refer to FIG. 12A for eye patterns of 6× speed). Here, the modulation factor is expressed as (I14)/(I14H)×100 (refer to FIG. 13).

Twenty-Second Embodiment of Optical Recording Medium

For 6×-speed recording, duties σ(T) of delay times of the top pulses $A_t$ of mark lengths 3T, 4T, and 5T or longer that follow a 3T space were set as 0.1, 0.2, and 0.2, duties σ(T) of delay times of the top pulses $A_t$ of mark lengths 3T, 4T, and 5T or longer that follow a 4T space were set as 0.2, 0.2, and 0.3, and duties σ(T) of delay times of the top pulses $A_t$ of mark lengths 3T, 4T, and 5T or longer that follow a 5T space were set as 0.3, 0.3, and 0.4. The other conditions were the same as those of the recording strategy of the twenty-first embodiment.

Measurements similar to those of the twenty-first embodiment were carried out, and as shown in FIG. 21, a jitter of the 6×-speed recording was 9.8% that is better than that of the twenty-first embodiment.

Twenty-Third Embodiment of Optical Recording Medium

The recording layer 3 was made by the co-spattering of a three-element single alloy target of In—Sb—Te and a simple Sb target, to have a composition ratio of $In_5Sb_{74}Te_{21}$. Except this, the same conditions as those of the twenty-first embodiment were used to form an optical recording medium. 4×-speed recording, i.e., 14-m/s linear speed recording was carried out with a recording strategy involving pulse widths of $A_{t3}=A_{t0}=1.10[T]$, $A_{t4}=A_{t1}=1.40[T]$, $A_{t5}=A_{t2}=1.50[T]$, $A_m=1.10[T]$, and $C=0.50[T]$. The same 4x-speed measurement as that of the twenty-first embodiment was conducted, and as shown in FIG. 21, substantially the same characteristics as those of the twenty-first embodiment were obtained.

Twenty-Fourth Embodiment of Optical Recording Medium

The recording layer 3 was made by the co-spattering of a three-element single alloy target of In—Sb—Te and a simple Sb target, to have a composition ratio of $In_5Sb_{79}Te_{16}$. Except this, the same conditions as those of the twenty-first embodiment were used to form an optical recording medium. 6x-speed recording, i.e., 21-m/s linear speed recording was carried out with a recording strategy involving pulse widths of $A_{t3}=A_{t0}=0.75[T]$, $A_{t4}=A_{t1}=1.00[T]$, $A_{t5}=A_{t2}=1.10[T]$, $A_m=0.85[T]$, and $C=1.20[T]$. The same 6x-speed measurement as that of the twenty-first embodiment was conducted, and as shown in FIG. 21, substantially the same characteristics as those of the twenty-first embodiment were obtained.

Twenty-Fifth Embodiment of Optical Recording Medium

The recording layer 3 was made by the co-spattering of a two-element single alloy target of Sb—Te and a Ge target, to have a composition ratio of $Ge_2Sb_{80}Te_{18}$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Twenty-Sixth Embodiment of Optical Recording Medium

The recording layer 3 was made by the co-spattering of a three-element single alloy target of In—Sb—Te and a Ge target, to have a composition ratio of $Ge_4In_5Sb_{75}Te_{16}$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Twenty-Seventh Embodiment of Optical Recording Medium

The recording layer 3 was made by the co-spattering of a four-element single alloy target of Ge—In—Sb—Te and an Ag target, to have a composition ratio of $Ge_1In_5Sb_{76}Te_{17}Ag_1$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Twenty-Eighth Embodiment of Optical Recording Medium

The recording layer 3 was made by the co-spattering of a four-element single alloy target of Ge—In—Sb—Te and a Ti target, to have a composition ratio of $Ge_1In_5Sb_{76}Te_{17}Ti_1$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Twenty-Ninth Embodiment of Optical Recording Medium

The recording layer 3 was made by the co-spattering of a four-element single alloy target of Ge—In—Sb—Te and an Si target, to have a composition ratio of $Ge_1In_5Sb_{76}Te_{17}Si_1$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Thirtieth Embodiment of Optical Recording Medium

The recording layer 3 was made by the co-spattering of a four-element single alloy target of Ge—In—Sb—Te and an Al target, to have a composition ratio of $Ge_1In_5Sb_{76}Te_{17}Al_1$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Thirty-First Embodiment of Optical Recording Medium

The recording layer 3 was made by the co-spattering of a four-element single alloy target of Ge—In—Sb—Te and a Bi target, to have a composition ratio of $Ge_1In_5Sb_{74}Te_{16}Bi_2$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

Thirty-Second Embodiment of Optical Recording Medium

The recording layer 3 was made by the co-spattering of a four-element single alloy target of Ge—In—Sb—Te and a Ga target, to have a composition ratio of $Ge_1In_5Sb_{74}Te_{16}Ga_2$. Except this, the same optical recording medium as that of the twenty-first embodiment was prepared. Measurements similar to those of the twenty-first embodiment were carried out, and as shown in FIG. 21, characteristics substantially equivalent to those of the twenty-first embodiment were obtained for both the 4x-speed recording and 6x-speed recording.

The present invention reasonably solves the above-mentioned problems as mentioned below.

(1) A recording signal 3T (a rectangular pulse having length 3T) is written with a top pulse $A_{t3}$ having peak power Pw and $B_{t3}+C$, which is a cooling interval, both having bias power Pb (refer to FIG. 17).

(2) A recording signal 4T is recorded with a top pulse $A_{t4}$ having peak power Pw and $B_{t4}+C$, which is a cooling interval, both having bias power Pb, i.e., with a single recording pulse like recording the signal 3T (refer to FIG. 17). This method may slightly widen in a track direction the shape of a mark recorded with the signal 4T on a medium, but can greatly improve jitters related to the recorded signal 4T.

(3) A recording signal 5T is written with a single recording pulse like the recording signal 3T with a top pulse $A_{t5}$ having peak power Pw and $B_{t5}$+C, which is a cooling interval, both having bias power Pb (refer to FIG. 17).

(4) If the cooling interval C is fixed, the sum of the top pulse $A_{t3}$ and $B_{t3}$ of the recorded signal 3T becomes substantially 2T, the sum of the top pulse $A_{t4}$ and $B_{t4}$ becomes substantially 3T, and the sum of the top pulse $A_{t5}$ and $B_{t5}$ becomes substantially 4T.

The cooling interval C is part of a cooling pulse interval necessary for forming the trailing edge of a mark and is an element time period determined by the physical properties of a medium, a recording linear speed, and the like.

(5) In connection with recording pulses for recording signals equal to or longer than 6T, any recording signal of n=3l (l being a natural number) may consist of the sum of the top pulse $A_{t3}$ and $B_{t3}$ of the recording signal 3T and successively added 3T multi-pulses each composed of a peak level pulse and bias level pulse. Any recording signal of n=3l+1 (l being a natural number) may consist of the sum of the top pulse $A_{t4}$ and $B_{t4}$ of the recording signal 4T and successively added 3T multi-pulses each composed of a peak level pulse and bias level pulse. Any recording signal of n=3l+2 (l being a natural number) may consist of the sum of the top pulse $A_{t5}$ and $B_{t5}$ of the recording signal 5T and successively added 3T multi-pulses each composed of a peak level pulse and bias level pulse.

(6) This can be generalized as shown in FIG. 17.

Namely, among recording signals of 6T or longer, any recording signal of n=3l (l being a natural number) may consist of top pulse $A_{t0}$ and $B_{t0}$ based on the recording signal 3T followed by multi-pulses $A_m$ of 3T. The number of multi-pulses $A_m$ is defined as m=(n−3)/3.

More generally, it is as follows:

$$m=(n-k)/3 \quad \text{(Equation 4)}$$

where k=3 (n is the interval of a recording signal T and is equal to 3l).

Any recording signal of n=3l+1 (l being a natural number) may consist of top pulse $A_{t1}$ and $B_{t1}$ based on the recording signal 4T followed by multi-pulses $A_m$ of 3T. The number of multi-pulses $A_m$ is defined as m=(n−4)/3.

More generally, it is as follows:

$$m=(n-k)/3 \quad \text{(Equation 5)}$$

where k=4 (n is the interval of a recording signal T and is equal to 3l+1).

Any recording signal of n=3l+2 (l being a natural number) may consist of top pulse $A_{t1}$ and $B_{t1}$ based on the recording signal 5T followed by multi-pulses $A_m$ of 3T. The number of multi-pulses $A_m$ is defined as m=(n−5)/3.

More generally, it is as follows:

$$m=(n-k)/3 \quad \text{(Equation 6)}$$

where k=5 (n is the interval of a recording signal T and is equal to 3l+2).

The equations can be made common to 3l, 3l+1, and 3l+2 as follows:

$$m=\text{INT}((n-3)/3) \quad \text{(Equation 7)}$$

(n is the interval of a recording signal T) (m is a positive integer including 0)

Here, INT is an integer operation to provide a number closer to 0 so that the three equations can be made common to 3l, 3l+1, and 3l+2. When n=2, a value of $A_m$ will be negative. In this case, resultant digits below a decimal point are cut to provide a target value.

(7) FIGS. 15 and 17 show the waveforms of recording pulses corresponding to recording signals T (rectangular pulses each having length nT) based on this idea.

As is apparent from these figures, alternating the recording top pulses between recording signal of 3l times (length of 3l times the length of T), a recording signal of 3l+1 (length of 3l+1 times the length of T), and a recording of signal of 3l+2 (length of 3l+2 times the length); inverting the phases of multi-pulses (intermediate pulses) by 120 degrees or shifting them by 1T between adjacent recording signals T, and adding a multi-pulse (intermediate pulse) of a period 3T whenever a recording signal is elongated by 3T can equalize the waveform of a recording pulse at the trailing edge of each recording signal T, thereby reducing jitters.

Forming these recording pulse waveforms is realized by a circuit structure based on the above-mentioned combination. Namely, a simple circuit structure is sufficient to achieve the waveforms. The 8-16 modulation employed by DVDs and the like employs 3T to 11T and 14T. FIG. 16 shows recording signals of 3T to 11T and 14T because, as is apparent from this explanation, the same idea is applicable to generate any recording pulse.

Although the embodiments show only basic recording strategy arrangements, improvements given below are also possible.

In FIG. 17:

a) a time $A_m$ for the top pulse of a recording signal nT is increased as in the cases of n=3, n=4, n=5, and n≥6 (n being a positive number) by increasing a parameter for T according to n (for example, $A_{t3}<A_{th}<A_{t9}$);

b) a delay time α for the timing of a leading edge of the top pulses $A_{t3}T, A_{t4}T, A_{t5}T, A_{t0}T, A_{t1}T,$ and $A_{t2}T$ of marks having lengths nT may be changed as α=3, α=4, α=5, and α≥6;

c) a delay time for the timing of a leading edge of the top pulses $A_{t3}T, A_{t4}T, A_{t5}T, A_{t0}T, A_{t1}T,$ and $A_{t2}T$ may be changed by increasing a parameter α of a space length αT in front of a mark having a length nT like α=3, α=4, α=5, and α≥6;

d) although not shown in detail in FIG. 17, the timing of the trailing edge of a top pulse is changed according to a recording signal nT;

e) the timing of the leading edge of a first multi-pulse $A_m$ among multi-pulses (intermediate pulses) $A_m$ is changed according to a recording signal nT;

f) the timing of the trailing edge of a last multi-pulse $A_m$ among multi-pulses (intermediate pulses) $A_m$ is changed according to a recording signal nT;

g) a bias section C at the trailing edge of a last multi-pulse $A_m$ among multi-pulses (intermediate pulses) $A_m$ is changed according to a recording signal nT;

h) a duty between 3T of a multi-pulse (intermediate pulse) $A_m$ and bias section $B_n$, is changed according to a medium kind and the like; and i) any one of the items a to h or a combination thereof can improve characteristics.

Another Embodiment of Optical Recording Medium Recording Apparatus

An information recording/reproducing apparatus as an embodiment of an optical recording medium recording apparatus for recording information on an optical recording medium (optical recording medium AA) with the use of the above-mentioned third embodiment of an optical recording method according to the present invention will be explained with reference to FIG. 16. The same components as those mentioned above will be represented with the same marks and their explanations are omitted. Different points from the optical recording method of the first embodiment shown in FIG. 4 will be explained.

A system controller 17 is connected to an EFM encoder 18, a mark length counter 19, and a pulse number controller 20. The EFM encoder 18, mark length counter 19 (including the determination of 3T, 4T, 5T, 3lT, (3l+1)T, (3l+2)T), and the like), and a pulse number controller 20 (including the control of multi-pulses $A_m$ of 3l, 3l+1, and 3l+2) are connected to a recording pulse string controller 8.

To record information on the phase-change optical disk AA with such an arrangement, a rotation control mechanism 9 controls the rotation speed of a spindle motor 29 at a recording linear speed corresponding to an objective recording speed. Thereafter, an optical head 27 provides a push-pull signal from which a programmable BPF 11 detects and separates a wobble signal, which is demodulated into an address. Then, a PLL synthesizer circuit 14 generates a recording channel clock.

A semiconductor laser LD 28 generates a recording pulse string. To achieve this, the recording pulse string controller 8 receives the recording channel clock and EFM data which is recording information, and a heating pulse generator 21 in the recording pulse string controller 8 generates a top heating pulse control signal.

Then, a multi-pulse generator 23 in the recording pulse string controller 8 generates a succeeding heating multi-pulse control signal. An erase pulse generator 22 generates an erase pulse control signal for an erase portion. An LD driver 26 switches a drive current source 30 to provide light emission power Pw, Pb, and Pe to thereby provide LD light emission waveforms for the recording pulse string.

According to this embodiment, the heating pulse generator 21 is provided with a multi-stage pulse edge generator 25 having a resolution of 1/40 of a recording channel clock period T. An edge pulse supplied to an edge selector (multiplexer) 24 and selected by the system controller 17 is used to generate the top heating pulse control signal and heating multi-pulse control signal. This realizes an adaptive adjustment. A multi-stage delay circuit for the pulse edge generator 25 may consist of a high-resolution gate delay element, ring oscillator, and PLL circuit.

The heating pulses thus generated generate a multi-pulse string in synchronization with the recording channel clock, and at the same time, the duty of a heating multi-pulse width determines the pulse width of a cooling pulse.

Similarly, a last cooling pulse is generated. The heating pulse generator 21 separately incorporates a last cooling pulse generator or a cooling pulse generator that includes a multi-stage delay circuit. This delay circuit generates an edge pulse, which is supplied to the edge selector 24 and is selected by the system controller 17 to determine the trailing edge of the last cooling pulse.

The erase pulse generator 22 can finely change a pulse width according to the timing of a heating pulse generated by another multi-stage delay circuit.

A group of these pulses forms an overall recording multi-pulse string.

The recording pulse string controller 8 according to this embodiment is provided with the mark length counter 19 that counts, according to a recording clock (period T) (also called a recording channel clock), the mark length of an EFM signal provided by the EFM encoder 18. It determines whether the mark length of the EFM signal is (3l), (3l+1), or (3l+2). If it is (3l), the above-mentioned 2T-based top heating pulse is generated, if it is (3l+1), the above-mentioned 3T-based top heating pulse is generated, and if it is (3l+2), the above-mentioned 4T-based top heating pulse is generated. Thereafter, according to the equations 4, 5, 6, and 7 mentioned above, a set of a heating multi-pulse and a cooling multi-pulse associated with the multi-pulse is generated whenever the mark count value is incremented by 3T. These multi-pulses are generated through the pulse count controller 20.

At this time, the multi-pulses are generated after the 2T-based top heating pulse if the EFM signal mark length is (3l), they are generated after the 3T-based top heating pulse if the length is (3l+1), and they are generated with a 1T-delay compared with the multi-pulses of the odd-number case if the length is (3l+2).

This operation is realized by selecting the trailing edge of a top heating pulse with the edge selector 24, selecting the leading edge of a succeeding multi-pulse with an edge pulse generated at the next recording channel clock period, and selecting the trailing edge of the multi-pulse with a pulse edge generated at the next recording channel clock period.

The multi-pulse generator may be configured to generate a frequency-divided recording clock by dividing the frequency of the recording channel clock by 3, generate an inverted frequency-divided recording clock by shifting the phase of the frequency-divided recording clock by 120 degrees, generate an edge pulse with the use of the generated clock and a multi-stage delay circuit, select front and rear edges with the edge selector, generate a set of a heating multi-pulse and cooling multi-pulse whenever the recording channel clock is incremented by 3T according to the above-mentioned relational expressions, determine whether the mark length of an EFM signal is (3l), (3l+1), or (3l+2), employ the frequency-divided recording clock if it is (3l), employ the 120-degree inverted frequency-divided recording clock if it is (3l+1), and employ the 240-degree inverted frequency-divided recording clock if it is (3l+2), to generate a phase difference of 1T depending on (3l), (3l+1), or (3l+2).

According to this configuration, an actual operation frequency of the multi-pulse generator becomes 1/3 to further increase the speed of a recording operation.

A general strategy (refer to FIG. 1) used for a conventional phase-change optical disk such as a CD-RW or DVD-RW involves a recording pulse string controller to generate pulses such that a set of heating and cooling pulses is incremented set by set whenever a mark data length is incremented by 1T at a given recording speed. According to a recording speed selected from a predetermined recording speed range, a top heating pulse width $T_{top}$, a succeeding heating multi-pulse width $T_{mp}$, a last cooling pulse width $T_{cl}$, and respective light emission power are optimized.

On the other hand, this embodiment may select a recording speed exceeding the predetermined recording speed range. In this case, according to the above-mentioned expressions 4, 5, 6, and 7, the recording pulse string controller 8 is switched to generate pulses so as to increase the number of heating and cooling pulses set by set whenever a mark data length is incremented by 3T. With this, the embodiment can provide an information recording/reproducing apparatus that can cope with a wide range of recording speeds.

A standard information recording/reproducing apparatus employs a semiconductor laser LD28 as a light source. An inexpensive driving circuit can at most provide a rise/fall time of an emission waveform of about 2 nsec. For a phase-change medium employing the above mentioned recording material, sufficient heating time and cooling time are needed. It is necessary, therefore, to secure a settling time of about 2 nsec or over.

Accordingly, a maximum recording channel clock frequency will be about 100 MHz. This is equal to about 4× speed (26.16 MHz×4) for DVD-RW.

The information recording/reproducing apparatus according to the embodiment, however, can reduce the practical frequency of an emission waveform to ⅓ and realize 6× speed to about 12× speed for DVD-RW without increasing the speed of the LD driver 2 serving as a light source driver or without employing expensive arrangements.

The top heating pulse width, last cooling pulse width, and other set values mentioned above are typical values. In practice, optimum values may be employed according to recording materials and medium phase structures.

A different recording modulation method, a different recording density, or a different laser beam spot diameter on a medium involves a different cumulative recording waveform length and a different mark length, and therefore, the above-mentioned correspondence examples between mark lengths and recording waveforms may vary.

Although the above-mentioned embodiments employ the EFM method as a recording modulation method to generate recording mark data, the present invention is also applicable to a 1-7 modulation method and the like.

The gist of a technical idea of the present invention is to control the number (m) of multi-pulses. This can be generalized as given below with a recording pulse period being 1/p obtained by dividing the frequency of a recording clock by p (p is an integer larger than 2).

$$m=(n-k)/p \tag{Equation 8}$$

(k is a positive integer coefficient determined by the recording characteristics of a medium and the like)

(m is a positive integer including 0 with digits below a decimal point being cut)

According to the embodiment, p=3 and k=3, 4, or 5 in the equation 8. This agrees with the equations 4 to 6.

The present invention is effective not only when dividing the frequency of a recording clock by 3 but also when dividing the frequency of a recording clock by 2, 4, or a larger number depending on a recording speed. For example, if p=2 (the case of halving the frequency of a recording clock), pulses using k=3 and k=4 maybe employed. Depending on an even/odd data length, a top pulse is followed by one-clock shift corresponding to ½ phase with respect to a 2-clock period, to thereby maintain the phase relationship of a pulse at a data trailing edge. In this way, the phase relationship is adjusted.

This method can equalize the formation of a mark trailing edge for each T. This results in recording marks with optimized data jitters. Similarly, if p=4 (the case of dividing the frequency of a recording clock by 4), the number of multi-pulses is determined with k=3, 4, 5, or 6, to provide good recording characteristics.

The idea mentioned here is a basic idea. As explained above, it is known that short data such as 3T, 4T, and 5T can be improved by finely changing the data according to the recording grooves of a medium, the characteristics of a recording film, and the overshoot of a laser. Accordingly, instead of employing heating pulses at the start of short data as they are for long data, the heating pulses at the start may finely be adjusted according to respective T without departing from the scope of the present invention.

Embodiments of Optical Disk and Optical Disk Recording/Reproducing Apparatus

Embodiments of an optical disk and optical disk recording/reproducing apparatus according to the present invention will be explained.

An optical disk according to the present invention is capable of coping with rapidly advancing high multiplied speed without changing standards, consuming environmental energy, or modifying equipment design, capable of realizing smooth standardization to expedite market advancement, and capable of coping with multiple speeds while eliminating useless information, effectively improving redundancy, and effectively using areas.

An optical disk of the present invention records information with a laser beam emitted from an optical pickup and has an information management area and an information recording area. The information management area stores, in a plurality of recording management information sections corresponding to multiplied-speed information, recording power and recording strategy information used to store information in the information recording area, as well as multiplied-speed information used to record information on the optical disk.

An optical disk recording/reproducing apparatus according to the present invention is capable of grasping the multiple speed of an inserted optical disk of the present invention, selecting an optimum multiplied speed for the optical disk to record information thereon, dropping an equipment's standard multiplied recording speed to a recordable speed if the optical disk is suffered from a temperature increase, surface misalignment, or eccentricity, and easily, quickly, reliably reading information from an optical disk that is compatible with multiple speeds, has no useless information, and includes high redundancy.

Embodiments of the optical disk and optical disk recording/reproducing apparatus of the present invention will be explained with reference to the drawings.

In connection with a high-density optical disk according to an embodiment of the optical disk of the present invention, correcting a recording laser waveform to an optimum shape according to the kind of the optical disk and a recording linear speed will be explained first.

Figure 22:
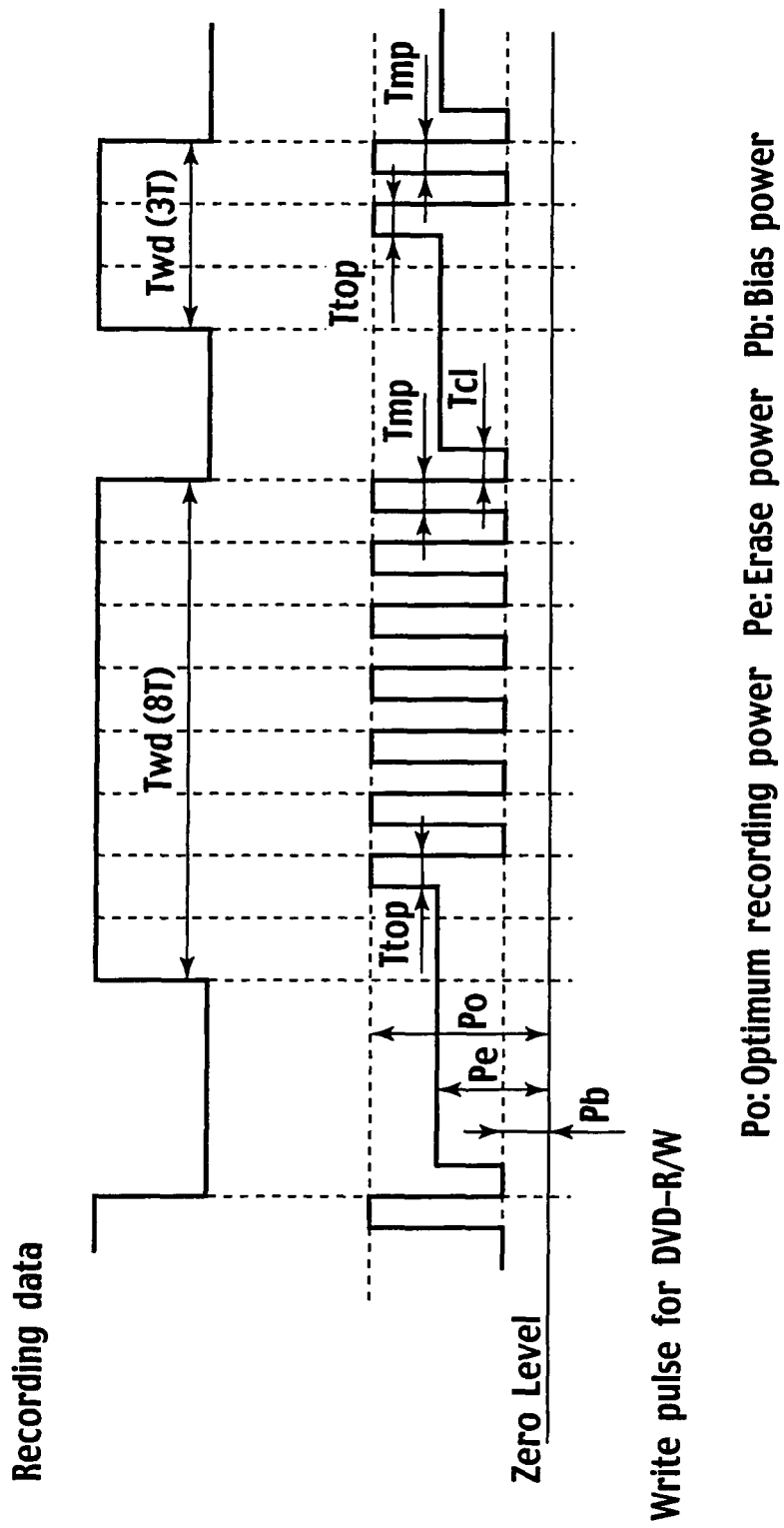
FIG. 22 is a recording waveform diagram showing a basic action of an embodiment of an optical disk according to the present invention.

FIG. 22 shows a recording waveform of a DVD-RW according to an embodiment of an optical disk of the present invention. This recording data is an example of an input waveform of an 8-16 modulation signal. T is a clock period of a recording clock to record data. To form marks, recording signal power levels corresponding to 8T and 3T involve recording power Po for a recording portion, erase power Pe for an erase portion, and bias power Pb for a multi-pulse contained in the recording power and for a cooling pulse $T_{cl}$ generated at a switching point between recording and erasing. The bias power Pb is equal to reproducing power of DVD-RW. A recording timing strategy conducts optimum recording by optimizing a recording top $T_{top}$, the duty of a multi-pulse $T_{mp}$, and the time of a cooling pulse $T_{cl}$.

Although not shown in the figure, an optical disk DVD-R is realized by changing the erase power Pe of the DVD-RW to reproducing power and eliminating the cooling power $T_{cl}$ of the DVD-RW. Then, the DVD-R can be explained like the DVD-RW. Instead of employing multi-pulses between the recording power and the reproducing power, a strategy for DVD-RW is realizable by decreasing the power level of an intermediate section lower than that of the top and last sections. This can be explained by defining a decrease level of the intermediate power and the timing thereof.

As stipulated in Japanese Unexamined Patent Application Publications No. 2001-312823 and No. 2001-148124 of this applicant, DVD-R and DVD-RW involve a recordable data area and a lead-in area in which recording groove tracks wobble (at a given frequency (about 140 KHz at a 1× linear speed of 3.49 m/s)). A land between grooves embeds address information in the form of land pre-pits (hereinafter referred to as LPPs).

The LPP information has an ECC block length, which is a recording/reproducing correction unit of a recording signal, and consists of an address and other information that form a unit. One block consists of 16 fields. The details thereof are shown in FIGS. 23 to 29.

The unit information is called a field ID. FIG. 25 shows a field ID0. This information is the contents of a normal data area. Namely, a field ID consists of a part A and part B. The part A includes an ECC block address and its parity. The part B stores information specific to the field ID. The field ID0 includes part A and part B that store two ECC block addresses, their parities, and a field ID value. For a 1× speed (a linear speed of 3.49 m/s) disk, the field IDs include ID0 to ID5 as shown in FIG. 23. Except the field ID0, all field IDs are recorded in a lead-in area.

Although not explained in detail, the part B of the field ID1 stores a field ID value, an application code representing usage information such as general use, special use, and the like, and a physical code representing physical specification information such as a track pitch, a linear speed, a diameter, a reflectance, a recording method type (phase change or other than that), recordable, rewritable, and the like. The parts B of the fields ID3 and ID4 include field ID values and manufacturer IDs.

The part B of the field ID2, shown in FIG. 26 includes a field ID value (2), an OPC recommended code, and a write strategy code 1. The OPC recommended code specifies recording power Po of FIG. 22 recommended by a disk maker, erase power Pe (or the ratio ∈ (Pe/Po) of the erase power Pe to the recording power Po), and if needed, β or a recommended asymmetry value (optimum recording information) to determine recording conditions, i.e., the position of a short T relative to a long T in the amplitudes of a signal of 8-16 modulation reproduced from a recorded signal. The write strategy code 1 includes recommended time information about $T_{top}$, $T_{mp}$, and $T_{cl}$ of the strategy of FIG. 22.

The part B of the field ID5 shown in FIG. 27 includes a field ID value (5), a write strategy code 2, and information corresponding to a multiplied speed value. The write strategy code 2 includes recommended time information of $T_{top}$, $T_{mp}$, and $T_{cl}$ of a strategy having a different waveform from FIG. 22. The multiplied speed value indicates a multiplied speed at which the disk is recordable. What are written are a recommended multiplied speed value (for example, if a 1× linear speed is 3.49 m/s, the value of 3.49, or the multiplied speed value of 1, or a hexadecimal code thereof), and preferably, recommended values for optimum recording information (β or an asymmetry value (optimum recording information) to determine recording conditions, i.e., the position of a short T relative to a long T in the amplitudes of a signal reproduced from a recorded signal).

As mentioned above, the optimum recording information may be written in the OPC recommended code as will be explained later. A disk having many multiplied speeds include many field IDs. The contents shown in the field ID2 and field ID5 are values for 1× speed as shown in the field ID5. For a disk compatible only with 1× speed, the multiplied speed value may be omitted.

FIG. 24 shows the structure of field IDs of a disk compatible with 1× speed (a linear speed of 3.49 m/s), 2× speed (a linear speed of 3.49*2 m/s), and mX speed (for example, 4×, 6×, or 8×) (a linear speed of 3.49*m m/s). In FIG. 24, a part encircled with a thick line is the same as that of FIG. 23 except the description of 1× speed. Like the part B of the field ID2, a field ID6 in FIG. 24 is the case with n of FIG. 28 being 6 and includes a field ID value (6) corresponding to 2× speed, an OPC recommended code, and a write strategy code 1. The OPC recommended code is of 2× speed recommended by a disk maker and indicates recording power Po and erase power Pe of FIG. 22, and if required, β or an asymmetry value (optimum recording information) to determine recording conditions, i.e., the position of a short T relative to a long T in the amplitudes of a signal reproduced from a recorded signal.

The write strategy code 1 describes recommended time information about $T_{top}$, $T_{mp}$, and $T_{cl}$ of the strategy of FIG. 22.

A field ID7 of FIG. 24 is of when n+1 of FIG. 29 is 7. Like the part B of the field ID 5 of FIG. 27, it describes a 2× speed field ID value (7), a write strategy code 2, and a multiplied speed value. The write strategy code 2 describes recommended time information for $T_{top}$, $T_{mp}$, and $T_{cl}$ of a strategy having a different waveform from FIG. 22.

Similarly, a field IDn of FIG. 24 shows, like FIG. 28, a structure that is basically the same as that of the field ID2 when the disk is compatible with mX speed (for example, 4×, 6×, or 8× speed). A field IDn+1 of FIG. 24 shows, like FIG. 29, a structure that is basically the same as that of the field ID5 when the disk is compatible with mX speed. This is characterized by employing a strategy (described in detail in the above-mentioned embodiments) based on a clock period of 2T obtained by halving the frequency of a data recording clock. This is because, at 4× speed, 6× speed, or 8× speed, any strategy based on a clock period T that is the same as a data recording clock is unable to conduct recording due to a high recording clock frequency. For 4× speed or higher, parameters necessary for a strategy are written in a new filed ID area added for 4× speed or higher. For a speed exceeding 8× speed, the clock period 2T may be insufficient to conduct recording because an actual recording clock frequency is high. In this case, the frequency of a data recording clock is further divided to provide a strategy employing a clock period of 3T or 4T, and necessary parameters are recorded.

In this way, when a multiplied speed is added, two field IDs corresponding to the speed are added. For example, for a disk compatible with 1× speed and 2× speed, ID0 to ID7 are employed. For a disk compatible with 1×, 2×, and 4× speeds, ID0 to ID9 are employed. For a disk compatible with 1×, 2×, 4×, ..., and mX speeds, ID0 to IDn+1 are employed. Addition of IDs indicates the multiplied speeds the disk is compatible with, and therefore, is convenient. As mentioned above, the higher the speed, the severer the recording conditions to require more complicated recording methods and increased numbers of parameters. In this case, three or more field IDs are assigned for describing each multiplied speed.

Although not explained in detail, the field ID1 may be provided with an extension code. The extension code is 0 up to ID5. For example, for 2× speed, the maximum ID is ID7, and therefore, ID6 and ID7 are added and the extension code is set to 2. Namely, the maximum number of IDs minus 5 determines an extension code. If IDn+1 is the maximum, then an extension code for this is n−4.

In this way, power setting optimum values corresponding to multiplied speed values with which a given disk is compatible are written in field IDs, so that an apparatus can obtain optimum recording conditions for a given multiplied speed.

FIGS. 30 and 31 show an arrangement of field IDs on a disk. FIG. 31 shows a total area from an inner circumference to an outer circumference of the disk. Along the inner circumference, there is a lead-in area containing information for managing the recording/reproducing of a data area. The data area is to record and reproduce data. A disk without record includes a wobble signal and an LPP, i.e., an address signal written in grooves of the disk with the units of ECC blocks. In particular, a readable emboss area of DVD-RW is a reproduction-only area, is made of emboss pre-pits, and contains only wobble information and no LPP information. FIGS. 30 and 31 explain DVD-RW as an example. In the case of DVD-R, the readable emboss area may be a recordable/reproducible area. In this case, there is LPP information like the lead-in area.

FIG. 30 explains an arrangement of field IDs in the lead-in area. The data area arranges ID0 having two addresses. From a lead-in start position (start ECC block address) to a lead-in end position (end ECC block address), ID1 to IDn+1 are repeatedly arranged. If a compatible multiplied speed is only 1× speed, ID0 to ID5 are repeated. If the number of compatible multiplied speeds is large, IDs are increased up to IDn+1. This results in decreasing the number of repetitions. For each compatible multiplied speed, necessary IDs are provided, so that the disk has no useless space and can reproduce information within a shortest time at a given multiplied speed.

Around the lead-in end position, the number of repetitions is sometimes indivisible by the total number of ECC blocks in the lead-in area when the repetitions are carried out for the number of IDs (for example, the number of IDs is six for 1× speed). In this case, a remainder section on the inner circumference side from the lead-in end position is provided with ID0 having dual addresses that are the same as those of the data area. The data area is subjected to real-time recording/reproducing, and therefore, it is necessary to surely read LPP addresses to surely carry out recording or reproducing. Accordingly, the data area has ID0 having dual LPP addresses. When starting data recording, addresses must correctly be read. For this, several ECC blocks on the inner side of the lead-in end position record ID0s in sections remained from ID repetitions, so that addresses can surely be read.

DVD-RW has a readable emboss area that has no LPP information, i.e., no field ID. Although not shown, it is preferable for this case to arrange ID0s in a remainder section on the inner circumferential side of the readable emboss start position. This results in surely confirming the readable emboss start position. ID0s are arranged on several tracks on the outer circumferential side of a readable emboss end position. This results in surely confirming the readable emboss end position.

For DVD-R, the same is applicable when there is a readable emboss. If there is no readable emboss, i.e., if the area is pre-recorded, there is LPP information, and therefore, field IDs are successively recorded like the lead-in area.

A main part of an optical disk recording/reproducing apparatus for recording/reproducing the optical disk mentioned above will be explained with reference to FIGS. 32 and 33.

The optical disk recording/reproducing apparatus (FIG. 32) is equal to the optical recording medium recording apparatus (FIG. 16) plus a reproducing system. For an explanation purpose, the optical disk recording/reproducing apparatus has a different block configuration from the optical recording medium recording apparatus (FIG. 16).

Figure 32:
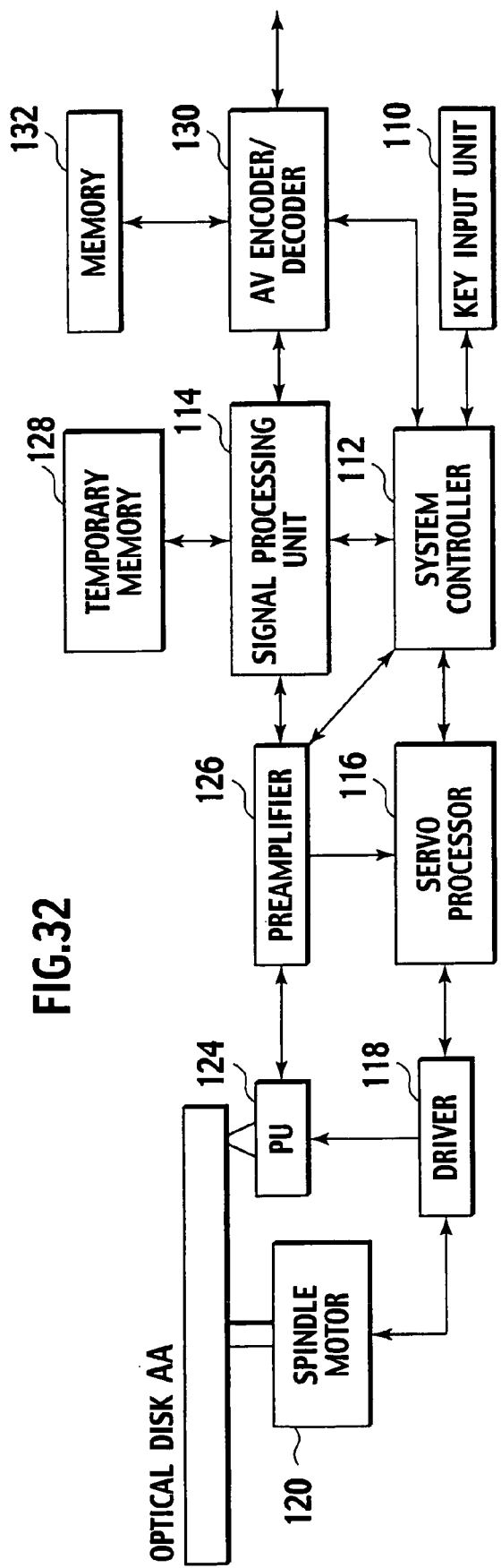
FIG. 32 is a block diagram showing main part of an optical disk apparatus according to an embodiment of an optical disk recording/reproducing apparatus of the present invention.

In FIG. 32, a key input unit 110 is used to enter a reproducing/recording start instruction, which is detected by a system controller 112 and is sent to a signal processing unit 114 and a servo processor 116. The serve processor 116 drives a spindle motor 120 through a driver 118, to turn a disk AA (the optical disk (FIG. 31) of the present invention).

Figure 33:
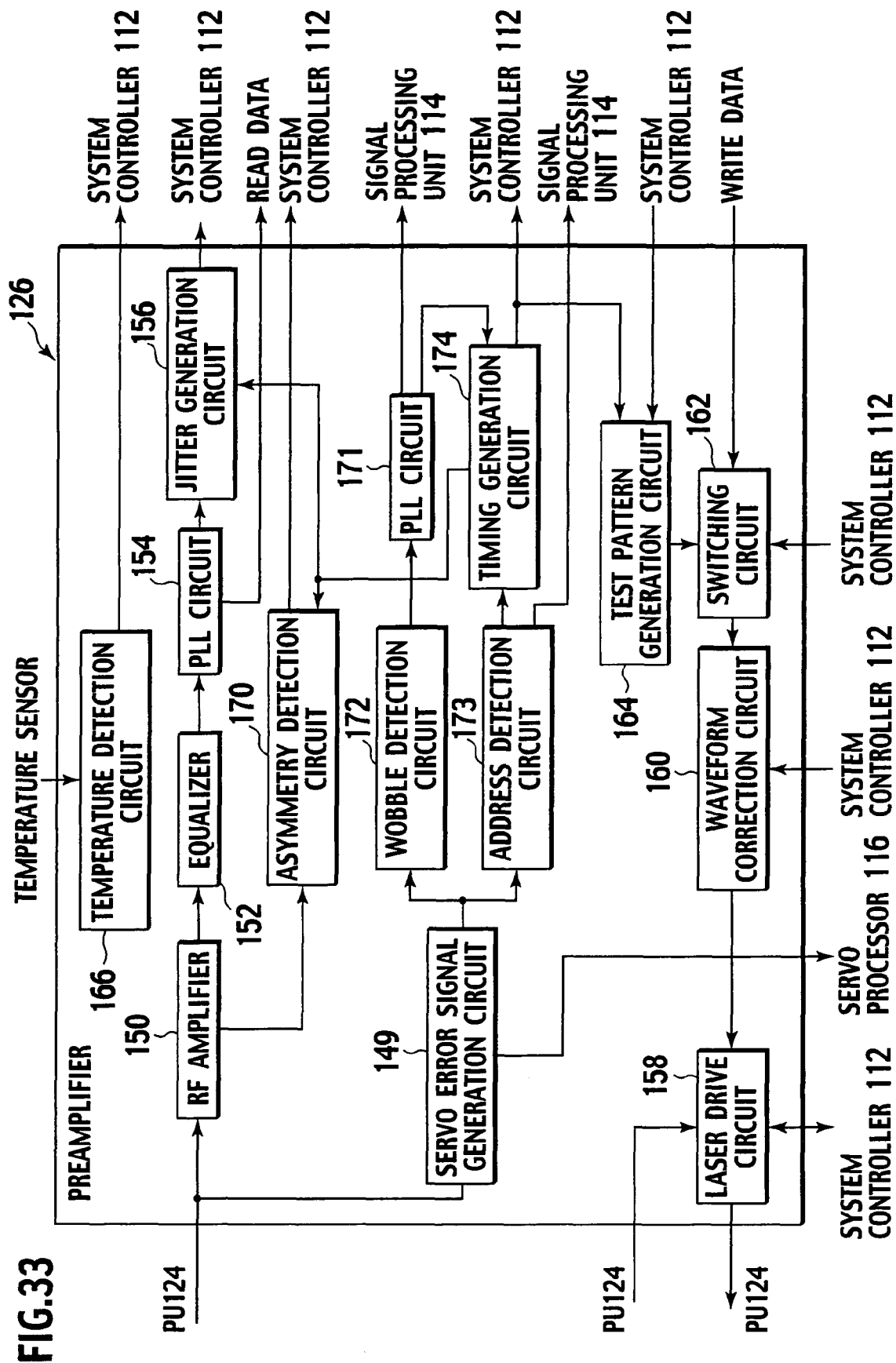
FIG. 33 is a block diagram showing an example structure of a preamplifier of the apparatus shown in FIG. 32.

A signal read by an optical pickup 124 is supplied to a preamplifier 126 whose details are shown in FIG. 33 to generate a reproduced signal and a servo signal. A servo error signal is generated by a servo error signal generation circuit 149. The servo processor 116 processes the servo signal, to generate focusing and tracking signals related to tracks of the optical disk AA. According to these signals, the driver 118 drives an actuator of the optical pickup 124, to thereby conduct a cycle of serve servo control on the optical pickup 124.

The reproduced signal is supplied to the preamplifier 126 shown in FIG. 33 and is amplified by an RF amplifier 150. The frequency characteristics of the amplified reproduced signal are optimized by an equalizer 152 and are subjected to PLL control by a PLL circuit 154. From a comparison between a PLL bit clock and a data time axis, a jitter generation circuit 156 generates a jitter value, which is A/D-converted and measured by the system controller 112. According to this value, a recording waveform correction circuit is changed.

The jitter detection timing of the jitter generation circuit 156 is controlled by a timing generation circuit 174 to be explained later. The signal processing unit 114 converts the reproduced signal into a digital signal to detect synchronization. As a result, an 8-16 modulation signal on the disk AA is decoded into NRZ data on which an error correction process is carried out to provide a selector address signal and a data signal. This signal is a signal compressed at a variable transfer rate, and therefore, is stored in a temporary memory 128 (4-MB DRAM) to adjust a time axis at the variable transfer rate (absorption of the time axis). A signal read from the temporary memory 128 is expanded and separated by an AV encoder/decoder 130 into audio and video signals. These signals are converted by a D/A converter (not shown) into analog audio and video signals.

When recording in FIG. 32, the AV encoder/decoder 130 compresses externally input data, the signal processing unit 114 conducts a format process to record the data on the optical disk AA, and the preamplifier 126 conducts laser modulation to generate a recording waveform such as one shown in FIG. 22 and record the same on the optical disk AA.

The PLL circuit 154 (FIG. 33) of the preamplifier 126 generates a speed signal of the optical disk AA, which is sent to the servo processor 116 to conduct CLU rotation control of the optical disk AA according to the speed signal. A rotational position signal from, for example, a Hall element of the spindle motor 120 is fed back to the serve processor 116. According to a speed signal generated from the signal is used to conduct constant rotation FG control.

In FIG. 33, the reproduced signal from the RF amplifier 150 is used by an asymmetry detection circuit 170 (or β detection circuit) to determine the position of the center of a shortest signal 3T relative to an amplitude position of the peak and bottom of a longest signal 11T of an 8-16 modulation signal. A result thereof is transferred to the system controller 112. The asymmetry detection timing is controlled by the timing generation circuit 174.

An output of the servo error signal generation circuit 149 is used by an address detection circuit 173 to generate an address signal of the disk AA and a recording/reproducing timing signal and is also used by a wobble detection circuit 172 to generate a speed signal of the spindle motor 120 and a wobble signal frequency signal serving as a base of a recording clock signal. The frequency signal obtained by the wobble detection circuit 172 is used by a PLL circuit 171 to generate the speed signal of the spindle motor 120 and a recording clock signal. The signals are sent to the signal processor to generate recording data and to the timing generation circuit 174 to be explained later. The address signal of the disk AA and recording/reproducing timing signal obtained by the address detection circuit 173 are sent to the system controller 112 and signal processing unit 114. The recording/reproducing timing signal is sent to the timing generation circuit 174 to generate a timing signal used to conduct test recording and reproduce an area where the test recording is conducted.

The timing generation circuit 174 sends, at the time of recording, a timing signal to a test pattern generation circuit 164, the system controller 112, and the signal processing unit 114, and a timing signal for reproducing a test recording area to the asymmetry detection circuit 170 and jitter generation circuit 156.

Overall control of the above-mentioned components is carried out by the system controller 112.

The resolution of an image to be recorded, the separation of a high-speed scene such as a car race scene, key input to set recording time priority, external control data, and the like are recognized by a microcomputer (not shown), so that a switching terminal may change a recording time or an external user may select settings.

A waveform correction circuit 160 may be composed of a delay element and an AND circuit. Namely, an input signal is delayed by the delay element and a logical product with the first input signal is obtained to provide a recording waveform of FIG. 22. A switching circuit 162 switches a linear speed under the control of the system controller 112 and roughly switches a time axis, and the waveform correction circuit 160 finely sets a time relationship of FIG. 22 to optimize an asymmetry value or a jitter value, as will be explained later.

The feedback signal from the above-mentioned monitor diode is supplied to an A/D converter of the system controller 112 and can be monitored.

The timing signal from the timing generation circuit 174 is supplied to the asymmetry detection circuit 170. The timing generation circuit 174 receives the wobble signal from the wobble detection circuit 172 and PLL circuit 171 and a land pre-pit (LPP) signal from the address detection circuit 173. For example, a wobble signal (for example, about 140 KHz at 1× speed, i.e., a linear speed of 3.49 m/s) reproduced from the disk is multiplied by a recording clock signal (about 26.16 MHz) and is supplied to the timing generation circuit 174. Also, an LPP signal reproduced from the disk is supplied to the timing generation circuit 174. In synchronization with the LPP signal, one sync frame signal is recorded, and therefore, the timing generation circuit 174 conducts a counting operation according to the position of the LPP signal and according to the recording clock signal to generate a timing signal corresponding to the recording start position of a sector in an ECC block.

To conduct recording/reproducing with such an optical disk recording/reproducing apparatus, a disk is inserted into the apparatus. At the start, at least one of field IDs that are repeatedly recorded at intervals of n+2 pieces (n+2 from 0 to n+1) as LPPs in a lead-in area is reproduced. It is confirmed whether or not the number of existing IDs satisfies the number of the read IDs according to an extension code of the field ID1. From a field ID2, ID5, or ID6 or above, necessary recording/reproducing information such as recording power, erase power, a strategy, and the like corresponding to a multiplied speed (linear speed) appropriate for the recording apparatus is reproduced. If the apparatus is capable of recording at 2× and 4× speeds and if the disk is recordable at 1×, 2×, and 4× speeds, the highest 4× speed is selected and stored.

According to the information, the recording/reproducing apparatus conducts, for example, a first recording/reproducing method that sets necessary recording/reproducing information such as the recording power, erase power, and strategy value of the recording/reproducing apparatus and carries out an information recording process.

If a second recording/reproducing method is carried out, the read information is used to access a PCA (power calibration area) or a data area on the inner circumferential side of an RMD area to be explained later that is on the inner circumferential side of the lead-in area. According to the read values, test recording is carried out by changing the recording power, erase power, strategy value, and the like. The test recorded data is read to measure an asymmetry (or β) value, a jitter, an error rate, a modulation factor, and the like. According to the measurements, optimum recording power, erase power, strategy value, and the like are determined, and user data is recorded.

Next, the optimum recording power, erase power, strategy value thus obtained are recorded in the RMD explained below.

FIG. 34 shows the contents of RMD (recording management data).

In FIG. 34, RMD has areas to record various pieces of management information. An RMD field 1 records recording conditions and apparatus specific information when the recording/reproducing apparatus records data in a data area. Thereafter, when the disk is inserted, the specific information is used to determine whether or not the recording conditions of the disk meet with those of the apparatus. If the conditions meet with each other and are effective, the conditions are used to conduct recording. This can reduce a time to start recording.

This area stores an apparatus manufacturer ID (such as a maker name), an apparatus serial number, a model number, a strategy code that is dependent on a multiplied speed (linear speed) and corresponds to an actual recording condition in a field ID, recording power, date and time information about test recording, a recording calibration position in a PCA area, running OPC information (a condition for optimizing recording power during recording and resultant information) if necessary, erase power (or the ratio (Pe/Po) of erase power Pe to recording power Po) that is dependent on a multiplied speed and corresponds to an actual recording multiplied speed (linear speed) in a field ID, recording power (encoded as 8-bit data), optimum recording information (asymmetry value or β value for determining optimum recording power), multiplied speed information (or linear speed information) at which recording was carried out, and the like. These recording contents are not always entirely recorded, and a combination of necessary information pieces may be recorded.

Recording power, erase power, strategy value, and the like for a different multiplied speed may be recorded together with the multiplied speed value (linear speed), to correctly determine whether or not the recording apparatus can effectively conduct recording at a given multiplied speed. When there are improper environmental conditions including temperatures, disk surface misalignment, or large eccentricity, the recording apparatus capable of recording at 4× speed in a normal condition must decrease the linear speed to 2× speed. In such a case, the recorded multiplied speed value (linear speed) is useful to correctly obtain recording conditions.

According to the embodiment, an addition of one multiplied speed involves an addition of two field IDs. The number of added field IDs may be one, three, or over depending on the number of bytes thereof and the like. Items to be recorded may additionally include information about a servo system gain related to a multiplied speed and information about a modulation factor and a jitter.

The embodiment has been explained in connection with a rewritable phase-change DVD-RW. The present invention is also applicable to DVD+RWs, next-generation DVR blue formats, once-recordable organic pigment DVD-Rs, DVD+Rs, and next-generation blue formats by omitting erase power. The embodiment is not limited to the recording strategy waveform of FIG. 22. According to the embodiment, a recording strategy entirely includes the control of amplitude and time direction of a recording waveform. The embodiment is naturally applicable to magnetic recording MDs, DWDDs, ASMOs, and next-generation formats such as MAMMOS.

As explained above, the present invention provides an optical disk capable of coping with rapidly advancing high multiplied speed without changing standards, consuming environmental energy, or modifying equipment design, capable of realizing smooth standardization to expedite market advancement, and capable of coping with multiple speeds while eliminating useless information, effectively improving redundancy, and effectively using areas.

The present invention provides a recording method or a recording apparatus capable of grasping multiple speeds with which an optical disk to record or reproduce copes, selecting an optimum multiplied speed for the optical disk to record information thereon, and dropping an equipment's standard multiplied recording speed to a recordable speed if the optical disk is suffered from a temperature increase, surface misalignment, or eccentricity.

The method or apparatus of the present invention is also capable of easily reading information even from an optical disk compatible with a plurality of multiple speeds, involving no useless information, quickly obtaining necessary information, involving high redundancy, and reliably acquiring information.

The embodiments mentioned above aligns the trailing edge of a mark between an even mark and an odd mark by adjusting a multi-pulse phase relationship between the top of an even mark and that of an odd mark. There will be a problem that a reproduced waveform is deformed at or around the top of a mark depending on a phase-change material that forms a medium (optical disk) recording layer, a recording linear speed, laser power, or other standards or conditions.

The below-mentioned fourth embodiment of an optical recording method can solve this problem. Based on the fourth embodiment of an optical recording method, there is provided an optical recording medium having a structure to record the above-mentioned data.

Fourth Embodiment of Optical Recording Method

Figure 35:
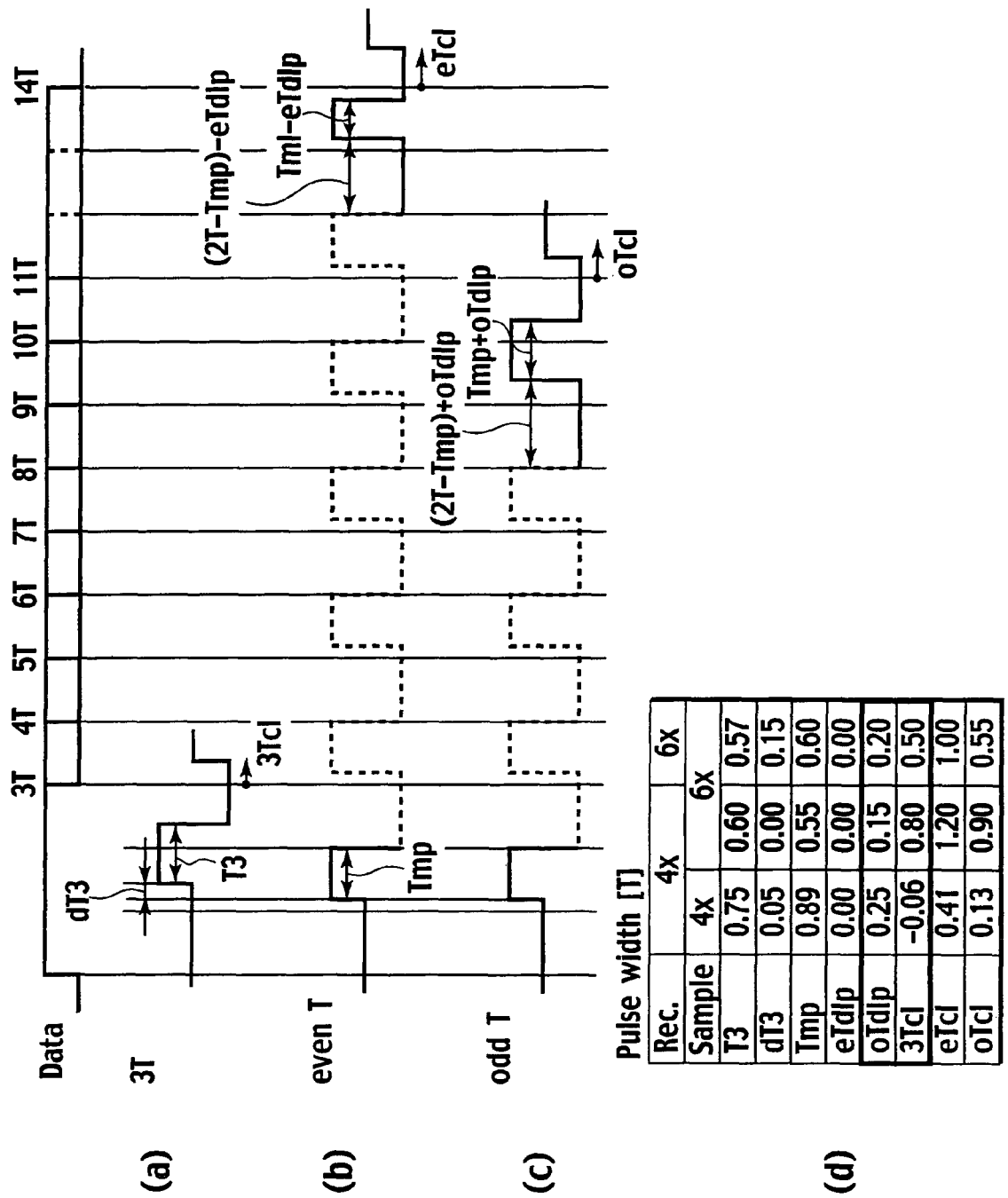
FIG. 35 is a view explaining a first recording strategy employed by a fourth embodiment of an optical recording method of the present invention.

FIG. 35 is a view explaining a first strategy employed by a fourth embodiment of an optical recording method according to the present invention.

FIG. 35(a) shows a recording strategy waveform corresponding to a 3T mark, FIG. 35(b) shows a recording strategy waveform corresponding to an even T mark (4T, 6T, 8T, 10T, or 14T mark), and FIG. 35(c) shows a recording strategy waveform corresponding to an even T mark (5T, 7T, 9T, or 11T mark).

In FIG. 35, the first recording strategy waveform employs a basic period obtained by halving the frequency of a recording data clock as mentioned above.

The recording strategy waveform corresponding to the 3T mark shown in FIG. 35(a) includes a top pulse length section T3, a section dT3 to adjust the top pulse length, and a rear-end cooling power section 3Tcl.

The recording strategy waveform corresponding to the even T mark equal to or greater than 4T (4T, 6T, 8t, 10T, or 14T mark) shown in FIG. 35(b) includes three time sections, i.e., a multi-pulse period Tmp obtained by halving the frequency of a recording clock, a bias power section "(2T−Tmp)−eTdlp" before a rear-end recording pulse, a rear-end recording pulse section "Tmp−eTdlp," and a cooling power section eTcl.

The recording strategy corresponding to the odd T mark equal to or greater than 5T (5T, 7T, 9T, or 11T mark waveform) shown in FIG. 35(c) includes three time sections, i.e., a multi-pulse period Tmp obtained by halving the frequency of the recording clock, a bias power period "(2T−Tmp)+oTdlp" before a rear-end recording pulse, a rear-end recording pulse section "Tmp+oTdlp," and a cooling power section oTcl.

Figure 37B:
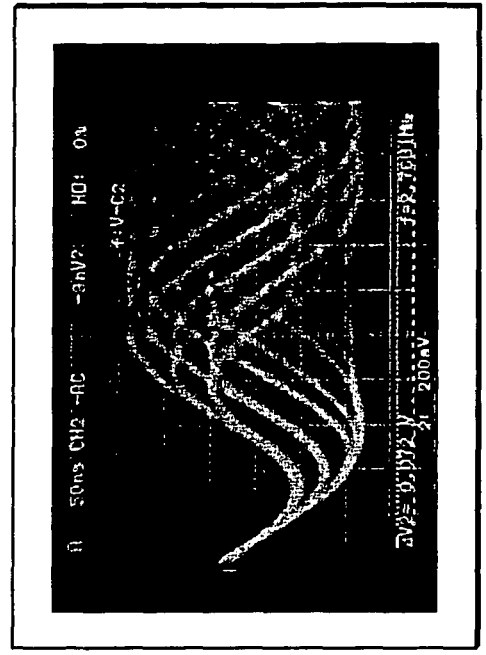
FIGS. 37A to 37D show eye patterns of first recording and ten-times recording with the use of the recording strategies shown in FIGS. 35 and 36.
Figure 37D:
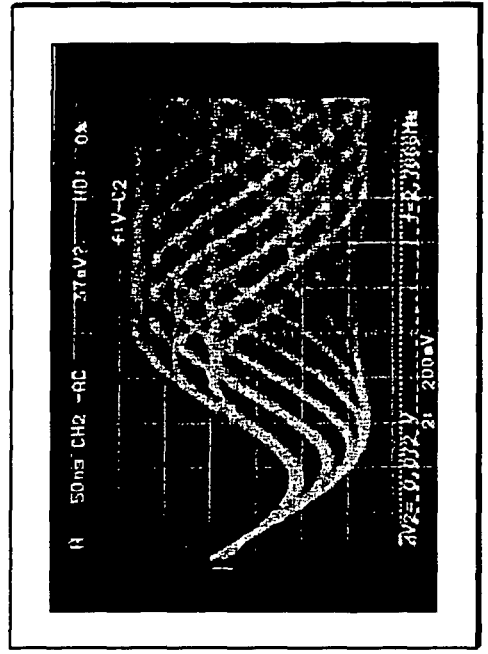
Figure 37A:
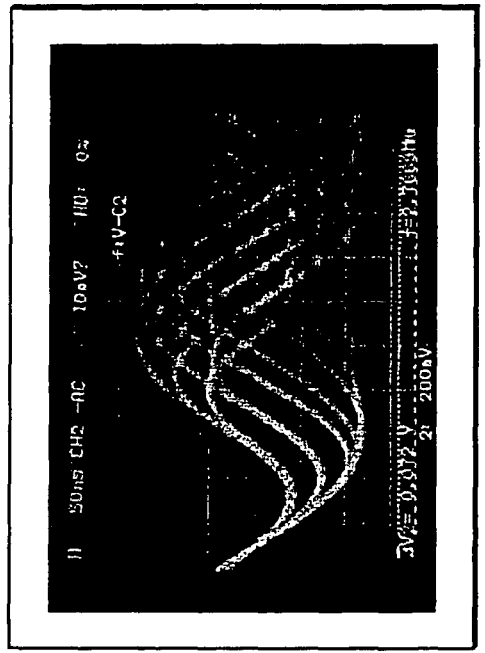

FIGS. 37A and 37B show eye patterns of first recording and 10-times recording, respectively, according to the first recording strategy of FIG. 35.

As shown in FIGS. 37A and 37B, reproduced jitters according to this recording strategy are substantially the same as those of the above-mentioned result. As is apparent from these waveforms, an inclination of the 3T waveform is different from those of 4T and 5T. It is found that the inclination also changes depending on the number of times of recording. From this result, it is presumed that the sizes of recorded marks on a medium are not proper for 3T, 4T, and 5T. A reproduced jitter at the track center of the medium is not so bad. When an off-track occurs, the difference in the sizes of the recorded marks of 3T, 4T, and 5T deteriorates jitters. From this waveform, binary data is formed. A slight change in a slice level for binarization greatly deteriorates jitter values. This sort of circuit problem occurs.

The reason of this is because a 2T clock formed by halving the frequency of a recording data clock is used as a base period to generate the timing of recording data of units of T. For data of an even T mark and data of an odd T mark, the formation of a trailing edge is controlled. At this time, data of, for example, an even T employs a single parameter eTdlp to determine a trailing edge recording pulse section width (Tmp−eTdlp) and a preceding bias power section width ((2T−Tmp)−eTdlp). This may form the timing of a trailing edge of a last mark to determine a jitter. At this time, the shape of the trailing edge of a last recording mark formed with the rear-end recording pulse is not optimized. When reproduced as an optical spot, an inclination of a reproduced signal of a 4T mark or a 5T mark differs from an inclination of other signals.

From this result, it is understood that a severe problem will occur depending on a linear speed when recording information on a medium having a different crystallization speed or on a medium compatible with a plurality of linear speeds.

Figure 36:
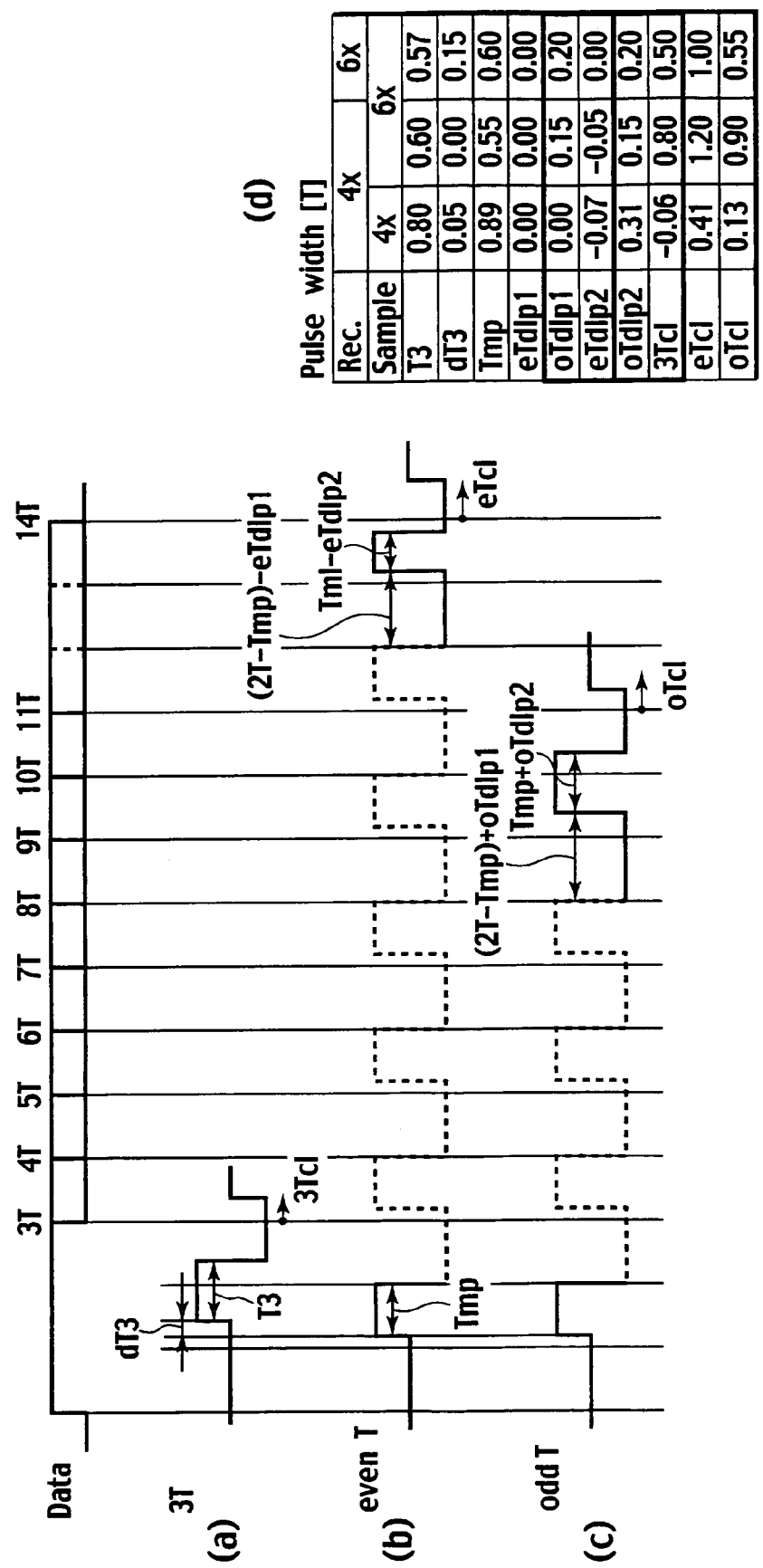
FIG. 36 is a view explaining a second recording strategy employed by the fourth embodiment of an optical recording method of the present invention.

Due to this, the first recording strategy waveform (FIG. 35) has been improved to the second recording strategy waveform of FIG. 36.

FIG. 36 is a view explaining the second recording strategy used for the fourth embodiment of an optical recording method according to the present invention.

FIG. 36(a) shows a recording strategy waveform corresponding to a 3T mark, FIG. 36(b) shows a recording strategy waveform corresponding to an even mark (4T, 6T, 8T, 10T, or 14T mark), and FIG. 36(c) shows a recording strategy waveform corresponding to an even mark (5T, 7T, 9T, or 11T mark).

In FIG. 36, the second recording strategy waveform employs a clock obtained by halving a recording data clock as a base period like the above example.

The recording strategy waveform corresponding to the formation of a 3T mark shown in FIG. 36(a) has a top pulse length section T3, a top pulse length adjusting section dT3, and a rear-end cooling power section 3Tcl. The recording strategy waveform corresponding to the 3T mark is unchanged between the first and second recording strategy waveforms.

The recording strategy waveform corresponding to an even T mark equal to or greater than 4T (4T, 6T, 8T, 10T, or 14T mark waveform) shown in FIG. 36(b) has a multi-pulse period Tmp obtained by halving the frequency of a recording clock, a bias power section "(2T−Tmp)−eTdlp1" before a rear-end recording pulse, a rear-end recording pulse section "Tmp−eTdlp2," and a cooling power section eTcl. Namely, there are three time sections.

The recording strategy corresponding to an odd T mark equal to or greater than 5T (5T, 7T, 9T, or 11T mark waveform) shown in FIG. 36(c) has a multi-pulse period Tmp obtained by halving the frequency of the recording clock, a bias power section "(2T−Tmp)+oTdlp1" before a rear-end recording pulse, a rear-end recording pulse section "Tmp+oTdlp2," and a cooling power section oTcl. Namely, there are three time sections.

Figure 37C:
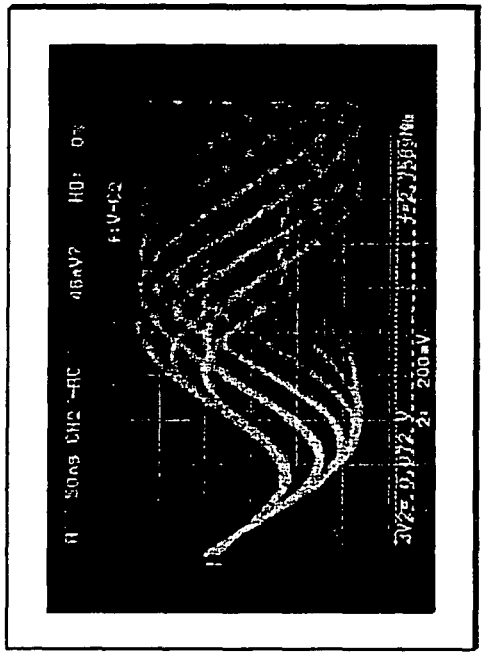

FIGS. 37C and 37D show eye patterns of first recording and 10-times recording, respectively, according to the second recording strategy of FIG. 36.

As shown in FIGS. 37C and 37D, reproduced jitters according to this recording strategy show the same or slightly better result compared with the result of the first recording strategy waveform (FIG. 35). As is apparent from the waveforms, an inclination of the 3T waveform shows no difference from inclinations of 4T and 5T irrespective of the number of times of recording. It is presumed from this result that the sizes of recording marks formed on a medium are proper for 3T, 4T, and 5T. This solves the problem that off-track from the center of a track of a medium deteriorates jitters of the recording marks of 3T, 4T, and 5T.

The reason of this will be explained. The frequency of a recording data clock is halved to form a 2T clock as a base period to generate recording data timing for units of T. For even T mark data and odd T mark data, the shape of a last mark is controlled. In connection with even data, eTdlp1 is used to adjust the time of even data and odd data with a preceding bias power section width. A rear-end recording pulse section width is independently determined with the use of eTdlp2. This determines the timing of the trailing edge of a mark and a jitter. The shape of a recording mark formed by the rear-end recording pulse is thus controlled. When reproduced as optical spots, inclinations of reproduced 4T and 5T signals show no difference from those of the other signals.

FIGS. 35(d) and 36(d) show parameter values for 4× speed of a DVD-RW 4×-speed medium, as well as parameters at which optimum jitters are obtained for 4×-speed recording and 6×-speed recording on a 6×-speed medium compatible with 6× speed. As is easily understood from the degrees of change of the parameters eTdlp1, eTdlp2, oTdlp1, and oTdlp2 relative to linear speeds, common parameters for a medium that is compatible with a certain linear speed and has a certain crystallization speed may be usable to adjust a phase difference. Namely, when preparing a recording strategy by dividing the frequency of a recording clock, the ratio of a frequency divided clock may be applied to the common parameters to adjust a phase difference of recording data (a phase difference between even number data and odd number data if the frequency is halved, and a phase difference of ⅓ phase for every 3T if the frequency is divided by 3). However, it is not true that a medium compatible with a certain linear speed has a fixed crystallization speed.

A single medium may compatible with a plurality of linear recording speeds. For this, not only for the frequency halving of this embodiment, each T of recording data period of frequency divided phase needs three time elements including a recording pulse time section for forming an optimum mark end shape, a bias power time section for adjusting a divided frequency period phase, and a cooling pulse time section for forming a last mark trailing edge.

Other Embodiments of Optical Disk and Optical Disk Recording/Reproducing Apparatus Other embodiments of an optical disk and an optical disk recording/reproducing apparatus of the present invention will be explained.

An embodiment of the present invention provides an optical disk for recording information with a laser beam emitted from an optical pickup and having an information management area and an information recording area. The information management area stores recording power and recording strategy information used to store information in the information recording area, as well as linear speed information used to record information on the optical disk. The recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb). The recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section. The recording strategy information includes a recording strategy employing a period pT obtained by dividing the frequency of the clock period by p as a base period to be used for a high linear speed and is capable of adjusting the recording strategy according to the period pT by changing three time sections among divided recording pulses for forming a mark, i.e., a bias power section before a rear-end recording pulse, a rear-end recording pulse section, and a cooling power section. The recording strategy information is beforehand stored in a plurality of recording management information sections corresponding to multiplied-speed information.

An embodiment of the present invention provides an optical disk for recording information with a laser beam emitted from an optical pickup and having an information management area and an information recording area. The information management area stores recording power and recording strategy information used to store information in the information recording area, as well as linear speed information used to record information on the optical disk. The recording strategy information is used when forming, at a linear speed compatible with the optical disk, a mark corresponding to data having a length nT (n being an integer and T being a recording data clock period) by modulating the laser power of the laser beam with three values of recording power Pw, erase power Pe, and bias power Pb (where Pw>Pe>Pb). The recording strategy information includes a recording strategy employing the clock period T as a base period to be used for a low linear speed and is capable of adjusting the recording strategy according to the clock period T by changing three time sections among divided recording pulses for forming a mark, i.e., a top recording pulse width, an intermediate multi-pulse width, and a rear-end cooling power section. The recording strategy information includes a recording strategy employing a period 2T obtained by dividing the frequency of the clock period by 2 as a base period to be used for a high linear speed and is capable of adjusting the recording strategy according to the period 2T by changing, according to even or odd number data, three time sections among divided recording pulses for forming a mark, i.e., a bias power section before a rear-end recording pulse, a rear-end recording pulse section, and a cooling power section. The recording strategy information is beforehand stored in a plurality of recording management information sections corresponding to multiplied-speed information.

An embodiment of the present invention provides an optical disk recording/reproducing apparatus for recording/reproducing information on the optical disk of the present invention mentioned above. The optical disk recording/reproducing apparatus includes means for reading a necessary one from among a plural pieces of the recording power and recording strategy information stored in the plurality of information management sections of the optical disk, and according to the read recording power and recording strategy, recording information in the information recording area of the optical disk.

The structures of the optical disks of the present invention mentioned above are as explained with reference to FIGS. 22 to 24, 26, 27, 29, and 36. The low linear speed according to the present invention is 1× speed (multiplied speed) or 2× speed, and the high linear speed of the present invention is 4× speed, 6× speed, 8× speed, or the like.

More precisely, among the field IDs (ID0 to ID5) shown in FIG. 23, the position of the field ID2 prerecords an OPC recommended code/write strategy code 1, and the position of the field ID5 prerecords a write strategy code 2. The part B of the field ID2 describes, as shown in FIG. 26, a field ID value, an OPC recommended code, a write strategy code 1, and parity.

The OPC recommended code states disk maker recommended recording power Po of FIG. 22, erase power Pe (or the ratio $\in$ (Pe/Po) of erase power Pe to recording power Po), and if needed, β or a recommended asymmetry value (optimum recording information) to determine recording conditions, i.e., the position of a short T relative to a long T in the amplitudes of a signal of 8-16 modulation reproduced from a recorded signal.

The write strategy code 1 states recommended time information of $T_{top}$, $T_{mp}$, and $T_{cl}$ of the strategy of FIG. 22.

The part B of the field ID5 states, as shown in FIG. 27, a field ID value, a write strategy code 2, and information corresponding to a multiplied speed value (1×).

The write strategy code 2 includes recommended time information of $T_{top}$, $T_{mp}$, and $T_{cl}$ of a strategy having a different waveform from FIG. 22.

The multiplied speed value indicates a multiplied speed at which the disk is recordable. What are written are a recommended multiplied speed value (for example, if a 1× linear speed is 3.49 m/s, the value of 3.49, or the multiplied speed value of 1, or a hexadecimal code thereof), and preferably, recommended values for optimum recording information (β or an asymmetry value (optimum recording information) to determine recording conditions, i.e., the position of a short T relative to a long T in the amplitudes of a signal reproduced from a recorded signal).

The optimum recording information may be written in the OPC recommended code. The more the multiplied speeds to be recorded, the more the number of field IDs. The contents shown in the field ID2 and field ID5 are values for 1× speed shown in the field ID5. For a disk compatible only with 1× speed, the multiplied speed value may be omitted.

FIG. 24 shows the structure of field IDs of a disk compatible with 1× speed (a linear speed of 3.49 m/s), 2× speed (a linear speed of 3.49*2 m/s), and mX speed (for example, 4×, 6×, or 8×) (a linear speed of 3.49*m m/s).

In FIG. 24, a part encircled with a thick line is the same as that of FIG. 23 except the description of 1× speed. More precisely, in FIG. 24, the position of a field ID2 in a lead-in area prerecords an OPC recommended code/write strategy code 1 (1×), and the position of a field ID5 prerecords a write strategy code 2 (1×). Further, the position of a field ID6 prerecords a write strategy code 1 (2×). The position of a field ID7 prerecords a write strategy code 2 (2×), ..., the position of a field IDn prerecords an OPC recommended code/write strategy code 1 (mX), and the position of a field IDn+1 prerecords a write strategy code 2 (mX).

ID6 shown in FIG. 24 is the case when n of FIG. 28 is 6 like the part B of the ID field ID2 and includes a field ID value (6) corresponding to 2× speed, an OPC recommended code, and a strategy code 1. The OPC recommended code is of 2× speed recommended by a disk maker and indicates recording power Po of FIG. 22, erase power Pe, and when required, β or an asymmetry value (optimum recording information) to determine recording conditions, i.e., the position of a short T relative to a long T in the amplitudes of a signal reproduced from a recorded signal.

The strategy code write 1 describes recommended time information about $T_{top}$, $T_{mp}$, and $T_{cl}$ of the strategy of FIG. 22. ID 7 of FIG. 24 is of when n+1 of FIG. 29 is 7. Like the part B of the field ID5 of FIG. 27, it describes a 2× speed field ID value (7), a write strategy code 2, and a multiplied speed value. The write strategy code 2 describes recommended time information for $T_{top}$, $T_{mp}$, and $T_{cl}$ of a strategy having a different waveform from FIG. 22, or the recording strategy shown in FIG. 36.

Similarly, IDn of FIG. 24 shows, like FIG. 28, a structure that is basically the same as that of the field ID2 when the disk is compatible with mX speed (for example, 4×, 6×, or 8× speed). IDn+1 of FIG. 24 shows, like FIG. 29, a structure that is basically the same as that of the field ID5 when the disk is compatible with mX speed. This is characterized by employing the strategy (described in detail in the above-mentioned embodiments) based on a clock period of 2T obtained by halving the frequency of a data recording clock. This is because, at 4× speed, 6× speed, or 8× speed, any strategy based on a clock period T that is the same as a data recording clock is unable to conduct recording as mentioned above due to a high recording clock frequency.

For 4× speed or higher, parameters necessary for a strategy are written in a new filed ID area added for 4× speed or higher. For a speed exceeding 8× speed, the clock period 2T may be insufficient to conduct recording because an actual recording clock frequency is high. In this case, the frequency of a data recording clock is further divided to provide a strategy employing a clock period of 3T or 4T, and necessary parameters are recorded.

In this way, when a multiplied speed is added, two field IDs corresponding to the speed are added. For example, for a disk compatible with 1× speed and 2× speed, ID0 to ID7 are employed. For a disk compatible with 1×, 2×, and 4× speeds, ID0 to ID9 are employed. For a disk compatible with 1×, 2×, 4×, ..., and mX speeds, ID0 to IDn+1 are employed. Addition of IDs indicates the multiplied speeds the disk is compatible with, and therefore, is convenient.

As mentioned above, the higher the speed, the severer the recording conditions to require more complicated recording methods and increased numbers of parameters. In this case, three or more field IDs are assigned for describing each multiplied speed.

Although not explained in detail, the field ID1 may be provided with an extension code. The extension code is 0 up to ID5. For example, for 2× speed, the maximum ID is ID7, and therefore, ID6 and ID7 are added and the extension code is set to 2. Namely, the maximum number of IDs minus 5 determines an extension code. If IDn+1 is the maximum, then an extension code for this is n−4.

In this way, power setting optimum values corresponding to the multiplied speed values with which a given disk is compatible are written in field IDs, so that an apparatus can obtain optimum recording conditions for a given multiplied speed.

It is naturally possible to employ the recording strategy shown in FIG. 36 instead of the recording strategy shown in FIG. 22.

INDUSTRIAL APPLICABILITY

The present invention is applicable to, for example, recording information on a DVD medium at or above 6× linear speed. When the recording is conducted according to an optical recording method employing a multi-pulse strategy based on 2T-based recording pulse strings, the problems of an insufficient bias power time and an insufficient annealing time occur. To solve the problems, any optical recording method according to the present invention has no need of adjusting the position of a top pulse or rear-end pulse among recording pulses. Instead, the optical recording method makes a fall position of a recording signal coincide with a fall position of a rear-end pulse among recording pulses by controlling the pulse width of a top pulse of the recording pulses that rises at the rise position of the recording signal according to the length of the recording signal, which may correspond to an even number 2, 4, 6, . . . , or an odd number 3, 5, 7, . . . of clock periods T. In more detail, the control method complementarily inverts the phase of intermediate pulses positioned between the top pulse and the rear-end pulse according to the even number or the odd number. (For example, recording pulses corresponding to a recording signal of length 6T may consist of a top pulse and a rear-end pulse, and recording pulses corresponding to a recording signal of length 7T may consist of a top pulse, an intermediate pulse, and a rear-end pulse. In this case, if the rises of the top pulses are adjusted to agree with each other, the pulse width position of the rear-end pulse of the recording pulses corresponding to the recording signal of length 6T corresponds to none of the positions of the intermediate pulse and rear-end pulse of the recording pulses corresponding to the recording signal of length 7T. Also, the pulse width position of each of the intermediate pulse and rear-end pulse of the recording pulses corresponding to the recording signal of length 7T corresponds to no intermediate pulse of the recording pulses corresponding to the recording signal of length 6T.) The present invention relatively shifts a 1T period of a 2T-period-based intermediate pulse (or a rear-end pulse). In a multi-pulse strategy, the number of multi-pulses is set as INT(n−3)/2 (n being an odd number). The sum of heating corresponding to a top pulse among recording pulses and cooling (annealing) corresponding to a rear-end pulse among the recording pulses is basically set to 2T or 3T depending on an even or odd number length of a recording signal. (However, it may slightly be changed according to an optical recording medium or a recording linear speed, and variable (adaptive) control may be carried out according to an optical recording medium, a recording density, or a front-and-rear signal relationship.) Even with the use of an irradiating laser beam of relatively low recording power, the rise time and fall time of a laser power pulse are sufficiently secured, and a succeeding annealing time is sufficiently secured. As a result, the present invention can provide optical recording methods, optical recording media, optical recording medium recording apparatuses, and optical recording apparatuses capable of conducting high-quality recording with optimum jitters at high recording speed like a normal recording speed (1× speed).

The present invention can provide an optical disk capable of coping with rapidly advancing high multiplied speed without changing standards, consuming environmental energy, or modifying equipment design, capable of realizing smooth standardization to expedite market advancement, and capable of coping with multiple speeds while eliminating useless information, effectively improving redundancy, and effectively using areas.

The present invention can provide an optical disk recording/reproducing apparatus capable of grasping multiple speeds with which an optical disk to record or reproduce copes, selecting an optimum multiplied speed for the optical disk to record information thereon, dropping an equipment's standard multiplied recording speed to a recordable speed if the optical disk is suffered from a temperature increase, surface misalignment, or eccentricity, and easily, quickly, reliably reading information from an optical disk that is compatible with multiple speeds, has no useless information, and includes high redundancy.

The present invention can provide an optical recording method capable of relatively differing a phase relationship of the rise (or fall) of a rear-end pulse forming a recording strategy (multi-pulse) between the formation of an even mark and the formation of an odd mark. This results in substantially equalizing the shape of a trailing edge of an even mark with the shape of a trailing edge of an odd mark formed on a medium. In addition, the present invention can provide an optical recording method employing a recording strategy that relatively differs a phase relationship of the rise (or fall) of a rear-end pulse between the formation of an even mark and the formation of an odd mark. Even if a phase-change material of a recording layer of a medium, a linear recording speed of the medium, recording laser power pulse-modulated according to a recording strategy, medium standards, and other recording conditions are changed, the optical recording method causes no substantial distortion on the shape of the trailing edge of an even mark and the shape of the trailing edge of an odd mark formed on a medium.

The invention claimed is:

1. An optical recording method of generating a recording strategy having a period of a halved clock of a clock period T of recording data, as a base period, to form recording marks corresponding to lengths nT of recording data, where n is a variable integer, by modulating laser power of a laser beam for irradiation by using three values being a recording power Pw, an erase power Pe, and a bias power Pb, such that Pw>Pe>Pb, the method, comprising:

a step of applying a top heating pulse, a step of applying an intermediate heating pulse, and a step of applying a rear-end heating pulse section including a rear-end heating pulse, as the recording strategy, to form a recording mark, based on the period of the halved clock, corresponding to a length of recording data out of nT lengths of recording data, the top heating pulse being the first pulse having the recording power Pw in the recording strategy, the rear-end heating pulse being the last pulse having the recording power Pw in the recording strategy, the intermediate heating pulse being a pulse between the top heating pulse and the rear-end heating pulse, rising from the bias power Pb to the recording power Pw, keeping the recording power Pw in a first duration, and falling from the recording power Pw to the bias power Pb, the first duration being a first width of the intermediate heating pulse, the first width being set by using a first parameter corresponding to the first duration, wherein the step of applying the rear-end heating pulse section comprises:
  a step of setting a first set of three time sections for an even-T length of recording data out of the nT lengths of recording data, including:
    a first time section having only the bias power Pb and occurring before the rear-end heating pulse, the first time section being sequentially adjacent to the rear-end heating pulse;
    a second time section being only the rear-end heating pulse, the rear-end heating pulse rising from the bias power Pb to the recording power Pw, keeping the recording power Pw in a second duration, and falling from the recording power Pw to the bias power Pb, the second time section being a time section from a rise time of the rear-end heating pulse to a fall time of the rear-end heating pulse, the second duration being a second width of the second time section, the second width being set independent from the first width of the intermediate heating pulse by using at least a second parameter corresponding to the second duration that is different from the first parameter; and
    a third time section being a cooling power section after the rear-end heating pulse, the cooling power section including a time section from a sequentially adjacent clock time to a termination time of a cooling pulse, a period of the third time section being set by using a third parameter; and
  a step of setting a second set of three time sections for an odd-T length of recording data out of the nT lengths of recording data, including:
    a fourth time section having only the bias power Pb and occurring before the rear-end heating pulse, the fourth time section being sequentially adjacent to the rear-end heating pulse, the fourth time section being set independent from the first time section;
    a fifth time section being only the rear-end heating pulse, the rear-end heating pulse rising from the bias power Pb to the recording power Pw, keeping the recording power Pw in a third duration, and falling from the recording power Pw to the bias power Pb, the fifth time section being a time section from a rise time of the rear-end heating pulse to a fall time of the rear-end heating pulse, the third duration being a third width of the fifth time section, the third width being set independent from both the first width of the intermediate heating pulse and the second width of the second time section by using at least a fourth parameter corresponding to the third duration which is different from both the first and second parameters; and
    a sixth time section being a cooling power section after the rear-end heating pulse, the cooling power section including a time section from a sequentially adjacent clock time to a termination time of a cooling pulse, a period of the sixth time section being set independent from that of the third time section by using at least a fifth parameter that is different from the third parameter.

2. The optical recording method according to claim 1, wherein the first set of three time sections and the second set of three time sections are respectively independently changed in correspondence to a value of recording speed, as the recording speed is increased.

3. The optical recording method according to claim 1, wherein the first set of three time sections and the second set of three time sections are respectively independently changed in correspondence to values of recording speed, as the recording speed is decreased.

4. A reproducing method of information recorded on a recording area of a recording medium by the recording method of claim 1, comprising:
  setting a laser power for reproducing;
    detecting light reflected from the recording area, based on the set laser power; and
    reproducing the information recorded on the recording area from the reflected light.

5. An optical recording apparatus for generating a recording strategy having a period of a halved clock of a clock period T of recording data, as a base period, to form recording marks corresponding to lengths nT of recording data, where n is a variable integer, by modulating laser power of a laser beam for irradiation by using three values being a recording power Pw, an erase power Pe, and a bias power Pb, such that Pw>Pe>Pb, the apparatus, comprising:
  an applying unit configured to apply a top heating pulse, an applying unit configured to apply an intermediate heating pulse, and an applying unit configured to apply a rear-end heating pulse section including a rear-end heating pulse, as the recording strategy, to form a recording mark, based on the period of the halved clock, corresponding to a length of recording data out of nT lengths of recording data, the top heating pulse being the first pulse having the recording power Pw in the recording strategy, the rear-end heating pulse being the last pulse having the recording power Pw in the recording strategy, the intermediate heating pulse being a pulse between the top heating pulse and the rear-end heating pulse, rising from the bias power Pb to the recording power Pw, keeping the recording power Pw in a first duration, and falling from the recording power Pw to the bias power Pb, the first duration being a first width of the intermediate heating pulse, the first width being set by using a first parameter corresponding to the first duration, wherein the applying unit configured to apply the rear-end heating pulse section, comprises:
  a setting unit configured to set a first set of three time sections for an even-T length of recording data out of the nT lengths of recording data, including:
    a first time section having only the bias power Pb and occurring before the rear-end heating pulse, the first time section being sequentially adjacent to the rear-end heating pulse;
    a second time section being only the rear-end heating pulse, the rear-end heating pulse rising from the bias power Pb to the recording power Pw, keeping the recording power Pw in a second duration, and falling from the recording power Pw to the bias power Pb, the second time section being a time section from a rise time of the rear-end heating pulse to a fall time of the rear-end heating pulse, the second duration being a second width of the second time section, the second width being set independent from the first width of the intermediate heating pulse by using at least a second parameter corresponding to the second duration that is different from the first parameter; and a third time section being a cooling power section after the rear-end heating pulse, the cooling power section including a time section from a sequentially adjacent clock time to a termination time of a cooling pulse, a period of the third time section being set by using at least a third parameter; and a setting unit configured to set a second set of three time sections for an odd-T length of recording data out of the nT lengths of recording data, including:

a fourth time section having only the bias power Pb and occurring before the rear-end heating pulse, the fourth time section being sequentially adjacent to the rear-end heating pulse, the fourth time section being set independent from the first time section;

a fifth time section being only the rear-end heating pulse, the rear-end heating pulse rising from the bias power Pb to the recording ower Pw, keeping the recording power Pw in a third duration, and falling from the recording power Pw to the bias power Pb, the fifth time section being a time section from a rise time of the rear-end heating pulse to a fall time of the rear-end heating pulse, the third duration being a third width of the fifth time section, the third width being set independent from both the first width of the intermediate heating pulse and the second width of the second time section by using at least a fourth parameter corresponding to the third duration that is different from both the first and second parameters; and a sixth time section being a cooling power section after the rear-end heating pulse, the cooling power section including a time section of from a sequentially adjacent clock time to a termination time of a cooling pulse, a period of the sixth time section being set independent from that of the third time section by using at least a fifth parameter that is different from the third parameter.

6. The optical recording apparatus according to claim 5, wherein the first set of three time sections and the second set of three time sections are respectively independently changed in correspondence to a value of recording speed, as the recording speed is increased.

7. The optical recording apparatus according to claim 5, wherein the first set of three time sections and the second set of three time sections are respectively independently changed in correspondence to values of recording speed, as the recording speed is decreased.

* * * * *